United States Patent
Phillips et al.

(10) Patent No.: US 7,827,256 B2
(45) Date of Patent: Nov. 2, 2010

(54) APPLYING QUALITY OF SERVICE TO APPLICATION MESSAGES IN NETWORK ELEMENTS

(75) Inventors: Steve Phillips, San Jose, CA (US); Sunil Potti, Castro Valley, CA (US); Praveen Joshi, San Jose, CA (US); Pravin Singhal, Cupertino, CA (US); Tefcros Anthias, Los Altos, CA (US); Rahul Tripathi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 548 days.

(21) Appl. No.: 11/472,807

(22) Filed: Jun. 21, 2006

(65) Prior Publication Data
US 2007/0028001 A1    Feb. 1, 2007

(51) Int. Cl.
G06F 15/177    (2006.01)
(52) U.S. Cl. .................................... 709/220
(58) Field of Classification Search ................ 709/220
See application file for complete search history.

(56) References Cited

U.S. PATENT DOCUMENTS

| | | | |
|---|---|---|---|
| 5,796,743 | A | 8/1998 | Bunting et al. |
| 6,115,378 | A | 9/2000 | Hendel et al. |
| 6,125,391 | A | 9/2000 | Meltzer et al. |
| 6,226,675 | B1 | 5/2001 | Meltzer et al. |
| 6,321,264 | B1 | 11/2001 | Fletcher et al. |

(Continued)

FOREIGN PATENT DOCUMENTS

EP    1217804    6/2002

(Continued)

OTHER PUBLICATIONS

International Searching Authority, "Notification of Transmittal of the International Search Report and the Written Opinion of the International Searching Authority, or the Declaration," PCT/US2006/024375, dated Oct. 17, 2006, 10 pages.

(Continued)

*Primary Examiner*—Hassan Phillips
*Assistant Examiner*—Ebrahim Golabbakhsh
(74) *Attorney, Agent, or Firm*—Hickman Palermo Truong & Becker LLP; Christopher J. Palermo

(57) ABSTRACT

A network element such as a router or switch provides application-level quality of service for application-layer messages processed in the network element, using application QoS logic which when executed by the one or more processors is operable to cause receiving an application-layer message; matching one or more attributes of the application-layer message to the message classification rules; determining a message classification of the application-layer message based on the matching; selecting one of the network-level QoS values using the mapping and based on the determined message classification; and marking a network-level header of the application-layer message using the selected QoS value. As a result, attributes of application messages at OSI Layer 5, 6, or 7 can be used to determine how to mark packets of the messages with QoS values at OSI Layer 2, 3 or 4, integrating application-level concepts of order and priority into network-layer QoS mechanisms.

40 Claims, 33 Drawing Sheets

U.S. PATENT DOCUMENTS

| | | |
|---|---|---|
| 6,337,856 B1 | 1/2002 | Schanhals et al. |
| 6,363,477 B1 | 3/2002 | Fletcher et al. |
| 6,611,526 B1 * | 8/2003 | Chinnaswamy et al. ...... 370/406 |
| 6,683,881 B1 | 1/2004 | Mijares et al. |
| 6,771,646 B1 | 8/2004 | Sarkissian et al. |
| 6,772,211 B2 * | 8/2004 | Lu et al. ...................... 709/226 |
| 6,813,690 B1 | 11/2004 | Lango et al. |
| 6,862,270 B1 * | 3/2005 | Ho .............................. 370/328 |
| 6,868,426 B1 | 3/2005 | Mankoff |
| 6,944,678 B2 | 9/2005 | Lu et al. |
| 6,950,822 B1 | 9/2005 | Idicula et al. |
| 7,031,314 B2 | 4/2006 | Craig et al. |
| 7,032,031 B2 | 4/2006 | Jungck et al. |
| 7,058,973 B1 | 6/2006 | Sultan |
| 7,089,586 B2 | 8/2006 | Kilgore |
| 7,114,008 B2 | 9/2006 | Jungck et al. |
| 7,134,075 B2 | 11/2006 | Hind et al. |
| 7,185,365 B2 | 2/2007 | Tang et al. |
| 7,215,637 B1 | 5/2007 | Ferguson et al. |
| 7,245,620 B2 | 7/2007 | Shankar |
| 7,321,556 B1 * | 1/2008 | Parekh et al. ................ 370/232 |
| 7,330,908 B2 | 2/2008 | Jungck |
| 7,362,763 B2 | 4/2008 | Wybenga et al. |
| 7,415,512 B1 * | 8/2008 | Moon .......................... 709/220 |
| 7,421,695 B2 * | 9/2008 | Murray et al. ............... 718/105 |
| 7,437,451 B2 | 10/2008 | Tang et al. |
| 7,469,300 B2 | 12/2008 | De Bonet et al. |
| 7,475,108 B2 | 1/2009 | Di Giulio et al. |
| 7,483,421 B2 | 1/2009 | Compton |
| 2001/0047422 A1 * | 11/2001 | McTernan et al. ........... 709/231 |
| 2002/0015485 A1 | 2/2002 | Bhusri |
| 2002/0069279 A1 * | 6/2002 | Romero et al. ............... 709/225 |
| 2002/0083817 A1 | 7/2002 | Hoshino |
| 2002/0105911 A1 | 8/2002 | Pruthi et al. |
| 2002/0107951 A1 | 8/2002 | Teague et al. |
| 2002/0114274 A1 * | 8/2002 | Sturges et al. ................ 370/229 |
| 2002/0143981 A1 * | 10/2002 | DeLima et al. .............. 709/233 |
| 2002/0163933 A1 * | 11/2002 | Benveniste ................... 370/465 |
| 2002/0165957 A1 | 11/2002 | Devoe et al. |
| 2002/0191622 A1 * | 12/2002 | Zdan ........................... 370/401 |
| 2002/0194342 A1 * | 12/2002 | Lu et al. ...................... 709/227 |
| 2003/0004672 A1 | 1/2003 | Thurman |
| 2003/0005117 A1 | 1/2003 | Kang et al. |
| 2003/0009571 A1 * | 1/2003 | Bavadekar ................... 709/230 |
| 2003/0018726 A1 | 1/2003 | Low et al. |
| 2003/0026268 A1 | 2/2003 | Navas |
| 2003/0028616 A1 | 2/2003 | Aoki et al. |
| 2003/0036897 A1 | 2/2003 | Flores et al. |
| 2003/0046429 A1 | 3/2003 | Sonksen |
| 2003/0055818 A1 | 3/2003 | Faybishenko et al. |
| 2003/0069975 A1 | 4/2003 | Abjanic et al. |
| 2003/0078031 A1 * | 4/2003 | Masuda ....................... 455/406 |
| 2003/0084279 A1 | 5/2003 | Campagna |
| 2003/0093530 A1 * | 5/2003 | Syed ............................ 709/226 |
| 2003/0112809 A1 * | 6/2003 | Bharali et al. ............... 370/400 |
| 2003/0115448 A1 | 6/2003 | Bouchard |
| 2003/0140140 A1 | 7/2003 | Lahtinen |
| 2003/0163539 A1 | 8/2003 | Piccinelli |
| 2003/0163603 A1 | 8/2003 | Fry et al. |
| 2003/0177183 A1 * | 9/2003 | Cabrera et al. .............. 709/204 |
| 2003/0182419 A1 | 9/2003 | Barr et al. |
| 2003/0188192 A1 | 10/2003 | Tang et al. |
| 2003/0189935 A1 * | 10/2003 | Warden et al. ......... 370/395.21 |
| 2003/0202535 A1 * | 10/2003 | Foster et al. ................. 370/469 |
| 2003/0204626 A1 | 10/2003 | Wheeler |
| 2003/0204719 A1 | 10/2003 | Ben-Itzhak |
| 2003/0217171 A1 | 11/2003 | Von Stuermer et al. |
| 2003/0217176 A1 | 11/2003 | Beunings |
| 2003/0236883 A1 | 12/2003 | Takeshima et al. |
| 2004/0006613 A1 | 1/2004 | Lemieux et al. ............. 709/223 |
| 2004/0022250 A1 * | 2/2004 | Chen et al. ............. 370/395.43 |
| 2004/0022255 A1 * | 2/2004 | Chen et al. ................... 370/401 |
| 2004/0024868 A1 | 2/2004 | Drummond |
| 2004/0024881 A1 | 2/2004 | Elving et al. |
| 2004/0032881 A1 | 2/2004 | Arai |
| 2004/0039940 A1 | 2/2004 | Cox et al. |
| 2004/0088460 A1 | 5/2004 | Poisner |
| 2004/0128360 A1 | 7/2004 | Petri et al. |
| 2004/0162871 A1 | 8/2004 | Pabla et al. |
| 2004/0167986 A1 | 8/2004 | Gilfix et al. |
| 2004/0205336 A1 * | 10/2004 | Kessler et al. ............... 713/160 |
| 2004/0205770 A1 | 10/2004 | Zhang et al. |
| 2004/0260760 A1 * | 12/2004 | Curnyn ....................... 709/201 |
| 2004/0264481 A1 | 12/2004 | Darling et al. |
| 2004/0267920 A1 | 12/2004 | Hydrie et al. |
| 2004/0267930 A1 | 12/2004 | Giulio et al. |
| 2004/0267933 A1 | 12/2004 | Przybylski et al. |
| 2004/0268357 A1 | 12/2004 | Joy et al. |
| 2005/0005031 A1 | 1/2005 | Gordy et al. |
| 2005/0015619 A1 | 1/2005 | Lee |
| 2005/0025091 A1 * | 2/2005 | Patel et al. ................... 370/328 |
| 2005/0041670 A1 * | 2/2005 | Lin et al. ................ 370/395.21 |
| 2005/0050362 A1 | 3/2005 | Peles |
| 2005/0054346 A1 * | 3/2005 | Windham et al. ........... 455/445 |
| 2005/0063377 A1 | 3/2005 | Bryant et al. |
| 2005/0076332 A1 | 4/2005 | Jawaharlal et al. |
| 2005/0080914 A1 | 4/2005 | Lerner et al. |
| 2005/0086342 A1 | 4/2005 | Burt et al. |
| 2005/0094611 A1 * | 5/2005 | Cheong et al. ............... 370/342 |
| 2005/0102393 A1 * | 5/2005 | Murray et al. ............... 709/224 |
| 2005/0114394 A1 | 5/2005 | Kaipa et al. |
| 2005/0117576 A1 | 6/2005 | McDysan et al. |
| 2005/0148314 A1 | 7/2005 | Taglienti et al. |
| 2005/0169171 A1 * | 8/2005 | Cheng et al. ................. 370/229 |
| 2005/0188103 A1 | 8/2005 | Chen |
| 2005/0198351 A1 | 9/2005 | Nog et al. |
| 2005/0213591 A1 * | 9/2005 | Nakazawa et al. .......... 370/401 |
| 2005/0228893 A1 * | 10/2005 | Devarapalli et al. ......... 709/228 |
| 2005/0229243 A1 | 10/2005 | Svendsen et al. |
| 2005/0252970 A1 * | 11/2005 | Howarth et al. ............. 235/451 |
| 2005/0283539 A1 | 12/2005 | Betts et al. |
| 2005/0286461 A1 * | 12/2005 | Zhang et al. ................. 370/328 |
| 2005/0289538 A1 | 12/2005 | Black-Ziegelbein et al. |
| 2006/0015699 A1 | 1/2006 | Fujiwara et al. |
| 2006/0021010 A1 | 1/2006 | Atkins et al. |
| 2006/0031374 A1 | 2/2006 | Lu et al. |
| 2006/0123226 A1 | 6/2006 | Kumar et al. |
| 2006/0123477 A1 | 6/2006 | Raghavan et al. |
| 2006/0129689 A1 * | 6/2006 | Ho et al. ...................... 709/230 |
| 2006/0155862 A1 | 7/2006 | Kathi et al. |
| 2006/0155969 A1 * | 7/2006 | Yoda et al. ................... 712/226 |
| 2006/0236062 A1 * | 10/2006 | Boss et al. .................... 711/170 |
| 2006/0248225 A1 | 11/2006 | Batz et al. |
| 2006/0256768 A1 * | 11/2006 | Chan ........................... 370/351 |
| 2007/0011223 A1 | 1/2007 | Calvignac et al. |
| 2007/0055864 A1 | 3/2007 | Tock et al. |
| 2008/0209413 A1 | 8/2008 | Kakumani et al. |
| 2010/0094945 A1 | 4/2010 | Chan et al. |

FOREIGN PATENT DOCUMENTS

| | | |
|---|---|---|
| WO | WO 99/07116 | 2/1999 |
| WO | WO 02/27507 | 4/2002 |
| WO | WO 03/021465 A1 | 3/2003 |

OTHER PUBLICATIONS

Current Claims, PCT/US2006/024375, 6 pages.

Decasper, Dan et al., "Router Plugins: A Software Architecture for Next-Generation Routers," IEEE ACM Transactions on Networking, vol. 9, No. 1, Feb. 2000, XP011038838, 14 pages.

International Searching Authority, "Notification of Transmittal of the International Search Report and the Written Opinion of the International Searching Authority, or the Declaration", International application No. PCT/US05/46149, dated Jul. 20, 2007, 9 pages.

Claims, International application No. PCT/US05/46149, 10 pages.

Chiu, Kenneth, et al., "Investigating the Limits of SOAP Performance for Scientific Computing", Nov. 7, 2002, IEEE Computer Society, 8 pages.

State Intellectual Property Office of the People's Republic of China, "The First Office Action", filing No. 200580031571.0, Dated Dec. 19, 2008, 9 pages.

Claims, filing No. 200580031571.0, 8 pages.

State Intellectual Property Office of the People's Republic of China, "The First Office Action", filing No. 200580045932.7, Dated Nov. 28, 2008, 8 pages.

Claims, filing No. 200580045932.7, 8 pages.

European Patent Office, "European Search Report", application No. EP 05820894, Feb. 6, 2009, 8 pages.

Claims, application No. EP 05820894, 6 pages.

Schramm, Cheryl, et al., "Application- Oriented Network Modeling with Mobile Agents", IEEE, 1998, 5 pages.

The Patent Office of the People's Republic of China, "The Second Office Action", Application No. 200580045932.7, dated May 8, 2009, 9 pages.

Pending Claims, Application No. 200580045932.7, 8 pages.

* cited by examiner

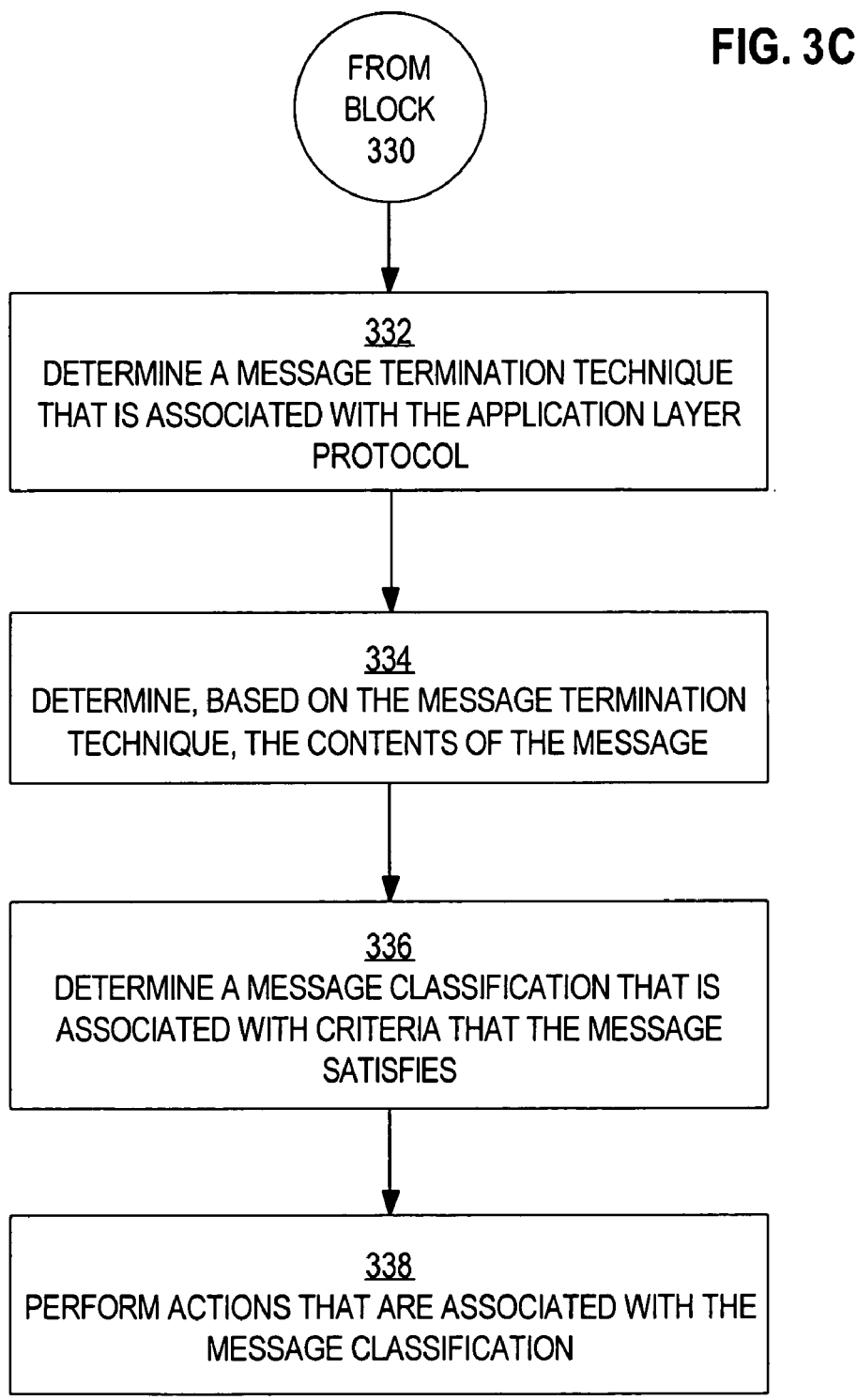

APPLYING QUALITY OF SERVICE TO APPLICATION MESSAGES IN NETWORK ELEMENTS

PRIORITY CLAIM

This application claims the benefit under 35 U.S.C. 119(e) of prior provisional Application No. 60/692,715, filed Jun. 21, 2005, the entire contents of which are hereby incorporated by reference for all purposes as if fully set forth herein.

CROSS-REFERENCE TO RELATED APPLICATIONS

This application is related to prior U.S. patent application Ser. No. 11/043,857, filed Jan. 25, 2005, entitled "APPLICATION LAYER MESSAGE-BASED SERVER FAILOVER MANAGEMENT BY A NETWORK ELEMENT," by Sunil Potti et al.; U.S. patent application Ser. No. 10/991,792, entitled "PERFORMING MESSAGE AND TRANSFORMATION ADAPTER FUNCTIONS IN A NETWORK ELEMENT ON BEHALF OF AN APPLICATION", by Pravin Singhal et al., filed on Nov. 17, 2004; U.S. patent application Ser. No. 10/997,616, entitled "CACHING CONTENT AND STATE DATA AT A NETWORK ELEMENT", by Alex Yiu-Man Chan et al., filed on Nov. 23, 2004; U.S. patent application Ser. No. 11/005,978, entitled "PERFORMING MESSAGE PAYLOAD PROCESSING FUNCTIONS IN A NETWORK ELEMENT ON BEHALF OF AN APPLICATION", by Tefcros Anthias et al., filed on Dec. 6, 2004; U.S. patent application Ser. No. 11/007,421, entitled "PERFORMING SECURITY FUNCTIONS ON A MESSAGE PAYLOAD IN A NETWORK ELEMENT", by Sandeep Kumar et al., filed on Dec. 7, 2004; U.S. patent application Ser. No. 11/007,152, entitled "NETWORK AND APPLICATION ATTACK PROTECTION BASED ON APPLICATION LAYER MESSAGE INSPECTION", by Sandeep Kumar et al., filed on Dec. 7, 2004; U.S. patent application Ser. No. 11/009,127, entitled "REDUCING THE SIZES OF APPLICATION LAYER MESSAGES IN A NETWORK ELEMENT", by Ricky Ho et al., filed on Dec. 10, 2004; U.S. patent application Ser. No. 11/009,270, entitled "GUARANTEED DELIVERY OF APPLICATION LAYER MESSAGES BY A NETWORK ELEMENT", by Tefcros Anthias et al., filed on Dec. 10, 2004; U.S. patent application Ser. No. 11/031,106, filed Jan. 5, 2005, entitled "INTERPRETING AN APPLICATION MESSAGE AT A NETWORK ELEMENT USING SAMPLING AND HEURISTICS," by Tefcros Anthias et al., filed on Jan. 5, 2005, and U.S. patent application Ser. No. 11/031,184, filed on Jan. 6, 2005, entitled "DATA TRAFFIC LOAD BALANCING BASED ON APPLICATION LAYER MESSAGES," by Hari Kathi et al., filed on Jan. 6, 2005, the entire contents of which are hereby incorporated by reference for all purposes as if fully set forth herein.

FIELD OF THE INVENTION

The present invention generally relates to network elements in computer networks. The invention relates more specifically to applying quality of service to network messages.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a business-to-business environment, applications executing on computers commonly communicate with other applications that execute on other computers. For example, an application "A" executing on a computer "X" might send, to an application "B" executing on a computer "Y," a message that indicates the substance of a purchase order.

Computer "X" might be remote from computer "Y." In order for computer "X" to send the message to computer "Y," computer "X" might send the message through a computer network such as a local area network (LAN), a wide-area network (WAN), or an inter-network such as the Internet. In order to transmit the message through such a network, computer "X" might use a suite of communication protocols. For example, computer "X" might use a network layer protocol such as Internet Protocol (IP) in conjunction with a transport layer protocol such as Transport Control Protocol (TCP) to transmit the message.

Assuming that the message is transmitted using TCP, the message is encapsulated into one or more data packets; separate portions of the same message may be sent in separate packets. Continuing the above example, computer "X" sends the data packets through the network toward computer "Y." One or more network elements intermediate to computer "X" and computer "Y" may receive the packets, determine a next "hop" for the packets, and send the packets towards computer "Y."

For example, a router "U" might receive the packets from computer "X" and determine, based on the packets being destined for computer "Y," that the packets should be forwarded to another router "V" (the next "hop" on the route). Router "V" might receive the packets from router "U" and send the packets on to computer "Y." At computer "Y," the contents of the packets may be extracted and reassembled to form the original message, which may be provided to application "B." Applications "A" and "B" may remain oblivious to the fact that the packets were routed through routers "U" and "V." Indeed, separate packets may take different routes through the network.

A message may be transmitted using any of several application layer protocols in conjunction with the network layer and transport layer protocols discussed above. For example, application "A" may specify that computer "X" is to send a message using Hypertext Transfer Protocol (HTTP). Accordingly, computer "X" may add HTTP-specific headers to the front of the message before encapsulating the message into TCP packets as described above. If application "B" is configured to receive messages according to HTTP, then computer "Y" may use the HTTP-specific headers to handle the message.

In addition to all of the above, a message may be structured according to any of several message formats. A message format generally indicates the structure of a message. For example, if a purchase order comprises an address and a delivery date, the address and delivery date may be distinguished from each other within the message using message format-specific mechanisms. For example, application "A" may indicate the structure of a purchase order using Extensible Markup Language (XML). Using XML as the message format, the address might be enclosed within "<address>" and "</address>" tags, and the delivery date might be enclosed within "<delivery-date>" and "</delivery-date>" tags. If application "B" is configured to interpret messages in XML, then application "B" may use the tags in order to determine which part of the message contains the address and which part of the message contains the delivery date.

A web browser ("client") might access content that is stored on remote server by sending a request to the remote server's Universal Resource Locator (URL) and receiving the content in response. Web sites associated with very popular URLs receive an extremely large volume of such requests from separate clients. In order to handle such a large volume of requests, these web sites sometimes make use of a proxy device that initially receives requests and distributes the requests, according to some scheme, among multiple servers.

One such scheme attempts to distribute requests relatively evenly among servers that are connected to the proxy device. A proxy device employing this scheme is commonly called a "load balancer." When successful, a load balancer helps to ensure that no single server in a server "farm" becomes inundated with requests.

When a proxy device receives a request from a client, the proxy device determines to which server, of many servers, the request should be directed. For example, a request might be associated with a session that is associated with a particular server. In that case, the proxy device might need to send the request to the particular server with which the session is associated.

If the server to which the proxy device sent the request is not able to service the request, one of several scenarios may occur. In one scenario, the server might send no response whatsoever. Under this scenario, after a specified amount of time has passed since the client sent the request without receiving a corresponding response, the client may determine that a "timeout" event has occurred. The client may take a specified action that is associated with the timeout event, such as notifying a user that a response to the request could not be obtained.

In another scenario, the server might send an HTTP-specific response that indicates that the server is not able to service the request. For example, the server might send a "500" code in an HTTP header. The client may receive the HTTP-specific response and take a specified action that is associated with the HTTP-specific response, such as notifying a user that the request could not be serviced.

Under either scenario, the only recourse left to the client is to resend the request. However, when the client resends the request, the resending wastes both network bandwidth and the client's processing resources. Furthermore, although HTTP provides codes whereby a server can notify a client, in a protocol header, that the server is unable to service a request, sometimes clients and servers communicate using protocols other than HTTP. Some of these other protocols do not have such built-in notification mechanisms.

A less wasteful, more productive, and more widely applicable technique for managing server failure, or the inability of a server to service a request, is needed.

Present approaches in data processing are inadequate with respect to network topology visibility, transmission of verbose XML documents, processing network identities of users, validating XML schemas, load balancing, and processing database application messages. Improved approaches in these areas are needed.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3B-C depict a flow diagram that illustrates one embodiment of a method of balancing data traffic among multiple servers based on application layer message content;

DETAILED DESCRIPTION

Figure 1:
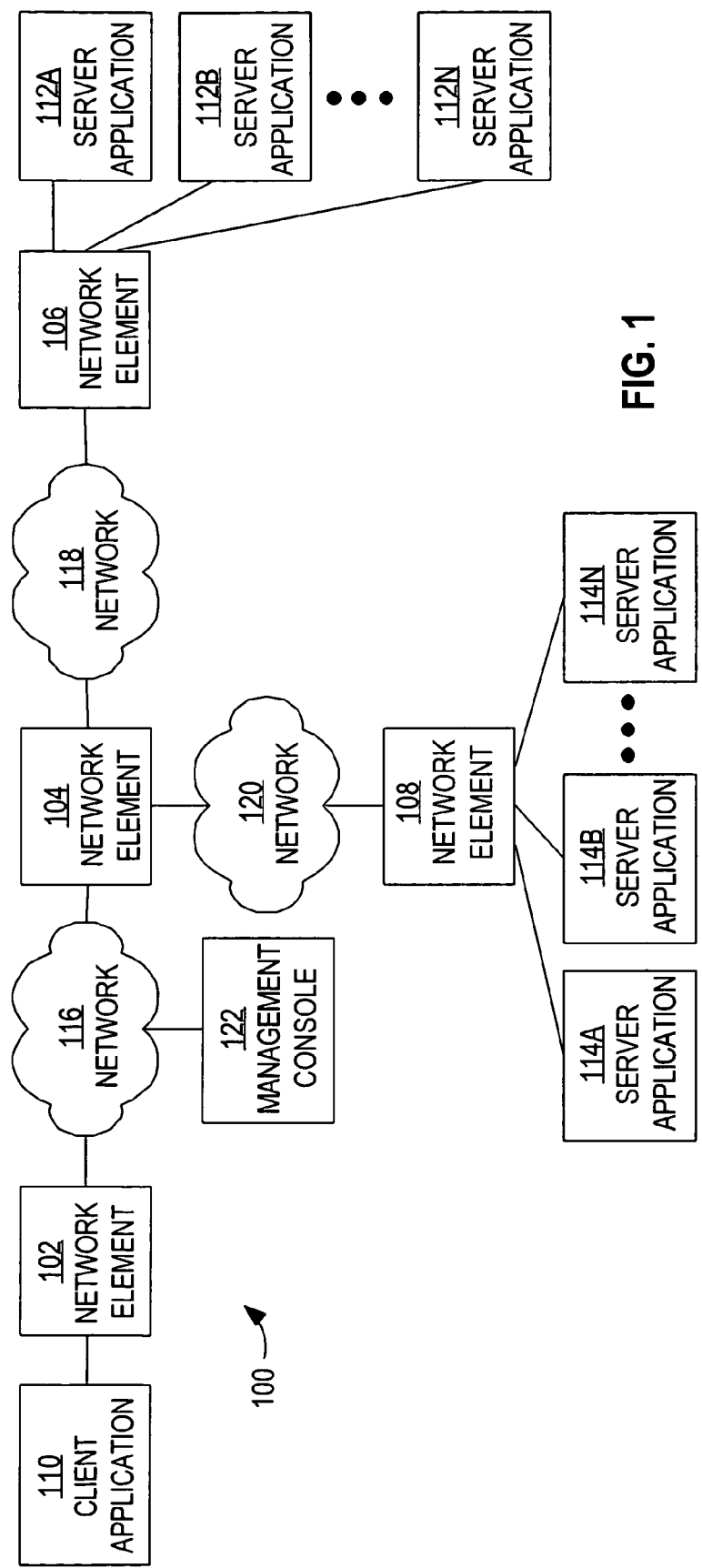
FIG. 1 is a block diagram that illustrates an overview of one embodiment of a system in which one or more network elements manage server failover based on application layer messages.

Applying quality of service to application-layer messages in network elements is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

```
1.0  General Overview
2.0  Structural and Functional Overview
     2.1  Maintaining Session State at Network Elements
     2.2  Transparent Application and Network Visibility and Other
          Approaches
3.0  Implementation Examples
     3.1  Network Element-Managed Server Failover Based on
          Application Layer Messages
     3.2  Multi-Blade Architecture
     3.3  Action Flows
     3.4  AONS Examples
          3.4.1   AONS General Overview
          3.4.2   AONS Terminology
          3.4.3   AONS Functional Overview
          3.4.4   AONS System Overview
          3.4.5   AONS System Elements
          3.4.6   AONS Example Features
          3.4.7   AONS Functional Modules
          3.4.8   AONS Modes of Operation
          3.4.9   AONS Message Routing
          3.4.10  Flows, Bladelets ™, and Scriptlets ™
          3.4.11  AONS Services
          3.4.12  AONS Configuration and Management
          3.4.13  AONS Monitoring
          3.4.14  AONS Tools
4.0  Applying Quality Of Service To Application-Layer Messages
     In Network Elements
     4.1  Background
     4.2  Functional & Structural Overview
     4.3  Additional Features of Various Embodiments
5.0  Implementation Mechanisms-Hardware Overview
6.0  Extensions and Alternatives
```

1.0 GENERAL OVERVIEW

In an embodiment, a network element such as a router or switch provides application-level quality of service for application-layer messages processed in the network element, using application QoS logic which when executed by the one or more processors is operable to cause receiving an application-layer message; matching one or more attributes of the application-layer message to the message classification rules; determining a message classification of the application-layer message based on the matching; selecting one of the network-level QoS values using the mapping and based on the determined message classification; and marking a network-level header of the application-layer message using the selected QoS value. As a result, attributes of application messages at OSI Layer 5, 6, or 7 can be used to determine how to mark packets of the messages with QoS values at OSI Layer 2, 3 or 4, integrating application-level concepts of order and priority into network-layer QoS mechanisms.

The needs identified in the foregoing Background, and other needs and objects that will become apparent for the following description, are achieved in the present invention, which comprises, in one aspect, a data processing apparatus, comprising a plurality of network interfaces that are coupled to a data network for receiving one or more packets therefrom and sending one or more packets thereto; one or more processors; a switching system coupled to the one or more processors and packet forwarding logic, wherein the switching system and packet forwarding logic are configured to receive packets on a first network interface, determine a second network interface on which to send the packets, and to send the packets on the second network interface; a computer-readable storage medium recorded with one or more message classification rules and a mapping of message classification values to network-level QoS values, wherein each of the message classification rules specifies one or more message attributes and one of the message classification values; and application QoS logic which when executed by the one or more processors is operable to cause: receiving an application-layer message; matching one or more attributes of the application-layer message to the message classification rules; determining a message classification of the application-layer message based on the matching; selecting one of the network-level QoS values using the mapping and based on the determined message classification; and marking a network-level header of the application-layer message using the selected QoS value.

In one feature, the message classification rules classify the application-layer message as one of mission critical, transactional data, bulk data transfer, and best effort.

In another feature, the network-level QoS values are differentiated services code point (DSCP) values. In a related feature, the application QoS logic comprises logic which when executed by the one or more processors is operable to mark an IP header of the application-layer message with one of the DSCP values.

In a further feature, the network-level QoS values are IP Type of Service (ToS) values. In yet another feature, the application QoS logic comprises logic which when executed by the one or more processors is operable to mark an IP header of the application-layer message with one of the ToS values.

In still another feature, the application QoS logic comprises logic which when executed by the one or more processors is operable to forward the marked application-layer message to a next hop, and the forwarding is prioritized based on the selected QoS value and a set of priority queues.

In yet another feature, the application QoS logic comprises logic which when executed by the one or more processors is operable to establish a plurality of prioritized virtual connections between the apparatus and a next hop apparatus, and to forward the marked application-layer message to a next hop, and the forwarding is prioritized based on writing the application-layer message to one of the virtual connections that is associated with the selected QoS value.

In various features, the apparatus comprises any of a packet data router and a packet data switch in a packet-switched network.

In still another feature, the application QoS logic comprises logic which when executed by the one or more processors is operable to: forward the marked application-layer message to an endpoint; receive a second application-layer message from the endpoint; determine that the second application-layer message is associated with the marked application-layer message; mark the second application-layer message with the same selected QoS value that was used to mark the marked application-layer message; and forward the second application-layer message to a next hop, wherein the forwarding is prioritized based on writing the application-layer message to one of the virtual connections that is associated with the selected QoS value.

In other aspects, the invention encompasses a computer-implemented method and a computer-readable medium configured to carry out the foregoing steps.

2.0 STRUCTURAL AND FUNCTIONAL OVERVIEW

FIG. 1 is a block diagram that illustrates an overview of one embodiment of a system 100 in which one or more of network elements 102, 104, 106, and 108 manage server failover based on application layer messages. Network elements 102, 104, 106, and 108 may be proxy devices and/or network switches and/or routers, such as router 600 depicted in FIG. 6 below, for example.

Client application 110 is coupled communicatively with network element 102. Server applications 112A-N are coupled communicatively to network element 106. Server applications 114A-N are coupled communicatively to network element 108. Client application 110 and server applications 112A-N and 114A-N may be separate processes executing on separate computers. According to one embodiment, server applications 112A-N and 114A-N are web servers. According to one embodiment, server applications 112A-N and 114A-N are database servers that communicate with databases.

Network elements 102 and 104 are coupled communicatively with a network 116. Network elements 104 and 106 are coupled communicatively with a network 118. Network elements 104 and 108 are coupled communicatively with a network 120. Each of networks 116, 118, and 120 is a computer network, such as, for example, a local area network (LAN), wide area network (WAN), or internetwork such as the Internet. Networks 116, 118, and 120 may contain additional network elements such as routers.

Client application 110 encapsulates application layer messages within data packets and addresses the data packets to virtual addresses, such as virtual IP addresses, each of which may be associated with multiple servers. For example, a first virtual IP address may be associated with server applications 112A-N, and a second virtual IP address may be associated with server applications 114A-N. Network elements that intercept data packets destined for the first virtual IP address route the data packets toward network element 106. Network elements that intercept data packets destined for the second virtual IP address route the data packets toward network element 108.

Network elements 106 and 108 intercept the data packets that contain the messages. Network elements 106 and 108 select, from among server applications 112A-N and server applications 114A-N, respectively, particular server applications toward which the data packets should be sent. The particular server applications may be selected based on a load-balancing algorithm, or based on session mappings, or based on relative priorities of the server applications.

For example, each of server applications 112A-N may be assigned a priority relative to each other of server applications 112A-N. If server application 112A has a higher priority than server application 112B, then network element 106 may attempt to send data packets to server application 112A before sending data packets to server application 112B; network element 106 might send data packets to server application 112B only if server application 112A is unable to service a request contained with the data packets.

In one embodiment, network elements 106 and 108 store intercepted requests and determine whether the server applications to which requests are sent in this manner are unable to service the requests. In response to determining that a particular server application is unable to service a request, network elements 106 and 108 select another server application and send the request to that other server application. In one embodiment, network elements 106 and 108 repeat this server application selection process until network elements 106 and 108 intercept, from a selected server, a response that does not indicate that the request could not be serviced. Network elements 106 and 108 send such "actual" responses to client application 110.

Because network elements 106 and 108 ensure that requests are distributed to server applications that are capable of responding to those requests, client application 110 does not need to be sent any responses that indicate that those requests could not be serviced. Thus, network bandwidth may be reserved for transporting "actual" responses, and client application 110 does not even need to be "aware" that network elements 106 and 108 are handling server failover. To client application 110, it does not appear that any of server applications 112A-N and 114A-N have failed.

Figure 2:
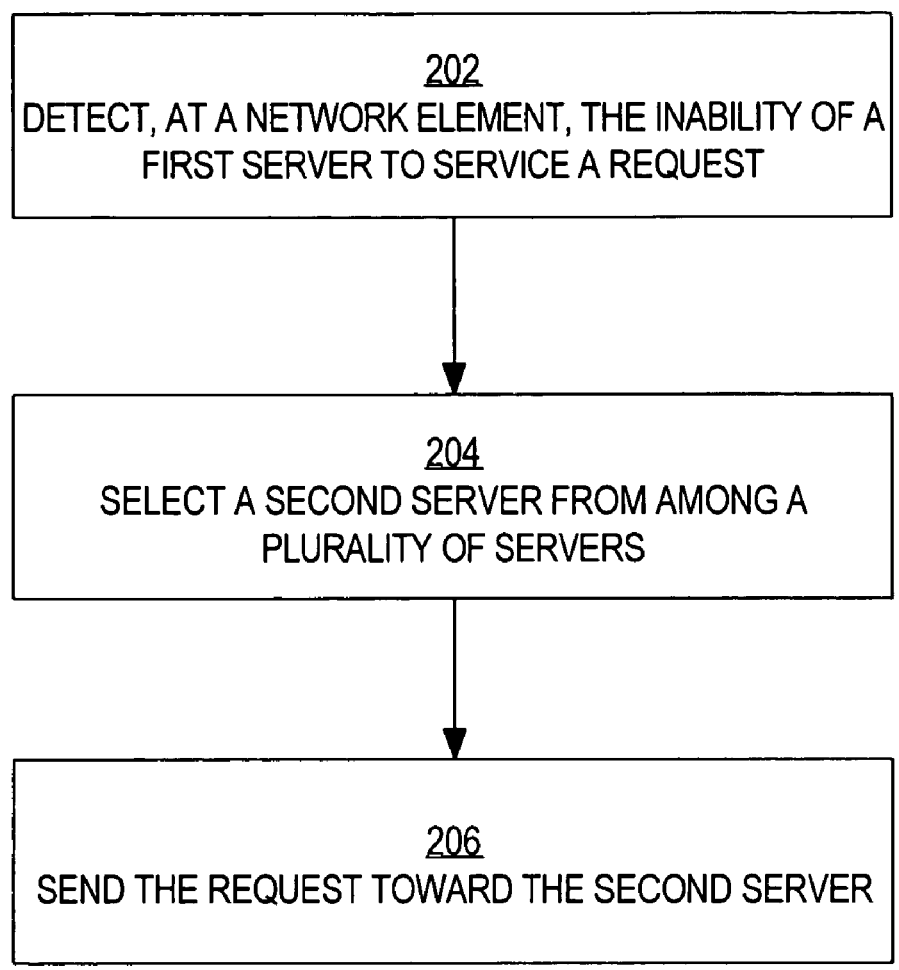
FIG. 2 depicts a flow diagram that illustrates an overview of one embodiment of a method of managing server failure at a network element.

FIG. 2 depicts a flow diagram 200 that illustrates an overview of one embodiment of a method of managing server failure at a network element. Such a method may be performed, for example, by network element 106 or 108.

In block 202, the inability of a first server to service a request is detected at a network element. For example, network element 106 may intercept a request from client application 110, store a copy of the request, select server application 112A from among server applications 112A-N, send the request to server application 112A, and detect that server application 112A is unable to service the request. Network element 106 may make this determination in any one of several ways.

For example, network element 106 might determine that a specified amount of time has passed since network element 106 sent the request to server application 112A, and that in that time, no corresponding response has been received on the TCP connection to server application 112A. For another example, network element 106 may determine that a specified amount of time has passed since network element 106 sent a TCP SYN packet to server application 112A, and that in that time no TCP SYN/ACK packet has been received from server application 112A. As a result of detecting such timeout events, network element 106 may determine that server application 112A has failed and is unable to service the request.

For another example, network element 106 might intercept, from server application 112A, an HTTP-specific message that indicates that server application 112A is unable to service the request. More specifically, server application 112A might send, toward client application 110, a message that has an HTTP header that indicates status code "500." Network element 106 may intercept the data packets that contain this message, assemble and inspect the message, and determine from the code that server application 112A is unable to service the request.

For another example, network element 106 might intercept a message that indicates, in the body of the message itself, that server application 112A is unable to service the request. More specifically, server application 112A might send, toward client application 110, an XML document that contains a specified XML element that indicates that server application 112A cannot service the request. One or more protocol headers, such as an FTP header, a Simple Mail Transfer Protocol (SMTP) header, or some other protocol header, may precede the XML document within the collective payload portions of multiple TCP data packets. A protocol header may relate to a proprietary protocol. Network element 106 may intercept the packets that contain the XML document, assemble and inspect the XML document, and determine, from the presence of the specified XML element within the XML document, that server application 112A is unable to service the request.

In one embodiment, when a network element such as network element 106 determines that a server application such as server application 112A is unable to service requests, the network element generates an entry for the server application in a list of server applications that the network element will not select, at least for a specified period of time. The entry may be associated with a timestamp that indicates to the network element when the entry should be removed from the list.

In block 204, in response to detecting the inability of the first server to service the request, a second server is selected from among a plurality of servers. For example, in response to detecting that server application 112A is unable to service the request, network element 106 may select server application 112B from among server applications 112A-N. The selection may be based on a load-balancing algorithm, for example, or based on relative priorities assigned to server applications 112A-N.

In block 206, the request is sent toward the second server. Thus, the first server "fails over" to the second server. For example, using the copy of the request that network element 106 stored earlier, network element 106 may send the request to server application 112B. If network element 106 intercepts, from server application 112B, an actual response to the request, then network element 106 may send the response toward client application 110. Client application 110 does not need to be made aware that server application 112A was unable to service the request.

2.1 Maintaining Session State at Network Elements

According to one embodiment, network elements 102, 104, 106, and 108 inspect the contents of communications that those network elements intercept. The network elements determine, from the contents, both session-identifying information and session state information. Using the session-identifying information to identify the sessions, the network elements store the session state information and associate the session state information with the session to which the session state information pertains.

Because the network elements store session state information, server applications 112A-N and server applications 114A-N do not need to store session state information. For example, when network element 106 intercepts a request from client application 110, network element 106 may determine state information, such as the identities of items in a shopping cart, based on the request. Network element 106 may generate a new request for only those information items that network element 106 needs in order to generate a response to client 110, and send the new request to one of server applications 112A-N. The server application receiving the request may respond to network element 106 with the requested information items. Receiving the response, network element 106 may generate a new response using the state information stored at network element 106 and the information contained in the response from the server application. After generating the new response, network element 106 may send the new response toward client application 110.

Because all, or at least some, session state information may be stored at the network elements in addition to or instead of the server applications, the consequences of server application failure can be managed. When a server application fails, the session state information for session that the server application was handling is not lost, since the session state information is stored on a network element. Thus, when a server application fails, recovery may be achieved by the network element directing requests to a different server application. This may all occur without the knowledge of client application 110.

Furthermore, server applications do not need to synchronize session states among themselves. As a result, the overheard associated with inter-server-application communications that would be needed to accomplish such synchronization may be avoided.

As is discussed above, in one embodiment, server applications 112A-N and 114A-N are database servers. Client application 110 may communicate with these database servers using a proprietary database protocol. If a client is a database application using JDBC or ODBC, then the network elements may behave like JDBC drivers that interpret the database protocol. For example, client application 110 may send SQL statements to the database servers. According to one embodiment, network elements 102, 104, 106, and 108 inspect communications between client application 110 and the database server for database connection information. Database connection information may include parameters that are negotiated in order to establish a communications path between the client application and the database server. Obtaining such database connection information, the network elements store the database connection information locally as database connection state. If a database connection fails, or if a database server using such a connection fails, then the network element can reconstruct the database connection with the same or a different database server using the stored database connection state. All of this may be performed without the knowledge of client application 110. Because the database connection state information stored at the network element is used to reconstruct a database connection, the client application 110 does not need to intervene or have any special logic to handle the reconnection. The failure is being managed without any disruption to client application 110.

Among the information items which may be stored at a network element as part of the database connection state, and used to reconstruct a database connection, are the following: The URL for the connection, whether auto commit mode is "true" or "false," whether read only mode is "true" or "false," prepared statements that have been precompiled for optimization, and callable statements that have been precompiled for optimization.

In one embodiment, the network elements "virtualize" database connections to database servers. In other words, client application 110 might indicate a particular database object (e.g., in an SQL query) that the client application wants to access, but client application 110 might not indicate any particular database server to which the client application's request should be directed. Intercepting the request, network element 106, for example, may select a database server from among servers 112A-N, and direct the client application's request to the selected database server. If the database object is only accessible through a particular subset of database servers, then client application 110 may select one of the database servers within the particular subset.

When a database connection fails, network elements may reconstruct database connections immediately, in response to the failure. Alternatively, network elements may wait for subsequent requests from client applications that were using the failed database connections before reconstructing database connections for those client applications. Alternatively, each network element may maintain a "pool" of database connections to each database server, and allocate/modify a currently unused database connection in the pool whenever a database connection fails.

Whether the state information stored at the network server is session state information or database connection state information, the session identifier determined from messages sent from client application 110 may be determined from an express indication of the session identifier within the message, or by implication from other information associated with the messages. For example, network element 106 may look into the HTTP header of an HTTP request and inspect a cookie that expressly indicates a session identifier. For another example, network element 106 may look into the HTTP body of an HTTP request and locate a string that says "sessionid=123," where "123" is the session identifier. For another example, network element 106 look into the content of a database transport protocol and locate the binary data that identifies the database connection the request is associated with. For yet another example, network element 106 may determine an IP address from which the message came, and determine that the IP address is associated with a particular session identifier. Such associations may be maintained within the network elements.

According to one embodiment, each network element comprises multiple "blades." Each blade may store session state information. Two or more blades may synchronize session state with each other so that if one blade fails, the other blades have the session state that was maintained by the failed blade, and operations may continue without any interruption noticeable by client application 110. An administrator may specify which blades synchronize with each other.

Session state information may be obtained from a sequence of packets by appending the packets together at a network element, and inspecting the contents of the payload sections of the packets. Such inspection may involve, for example, inspecting the body of an HTTP message that is collectively contained in the payload sections. The session state information may be contained in the body. Techniques described herein may be applied to protocols other than HTTP, however; the techniques described herein should not be read as being limited to a particular protocol.

2.2 Transparent Application and Network Visibility and Other Approaches

The present art of data processing provides inadequate solutions for transparent application and network visibility and action-taking, transmission of verbose XML documents, processing network identities of users, validating XML schemas, load balancing, and processing database application messages. According to an embodiment, improved approaches for all the foregoing issues are provided within a network element. In this description, the term "network element" refers to broadly to any device forming a part of an infrastructure of a packet-switched network, such as a router or switch, as opposed to an end-station device such as a PC, workstation, server, or printer.

Transparent Application and Network Visibility and Action-Taking Through Intelligent Message Processing in a Network Element. According to an embodiment, improved non-invasive network and application topology visibility is provided through network message sniffing at a network element. In an embodiment, transport-layer messages are intercepted at a network element. The network element tracks network response time, indicating time to perform applications, based on examining timestamps associated with the transport-layer messages, or using other techniques. In a management station that is coupled to the network element, using a management application that graphically displays an image representing a network topology or application topology, the image is updated to show topology attributes that are determined based on response times. For example, link cost values in the display for links of one node associated with an application client to another node for an application server may be updated based on how long the application server is taking to service requests. Thus, application performance attributes may be mapped to network topology elements in the display.

In a related embodiment, incompatibility of software versions is detected through application-level message interception. For example, a network element may intercept an application-layer message representing a client request to a server. The network element may store, in local storage, version values for client applications of clients that are routable or reachable using the network element, and version values for server applications of servers that are routable or reachable using the network element. When a new application-layer request message arrives from a client, the network element may identify the associated application, compare the version values in local storage, and apply policy to the message depending on whether the version values are compatible. Determining compatibility does not necessarily require an exact match. For example, the network element may store information indicating which versions of a server are compatible or incompatible with versions of a client within ranges or to reflect backward or forward compatibility. Applying policy may include blocking communication of the message to the server, automatically generating a reply message on behalf of the server indicating incompatibility, applying a different quality of service treatment to the message based on the expectation that the server will reject the message, etc.

In a related embodiment, a network element may perform a responsive action based upon application responses detected in application messages. For example, the network element may dynamically re-provision a server with different configuration information. As another example, the network element may change a configuration of a load-balancing device, e.g., by changing weight values associated with making load-balancing decisions, based on response times detected from monitoring application client request messages and server responses. As yet another example, the network element may change QoS attributes of flows processed in the network element if network latency is detected as a problem. As a further example, the network element may change path routing based on application behavior if high network latency is detected. Changes in path routing may be performed, for example, using Cisco Optimized Edge Routing (OER), a feature of Cisco IOS® Software from Cisco Systems, Inc., San Jose, Calif.

Binary XML. According to an embodiment, a network element serves as a conversion device for transforming application-layer messages containing payloads structured according to extensible markup language (XML) from the verbose standard XML text format to binary XML format. In an embodiment, the network element performs all such transformation internally.

In a related embodiment, the network element performs transformation of verbose XML text format messages to binary XML messages, and sends the binary XML format messages to another node or to an application that understands the binary format. In a related embodiment, the network element converts Java® programmatic objects in application-layer messages to standard XML format, transforms the standard XML format to binary XML format, sends the transformed binary XML format messages to another node, and converts reply messages communicated in the opposite direction. Thus, a network element performs message mediation and can interoperate between a binary version and standard version without an application having to pay the penalty of using XML in conventional verbose text format.

Identity Brokering within a Network Element. According to an embodiment, a network element performs user identity brokering between users and applications.

In one embodiment, multiple network identities for a user are advertised in application-level messages. A network element identifies application-layer messages that advertise network identities for users, extracts the network identities, and stores the network identities in network element in a short-term cache. As the network element receives further application-layer messages, the network element automatically determines which of a plurality of user identities to use, and informs a server-based application about that identity. To do so, the network element transparently modifies the application-layer messages to include the correct user identity, or automatically generates a new application-layer message to the server-based application that advertises the correct user identity.

In a related embodiment, the network element performs actions to enforce the use of only a selected user identity. For example, a network element detects whether a message represents a valid transaction for a particular user identity for a particular application. If not, the network element may take any of several responsive actions. In one form of response, the network element notifies an application or administrator if a particular identity is not allowed for a particular action. In another form of response, the network element passes or rejects traffic depending on whether a particular identity is allowed for a particular action.

XML Schema Validation. According to an embodiment, a network element performs XML schema validation transparently as application-layer messages arrive in the network element. Upon receiving application-layer messages, the network element examines the messages and determines whether the messages contain XML payloads. If so, the network element examines the XML payloads and determines if the payloads conform to one or more XML schemas that are stored in the network element.

Thus, a network element can effectively offload the computationally intensive work of validating a message against an XML schema from an application server. This approach enables the network element to reply to a client that has sent an invalid XML message earlier and without consuming unnecessary network bandwidth in forwarding the message to a server for validation. The validation process occurs transparently, from the standpoint of an application, within the network element. The approach also enables a network element to enforce application-level security by preventing a malicious or unauthorized user from sending a flood of malformed XML messages as part of a denial-of-service attack directed to the server.

In an embodiment, a network element can include one or more hardware acceleration elements that process XML messages. For example, the network element can include a processor, ASIC, or other electronics that can tokenize an XML payload into an XML stream in hardware, validate the tokenized XML stream, and produce a signal indicating whether the XML payload validly matches a stored schema. The XML token stream may use a format that is optimized for validation.

Adaptive and Transparent Load Balancing and Failover of Endpoints Based on Request Message and Server Response Inspection. According to an embodiment, a network element performs load-balancing operations based on application performance. In one embodiment, a network element transparently intercepts application requests and forwards the requests to optimal endpoints based on a set of metrics. Thus, the network element can virtualize endpoints. An application can send a request message to a virtual endpoint and the network element determines to which actual endpoint among a plurality the request should be directed. To determine which endpoint is optimal, in one embodiment, a network element uses time and state values associated with a request, response and intermediate state to adaptively load balanc and fail over the endpoints.

For example, a network element actively generates and sends periodic inquiry application-layer messages to other network elements that provide an application-based load-balancing feature, or to an application server. The network element determines an application link latency value based on the time that is required for the other node or server to respond. Thus, the inquiry messages function as a form of "ping" message that is communicated at the application layer. The application link latency value may be provided to a load-balancing router as an additional input value for use in a load-balancing decision.

Data-Oriented Networking. According to an embodiment, a network element performs data-oriented networking functions by assisting in processing application-layer messages that relate to a server-based relational database system. For example, a network element receives application-layer message and determines that the message is a database query. The message originates from a database client. The network element processes the message in the network element to facilitate database operations. As a specific example, relating to database query submission and reply processing, the network element may form a JDBC query based on the application message. The network element may then create multiple application-layer messages all of which contain a copy of the JDBC query. The network element can send the multiple messages to multiple load-balanced databases that are registered with another network element that implements the techniques herein. The network element receives multiple database and merge replies from the multiple servers. The network element consolidates the replies, forms a client reply message, and sends the client reply message to the client.

Further, a network element can mediate database transaction fail and restart, including storing and delivering startup state for crash recovery. As other examples, a network element can receive an application-layer message that contains a flat file payload, convert the flat file payload to a relational database table, and forward the table to an RDBMS server. The network element also can apply security policies to application-layer database queries, such as authenticating the originating client, before sending the queries to the DB server.

Providing Reliable and Ordered Application Message Processing Across Multiple Network Elements. According to an embodiment, because a network element configured as indicated in this disclosure understands application-layer messages natively in the network, the network element can apply delivery semantics upon message delivery transparently. The delivery semantics can be applied using various approaches: once and only once, at least once and at most once. This approach applies reliable and ordered processing principles in a highly available manner across multiple blades in the network. The approach addresses the biggest known performance problem with guaranteed delivery and reliability (GDR), which is the overhead of persisting messages. Using integration with storage management products, optimal SAN-based protocols can be leveraged for fast I/O and persistence to disk.

Runtime Behavior Adaptability and Extensibility in a Network Element. Conventional network elements are primarily static, and any configuration or change is done via policies. Any changes in an operating system or applications running on the network element are performed in a controlled manner using standard upgrade approaches. According to an embodiment, using a true extensibility framework, a network element can allow customers and partners to dynamically change the runtime behavior of application message processing rules by allowing the user to write code in any language, deploy it a hot manner and update the runtime to load this new code—all during normal processing of the network element.

In an embodiment, custom bladelets allow for software code to be modified and loaded by customers dynamically into network elements for changing the processing logic applied on messages as they flow through the network. Custom protocol adapters allow for software code to modified and loaded by customers dynamically into network elements for changing which protocols are understood and managed in intermediate network nodes.

Today network elements generally do not have or have limited support for extensibility where customers can define their own software programs and upload into the network element. However, an Application Oriented Network (AON) as disclosed herein provides an environment in which customers can create programs that can be dynamically loaded and executed on the network device. In order to ensure that such dynamically loaded code is well behaved and do not accidentally or deliberately hamper the functioning of the network device, a sandboxed environment may be provided that protects the network element from such harm.

Currently network elements do not allow custom code to be uploaded onto the device to provide a programmable environment. If custom code is required to be installed on the device, typically a new operating system image containing the new functionality is created. The access control and security of such code is controlled largely at build time or by providing options to control behavior of the module via a command line interface. Hence the problem of code behavior is addressed in a static manner and does not change dynamically other than in a predictable manner by defining how the behavior can be controlled.

The problem of runtime program behavior is currently only addressed in a static manner. This was adequate because network devices do not allow custom code to be dynamically uploaded into a device without altering the running image. The method and apparatus presented herein solves the problem of securing and controlling the behavior of such dynamically uploaded code in a network device (a feature introduced by AON and covered in another patent application) by:

1. Providing a mechanism to specify permissions on the executing code that cannot be overridden and controlled by the network device itself. Permissions can be specified that either allow or deny access to resources;

2. Providing a mechanism to specify permissions that a user can override and can control whether or not particular operations are allowed. Permissions can be specified that either allow or deny access to resources;

3. Providing a mechanism to customize permissions so that the user or administrator can determine which permissions to override. Permissions can be specified that either allow or deny access to resources;

4. Provide an inheritance scheme that allows these permissions to be extended or inherited by custom code extensions.

At runtime, the network element verifies the permissions associated with the resource before permitting or denying execution.

This method and apparatus allows a network administrator or user to provision custom programs into the network device and provides a secure sandboxed environment in which they can execute without harming the network device. Unlike prior approaches, the approach herein:

1. Provides a secure environment in which custom programs that are deployed in a network device can execute.

2. Provides a data driven approach to easily customize and extend the security capabilities of the device.

3. Provides a language independent mechanism to express security permissions so that the security can be leveraged regardless of the implementing language.

4. Provides a secure container in which custom code executes regardless of the implementing language.

Method and apparatus to dynamically add application logic and protocol adapters to a programmable network element. Today network elements generally do not have, or have limited support for, an extensibility capability with which customers can define their own software programs and upload into the network element. Any need for executing custom logic is typically accomplished by statically compiling it into the image and uploading a new image to the network device. While this works well for packet level networking, where the protocols and standards are fairly mature, the method is inadequate for an Application Oriented Network (AON) because of the number of custom protocols and the large amount of custom code that already exists. The relative immaturity of the standards in the application area further complicate the problem, because it increases the amount of proprietary code that has been developed to meet enterprise needs. Since an AON provides optimized services that application developers can exploit directly from the network, this often involves requiring the ability to deploy the existing, well tested, custom code (application code or custom protocols) to the network device. Clearly the static solution of compiling this code into the image will not work since it will require creating a custom image for each customer.

An embodiment provides a method and apparatus by which custom code can be dynamically added to a network device without requiring an image upgrade. The custom code can be for the purpose of executing custom business logic in the network or for understanding custom application protocols that are not natively supported by the network device, thereby providing programmability support in the network, which is a capability presently unavailable in network devices.

Currently network elements do not allow custom code to be uploaded onto the device to provide a programmable environment. If custom code is required to be installed on the device, developers typically create a new image containing the new functionality.

An embodiment provides a method to dynamically create, package, provision and execute custom code for the purpose of providing custom business logic, or application protocols in the network device. This provides the following capabilities, which are not available in current network devices:

1. Programmability in the network in a scalable, manner without requiring customization of the image;

2. Ability to introduce new protocol support in the network that are not natively understood by the base platform without an image upgrade;

3. Ability to execute custom code in the network without performing an image upgrade.

An embodiment provides a method to create, package, provision, and execute custom business logic and/or understand custom application protocols dynamically without requiring an image upgrade.

1. By providing this capability, the network device becomes programmable and can be extended to leverage existing, tested code for application logic or custom application protocols, without requiring an image upgrade.

2. Customers who use an AON device can deploy new functions in the network without requiring a device upgrade resulting in significant cost savings.

3. Provides the ability to offload some key functions, like application protocols, which are infrastructural functions and belong in the network device. Typically this would be done by middleware servers increasing operational costs.

3.0 IMPLEMENTATION EXAMPLES

Figure 3A:
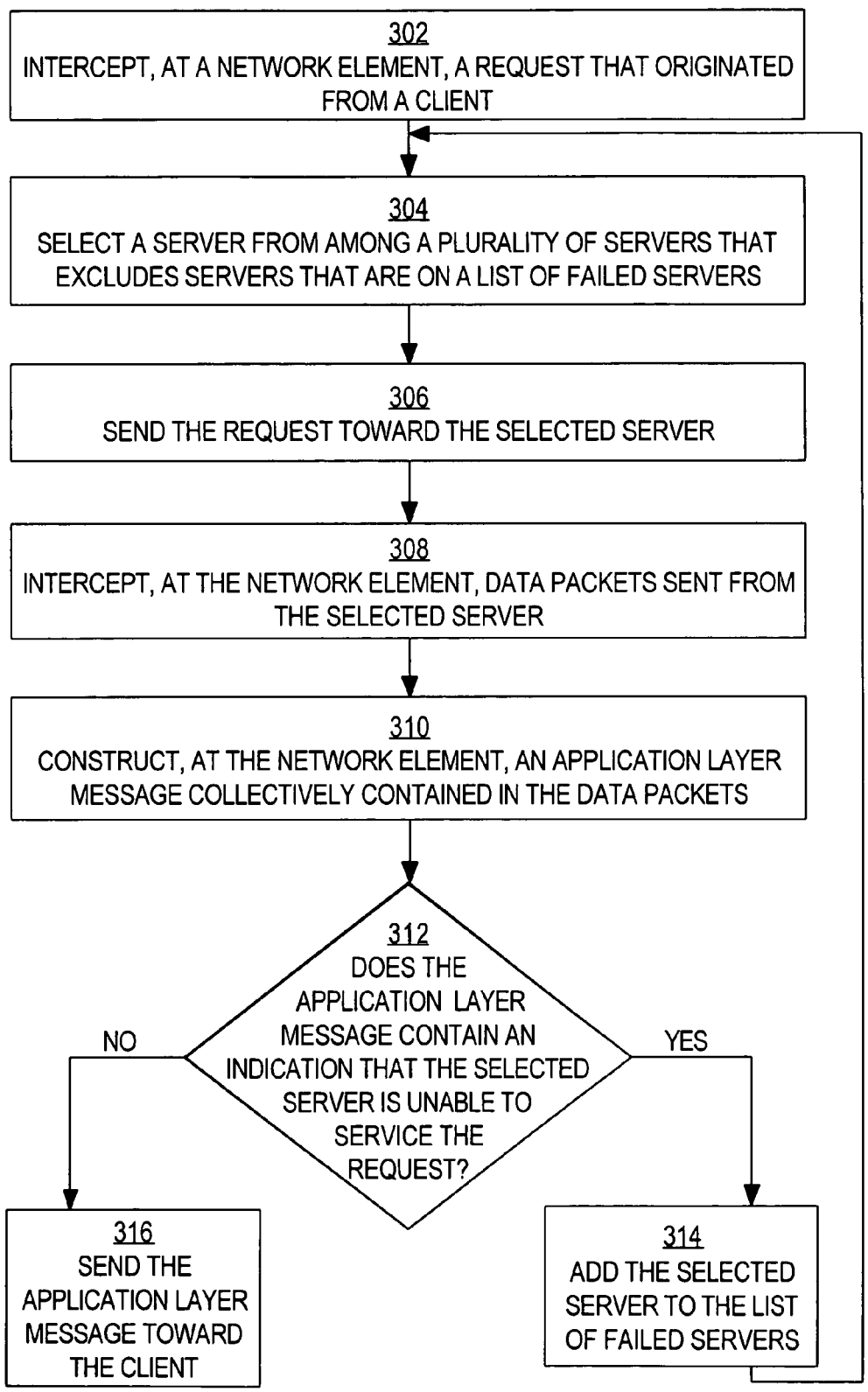
FIG. 3A depicts a flow diagram that illustrates one embodiment of a method of network element-managed server failover based on application layer messages.
Figure 3B:
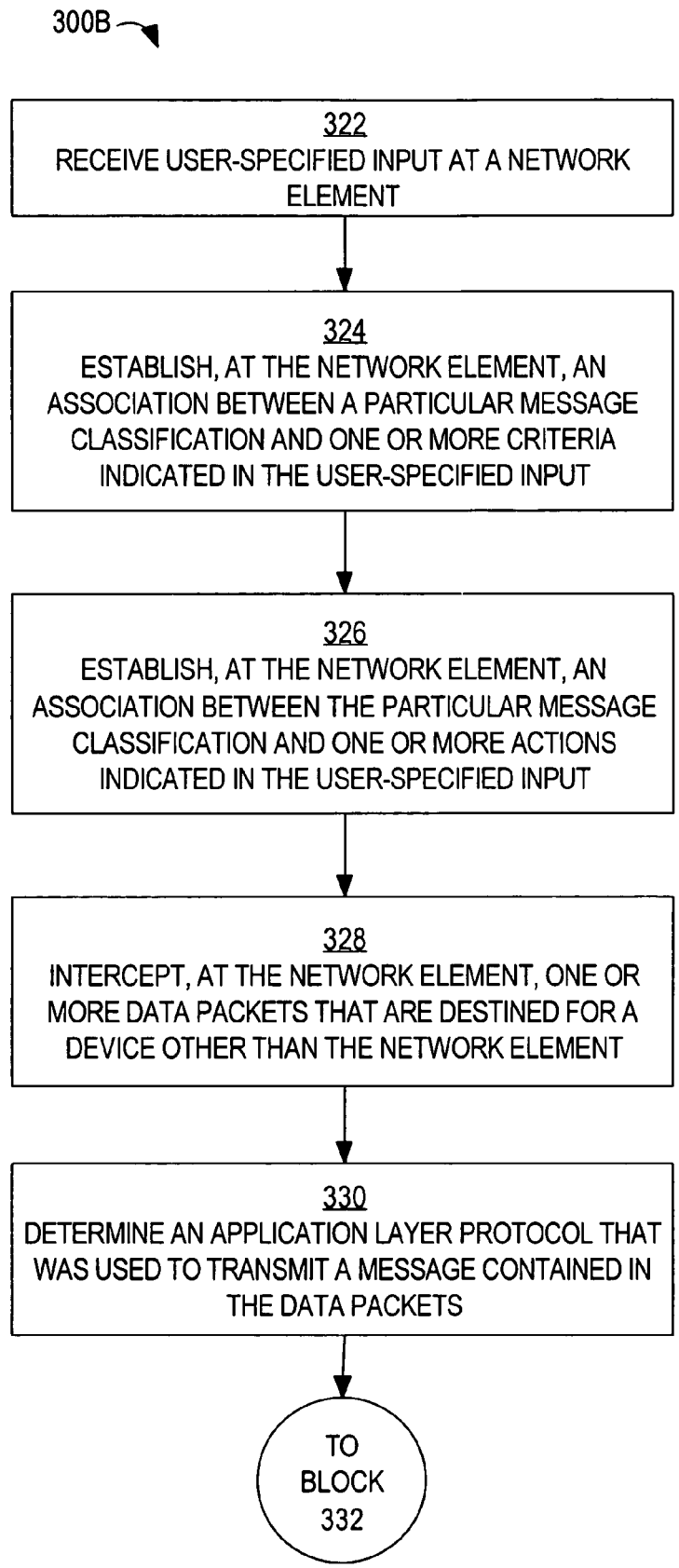

3.1 Network Element-Managed Server Failover Based on Application Layer Messages FIGS. 3A-3B depict a flow diagram 300A that illustrates one embodiment of a method of network element-managed server failover based on application layer messages. Such a method may be performed, for example, by network element 106 or 108. Other embodiments may omit one or more of the operations depicted in flow diagram 300A. Other embodiments may contain operations additional to the operation depicted in flow diagram 300A.

In block 302, a request, which originated from a client, is intercepted at a network element. The request is not addressed to the network element. For example, network element 106 may intercept a request that client application 110 addressed to a virtual IP address associated with server applications 112A-N.

In block 304, a server is selected from among a plurality of servers that excludes servers that are on a list of failed servers. For example, assuming that server application 112A is not on a list of failed servers maintained by network element 106, network element 106 may select, from among server applications 112A-N, server application 112A.

In block 306, the request is sent toward the selected server. A copy of the request is also stored at the network element. For example, network element 106 may send the request to server application 1112A.

In block 308, data packets sent from the selected server are intercepted at the network element. For example, network element 106 may intercept multiple TCP data packets that server application 112A addressed to client application 110. Payload portions of the data packets may collectively contain an application layer message that server application 112A generated in response to determining that server application 112A was unable to service the request. Because each of the data packets may contain a separate portion of the message, under some circumstances, none of the data packets independently contains the entire message. The application layer message may contain an indication that server application 112A is unable to service the request. For example, the message may be an XML document that contains a specified XML element that indicates that server application 112A is unable to service the request.

The message may be carried according to any of a variety of protocols, including HTTP, SMTP, and FTP. Thus, within the payload portions of the data packets, protocol headers used by such protocols may precede the message. The protocol headers are separate from the message itself.

In block 310, an application layer message collectively contained in the data packets is constructed at the network element. For example, network element 106 may assemble the contents of the payload portions of the data packets intercepted from server application 112A. Network element 106 may disregard any protocol headers, such as HTTP, FTP, or SMTP headers, which precede the application layer message constructed from the contents of the payload portions.

In block 312, it is determined, at the network element, whether the application layer message contains an indication that the selected server is unable to service the request. For example, assuming that the message is an XML document, network element 106 may determine whether the XML document contains a specified XML element. If the XML document does contain the specified XML element, then network element 106 may conclude that server application 112A is unable to service the request. If the application layer message contains the indication, then control passes to block 314. Otherwise, control passes to block 316.

In block 314, the selected server is added to the list of failed servers. For example, network element 106 may add, to the list of failed servers, an entry that identifies server application 112A. The entry may be associated with a timestamp that indicates a time at which the entry will be removed, automatically, from the list of failed servers. Control passes back to block 304, in which another server is selected to receive the request, which was previously stored at the network element. For example, network element 106 may select server application 112B and send the request to server application 112B.

Alternatively, in block 316, the application layer message is sent toward the client. For example, network element 106 may add the protocol headers back to the application layer message, encapsulate the application layer message and protocol headers into one or more data packets, and send the data packets toward client application 110.

3.2 Multi-Blade Architecture

Figure 6:
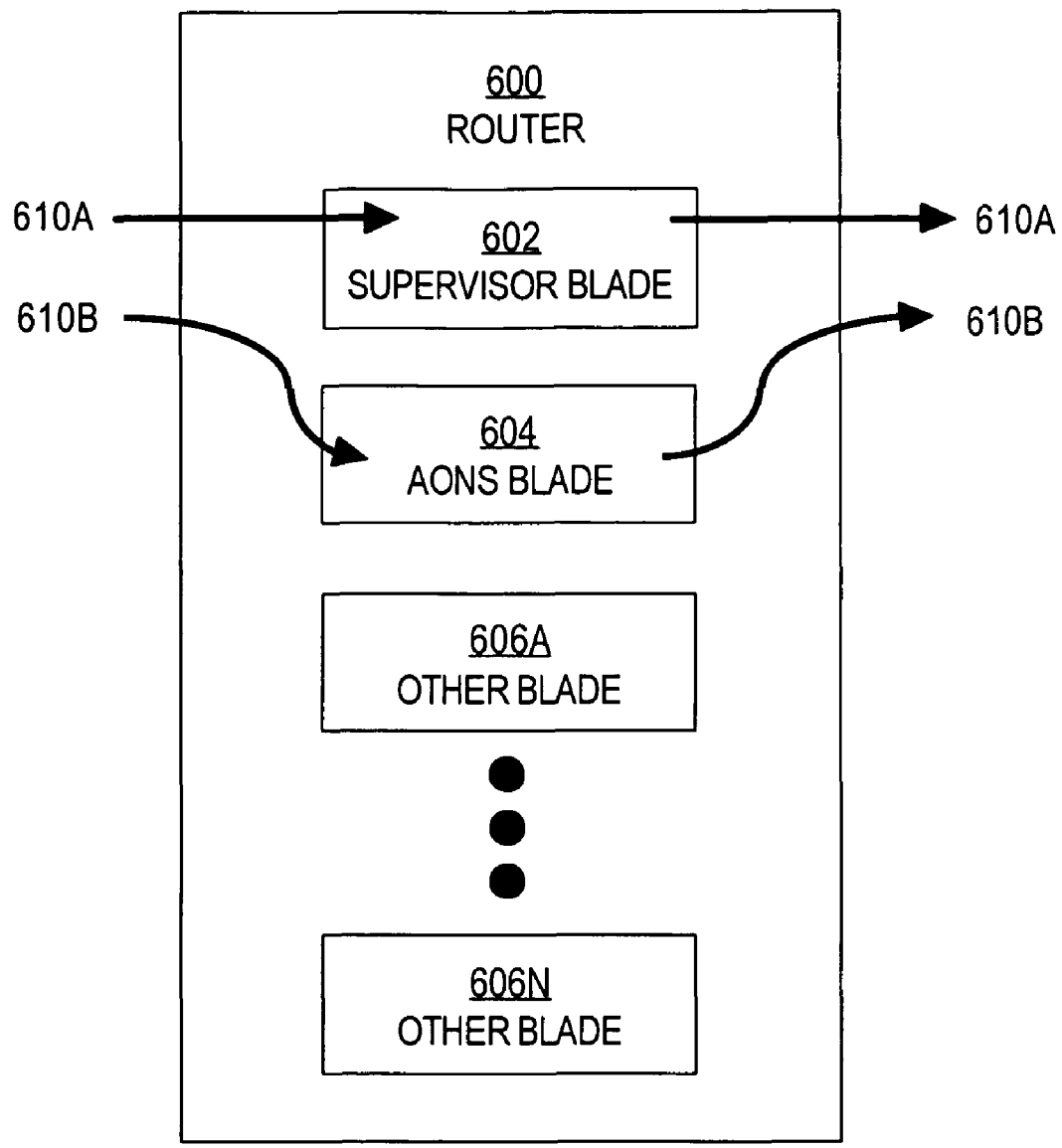
FIG. 6 is a block diagram that illustrates one embodiment of a router in which a supervisor blade directs some packet flows to an AONS blade and/or other blades.

According to one embodiment, an Application-Oriented Network Services (AONS) blade in a router performs the actions discussed above. FIG. 6 is a block diagram that illustrates one embodiment of a router 600 in which a supervisor blade 602 directs some of packet flows 610A-B to an AONS blade and/or other blades 606N. Router 600 comprises supervisor blade 602, AONS blade 604, and other blades 606A-N. Each of blades 602, 604, and 606A-N is a single circuit board populated with components such as processors, memory, and network connections that are usually found on multiple boards. Blades 602, 604, and 606A-N are designed to be addable to and removable from router 600. The functionality of router 600 is determined by the functionality of the blades therein. Adding blades to router 600 can augment the functionality of router 600, but router 600 can provide a lesser degree of functionality with fewer blades at a lesser cost if desired. One of more of the blades may be optional.

Router 600 receives packet flows such as packet flows 610A-B. More specifically, packet flows 610A-B received by router 600 are received by supervisor blade 602. Supervisor blade 602 may comprise a forwarding engine and/or a route processor such as those commercially available from Cisco Systems, Inc.

In one embodiment, supervisor blade 602 classifies packet flows 610A-B based on one or more parameters contained in the packet headers of those packet flows. If the parameters contained in the packet header of a particular packet match specified parameters, then supervisor blade 602 sends the packets to a specified one of AONS blade 604 and/or other blades 606A-N. Alternatively, if the parameters contained in the packet header do not match any specified parameters, then supervisor blade 602 performs routing functions relative to the particular packet and forwards the particular packet on toward the particular packet's destination.

For example, supervisor blade 602 may determine that packet headers in packet flow 610B match specified parameters. Consequently, supervisor blade 602 may send packets in packet flow 610B to AONS blade 604. Supervisor blade 602 may receive packets back from AONS blade 604 and/or other blades 606A-N and send the packets on to the next hop in a network path that leads to those packets' destination. For another example, supervisor blade 602 may determine that packet headers in packet flow 610A do not match any specified parameters. Consequently, without sending any packets in packet flow 610A to AONS blade 604 or other blades 606A-N, supervisor blade 602 may send packets in packet flow 610A on to the next hop in a network path that leads to those packets' destination.

AONS blade 604 and other blades 606A-N receive packets from supervisor blade 602, perform operations relative to the packets, and return the packets to supervisor blade 602. Supervisor blade 602 may send packets to and receive packets from multiple blades before sending those packets out of router 600. For example, supervisor blade 602 may send a particular group of packets to other blade 606A. Other blade 606A may perform firewall functions relative to the packets and send the packets back to supervisor blade 602. Supervisor blade 602 may receive the packet from other blade 606A and send the packets to AONS blade 604. AONS blade 604 may perform one or more message payload-based operations relative to the packets and send the packets back to supervisor blade 602.

According to one embodiment, the following events occur at an AONS router such as router 600. First, packets, containing messages from clients to servers, are received. Next, access control list-based filtering is performed on the packets and some of the packets are sent to an AONS blade or module. Next, TCP termination is performed on the packets. Next, Secure Sockets Layer (SSL) termination is performed on the packets if necessary. Next, Universal Resource Locator (URL)-based filtering is performed on the packets. Next, message header-based and message content-based filtering is performed on the packets. Next, the messages contained in the packets are classified into AONS message types. Next, a policy flow that corresponds to the AONS message type is selected. Next, the selected policy flow is executed. Then the packets are either forwarded, redirected, dropped, copied, or fanned-out as specified by the selected policy flow.

FIGS. 3B-C depict a flow diagram 300B that illustrates one embodiment of a method of balancing data traffic among multiple servers based on application layer message content. For example, one or more of network elements 102, 104, 106, and 108 may perform such a method. More specifically, AONS blade 604 may perform one or more steps of such a method. Other embodiments may omit one or more of the operations depicted in flow diagram 300B. Other embodiments may contain operations additional to the operation depicted in flow diagram 300B. Other embodiments may perform the operations depicted in flow diagram 300B in an order that differs from the order depicted in flow diagram 300B.

Referring first to FIG. 3B, in block 322, user-specified input is received at a network element. The user-specified input indicates the following: one or more criteria that are to be associated with a particular message classification, and one or more actions that are to be associated with the particular message classification. The user-specified input may indicate an order in which the one or more actions are to be performed. The user-specified input may indicate that outputs of actions are to be supplied as inputs to other actions. For example, network element 104, and more specifically AONS blade 604, may receive such user-specified input from a network administrator.

In block 324, an association is established, at the network element, between the particular message classification and the one or more criteria. For example, AONS blade 604 may establish an association between a particular message classification and one or more criteria. For example, the criteria may indicate a particular string of text that a message needs to contain in order for the message to belong to the associated message classification. For another example, the criteria may indicate a particular path that needs to exist in the hierarchical structure of an XML-formatted message in order for the message to belong to the associated message classification. For another example, the criteria may indicate one or more source IP addresses and/or destination IP addresses from or to which a message needs to be addressed in order for the message to belong to the associated message classification.

In block 326, an association is established, at the network element, between the particular message classification and the one or more actions. One or more actions that are associated with a particular message classification comprise a "policy" that is associated with that particular message classification. A policy may comprise a "flow" of one or more actions that are ordered according to a particular order specified in the user-specified input, and/or one or more other actions that are not ordered. For example, AONS blade 604 may establish an association between a particular message classification and one or more actions. Collectively, the operations of blocks 322-326 comprise "provisioning" the network element.

In block 328, one or more data packets that are destined for a device other than the network element are intercepted by the network element. The data packets may be, for example, data packets that contain IP and TCP headers. The IP addresses indicated in the IP headers of the data packets differ from the network element's IP address; thus, the data packets are destined for a device other than the network element. For example, network element 104, and more specifically, supervisor blade 602, may intercept data packets that client application 110 originally sent. The data packets might be destined for server application 112, for example.

In block 330, based on one or more information items indicated in the headers of the data packets, an application layer protocol that was used to transmit a message contained in the payload portions of the data packets (hereinafter "the message") is determined. The information items may include, for example, a source IP address in an IP header, a destination IP address in an IP header, a TCP source port in a TCP header, and a TCP destination port in a TCP header. For example, network element 104, and more specifically AONS blade 604, may store mapping information that maps FTP (an application layer protocol) to a first combination of IP addresses and/or TCP ports, and that maps HTTP (another application layer protocol) to a second combination of IP addresses and/ or TCP ports. Based on this mapping information and the IP addresses and/or TCP ports indicated by the intercepted data packets, AONS blade 604 may determine which application layer protocol (FTP, HTTP, SMTP, etc.) was used to transmit the message.

Referring now to FIG. 3C, in block 332, a message termination technique that is associated with the application layer protocol used to transmit the message is determined. For example, AONS blade 604 may store mapping information that maps FTP to a first procedure, that maps HTTP to a second procedure, and that maps SMTP to a third procedure. The first procedure may employ a first message termination technique that can be used to extract, from the data packets, a message that was transmitted using FTP. The second procedure may employ a second message termination technique that can be used to extract, from the data packets, a message that was transmitted using HTTP. The third procedure may employ a third message termination technique that can be used to extract, from the data packets, a message that was transmitted using SMTP. Based on this mapping information and the application layer protocol used to transmit the message, AONS blade 604 may determine which procedure should be called to extract the message from the data packets.

In block 334, the contents of the message are determined based on the termination technique that is associated with the application layer protocol that was used to transmit the message. For example, AONS blade 604 may provide the data packets as input to a procedure that is mapped to the application layer protocol determined in block 332. The procedure may use the appropriate message termination technique to extract the contents of the message from the data packets. The procedure may return the message as output to AONS blade 604. Thus, in one embodiment, the message extracted from the data packets is independent of the application layer protocol that was used to transmit the message.

In block 336, a message classification that is associated with criteria that the message satisfies is determined. For example, AONS blade 604 may store mapping information that maps different criteria to different message classifications. The mapping information indicates, among possibly many different associations, the association established in block 324. AONS blade 604 may determine whether the contents of the message satisfy criteria associated with any of the known message classifications. In one embodiment, if the contents of the message satisfy the criteria associated with a particular message classification, then it is determined that the message belongs to the particular message classification.

Although, in one embodiment, the contents of the message are used to determine a message's classification, in alternative embodiments, information beyond that contained in the message may be used to determine the message's classification. For example, in one embodiment, a combination of the contents of the message and one or more IP addresses and/or TCP ports indicated in the data packets that contain the message is used to determine the message's classification. For another example, in one embodiment, one or more IP addresses and/or TCP ports indicated in the data packets that contain the message are used to determine the message's classification, regardless of the contents of the message.

In block 338, one or more actions that are associated with the message classification determined in block 336 are performed. If two or more of the actions are associated with a specified order of performance, as indicated by the user-specified input, then those actions are performed in the specified order. If the output of any of the actions is supposed to be provided as input to any of the actions, as indicated by the user-specified input, then the output of the specified action is provided as input to the other specified action.

A variety of different actions may be performed relative to the message. For example, an action might be a "load-balancing" action that specifies one or more parameters. The parameters might include a pointer or reference to a load-balancing algorithm, such as a round-robin algorithm, a weighted round-robin algorithm, or an adaptive load-balancing algorithm. When the "load-balancing" action is performed, the load-balancing algorithm referenced by the action is invoked. Additionally, the parameters might include a pointer or reference to a session identifier locating technique. When the "load-balancing" action is performed, the session identifier locating technique referenced by the action is invoked. If a message contains a session identifier, then the message is sent towards the server application to which the session identifier is mapped.

As a result of the method illustrated in flow diagram 300B, network routers may be configured to perform data traffic load-balancing operations. Different load-balancing algorithms may be used in relation to different types of data traffic. Thus, for example, "purchase order" messages may be distributed among servers according to a first load-balancing algorithm, while "account transaction" messages may be distributed among servers according to a second, different load-balancing algorithm.

3.3 Action Flows

Figure 4:
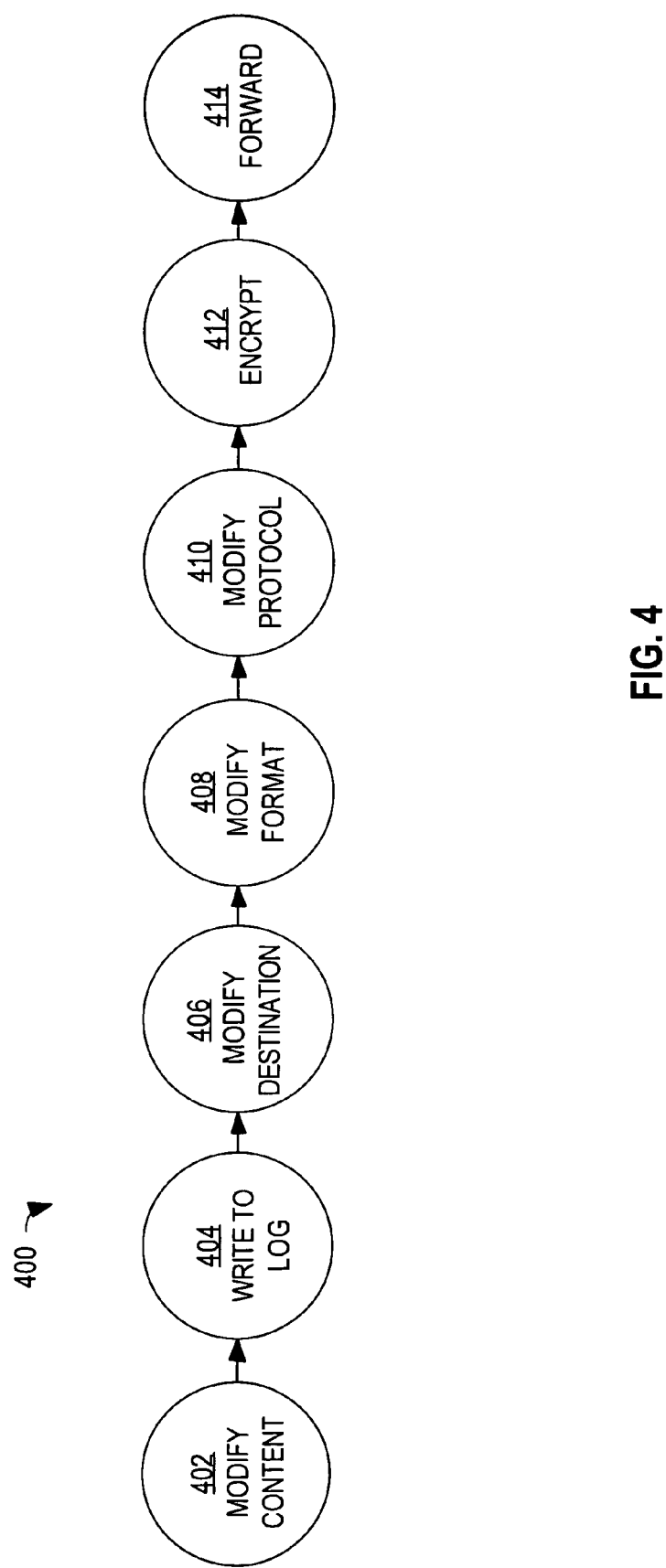
FIG. 4 depicts a sample flow that might be associated with a particular message classification.

FIG. 4 depicts a sample flow 400 that might be associated with a particular message classification. Flow 400 comprises, in order, actions 402-414; other flows may comprise one or more other actions. Action 402 indicates that the content of the message should be modified in a specified manner. Action 404 indicates that a specified event should be written to a specified log. Action 406 indicates that the message's destination should be changed to a specified destination. Action 408 indicates that the message's format should be translated into a specified message format. Action 410 indicates that the application layer protocol used to transmit the message should be changed to a specified application layer protocol. Action 412 indicates that the message should be encrypted using a particular key. Action 414 indicates that the message should be forwarded towards the message's destination.

In other embodiments, any one of actions 402-414 may be performed individually or in combination with any others of actions 402-414.

3.4 AONS Examples

3.4.1 AONS General Overview

Application-Oriented Network Systems (AONS) is a technology foundation for building a class of products that embed intelligence into the network to better meet the needs of application deployment. AONS complements existing networking technologies by providing a greater degree of awareness of what information is flowing within the network and helping customers to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS provides this enhanced support by understanding more about the content and context of information flow. As such, AONS works primarily at the message rather than at the packet level. Typically, AONS processing of information terminates a TCP connection to inspect the full message, including the "payload" as well as all headers. AONS also understands and assists with popular application-level protocols such as HTTP, FTP, SMTP and de facto standard middleware protocols.

AONS differs from middleware products running on general-purpose computing systems in that AONS' behavior is more akin to a network appliance, in its simplicity, total cost of ownership and performance. Furthermore, AONS integrates with network-layer support to provide a more holistic approach to information flow and management, mapping required features at the application layer into low-level networking features implemented by routers, switches, firewalls and other networking systems.

Although some elements of AONS-like functionality are provided in existing product lines from Cisco Systems, Inc., such products typically work off a more limited awareness of information, such as IP/port addresses or HTTP headers, to provide load balancing and failover solutions. AONS provides a framework for broader functional support, a broader class of applications and a greater degree of control and management of application data.

3.4.2 AONS Terminology

An "application" is a software entity that performs a business function either running on servers or desktop systems. The application could be a packaged application, software running on application servers, a legacy application running on a mainframe, or custom or proprietary software developed in house to satisfy a business need or a script that performs some operation. These applications can communicate with other applications in the same department (departmental), across departments within a single enterprise (intra enterprise), across an enterprise and its partners (inter-enterprise or B2B) or an enterprise and its customers (consumers or B2C). AONS provides value added services for any of the above scenarios.

An "application message" is a message that is generated by an application to communicate with another application. The application message could specify the different business level steps that should be performed in handling this message and could be in any of the message formats described in the section below. In the rest of the document, unless otherwise specified explicitly, the term "message" also refers to an application message.

An "AONS node" is the primary AONS component within the AONS system (or network). As described later, the AONS node can take the shape of a client proxy, server proxy or an intermediate device that routes application messages.

Each application message, when received by the first AONS node, gets assigned an AONS message ID and is considered to be an "AONS message" until that message gets delivered to the destination AONS node. The concept of the AONS message exists within the AONS cloud. A single application message may map to more than one AONS message. This may be the case, for example, if the application message requires processing by more than one business function. For example, a "LoanRequest" message that is submitted by a requesting application and that needs to be processed by both a "CreditCheck" application and a "LoanProcessing" application would require processing by more than one business function. In this example, from the perspective of AONS, there are two AONS messages: The "LoanRequest" to the "CreditCheck" AONS message from the requesting application to the CreditCheck application; and the "LoanRequest" to the "LoanProcessing" AONS message from the CreditCheck application to the LoanProcessing Application.

In one embodiment, AONS messages are encapsulated in an AONP (AON Protocol) header and are translated to a "canonical" format. Reliability, logging and security services are provided from an AONS message perspective.

The set of protocols or methods that applications typically use to communicate with each other are called "application access protocols" (or methods) from an AONS perspective. Applications can communicate to the AONS network (typically end point proxies: a client proxy and a server proxy) using any supported application access methods. Some examples of application access protocols include: IBM MQ Series, Java Message Service (JMS), TIBCO, Simple Object Access Protocol (SOAP) over Hypertext Transfer Protocol (HTTP)/HTTPS, and SMTP. Details about various access methods are explained in later sections of this document.

There are a wide variety of "message formats" that are used by applications. These message formats may range from custom or proprietary formats to industry-specific formats to standardized formats. Extensible Markup Language (XML) is gaining popularity as a universal language or message format for applications to communicate with each other. AONS supports a wide variety of these formats.

In addition, AONS provides translation services from one format to another based on the needs of applications. A typical deployment might involve a first AONS node that receives an application message (the client proxy) translating the message to a "canonical" format, which is carried as an AONS message through the AONS network. The server proxy might translate the message from the "canonical" format to the format understood by the receiving application before delivering the message. For understanding some of the non-industry standard formats, a message dictionary may be used.

A node that performs the gateway functionality between multiple application access methods or protocols is called a "protocol gateway." An example of this would be a node that receives an application message through File Transfer Protocol (FTP) and sends the same message to another application as a HTTP post. In AONS, the client and server proxies are typically expected to perform the protocol gateway functionality.

If an application generates a message in Electronic Data Interchange (EDI) format and if the receiving application expects the message to be in an XML format, then the message format needs to be translated but the content of the message needs to be kept intact through the translation. In AONS, the end point proxies typically perform this "message format translation" functionality.

In some cases, even though the sending and receiving application use the same message format, the content needs to be translated for the receiving application. For example, if a United States-resident application is communicating with a United Kingdom-resident application, then the date format in the messages between the two applications might need to be translated (from mm/dd/yyyy to dd/mm/yyyy) even if the applications use the same data representation (or message format). This translation is called "content translation."

3.4.3 AONS Functional Overview

As defined previously, AONS can be defined as network-based intelligent intermediary systems that efficiently and effectively integrate business and application needs with more flexible and responsive network services.

In particular, AONS can be understood through the following characteristics:

AONS operates at a higher layer (layers 5-6) than traditional network element products (layers 2-4). AONS uses message-level inspection as a complement to packet-level inspection—by understanding application messages, AONS adds value to multiple network element products, such as switches, firewalls, content caching systems and load balancers, on the "message exchange route." AONS provides increased flexibility and granularity of network responsiveness in terms of security, reliability, traffic optimization (compression, caching), visibility (business events and network events) and transformation (e.g., from XML to EDI).

AONS is a comprehensive technology platform, not just a point solution. AONS can be implemented through distributed intelligent intermediary systems that sit between applications, middleware, and databases in a distributed intra- and inter-enterprise environment (routing messages, performing transformations, etc.). AONS provides a flexible framework for end user configuration of business flows and policies and partner-driven extensibility of AONS services.

AONS is especially well suited for network-based deployment. AONS is network-based rather than general-purpose server-based. AONS is hybrid software-based and hardware-based (i.e., application-specific integrated circuit (ASIC)/field programmable gate array (FPGA)-based acceleration). AONS uses out-of-band or in-line processing of traffic, as determined by policy. AONS is deployed in standalone products (network appliances) as well as embedded products (service blades for multiple switching, routing, and storage platforms).

3.4.4 AONS System Overview

Figure 7:
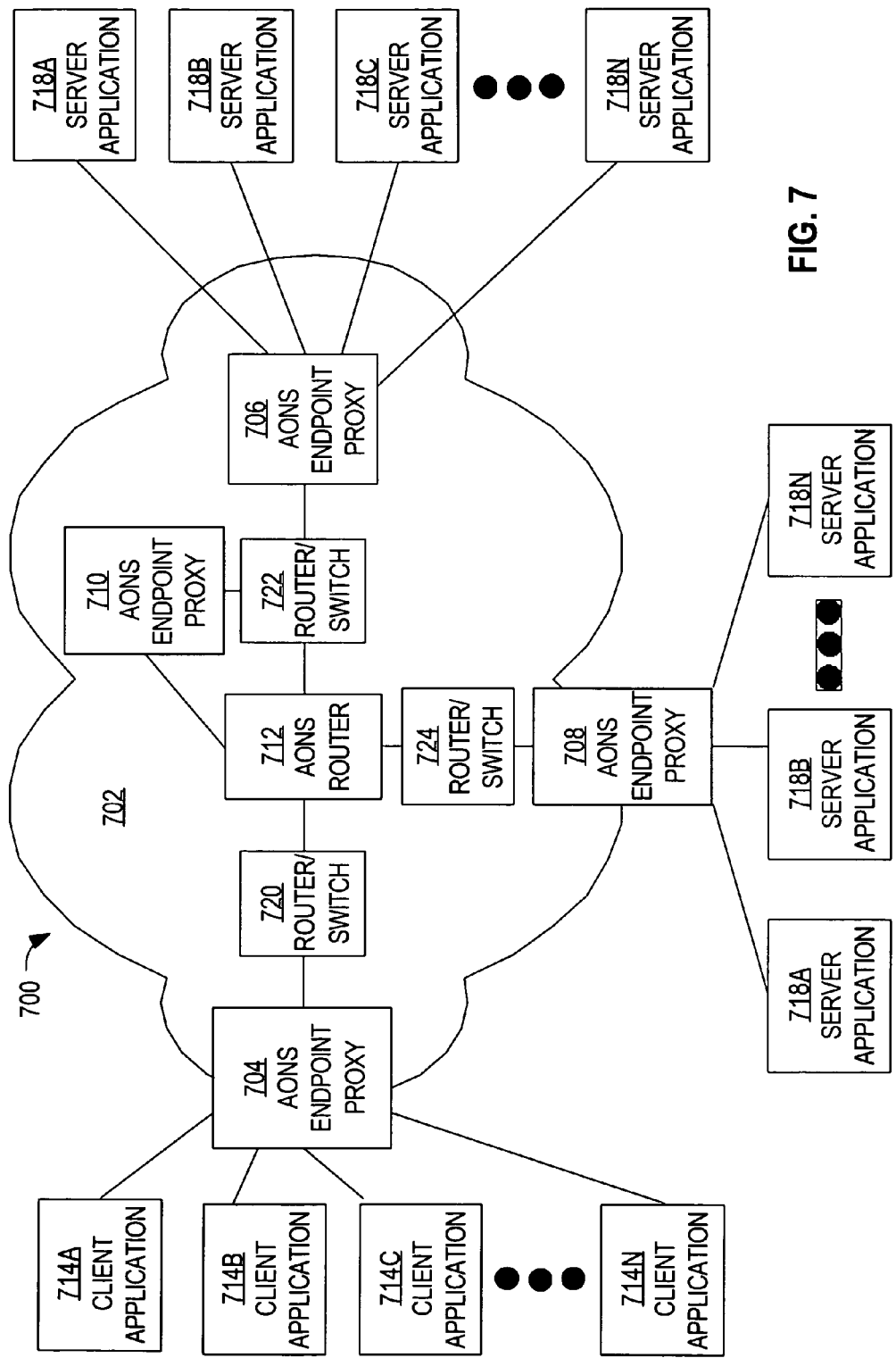
FIG. 7 is a diagram that illustrates the various components involved in an AONS network according to one embodiment.

This section outlines the system overview of an example AONS system. FIG. 7 is a diagram 700 that illustrates the various components involved in an example AONS network 702 according to one embodiment of the invention. The roles performed by each of the nodes are mentioned in detail in subsequent sections.

Within AONS network 702, key building blocks include AONS Endpoint Proxies (AEPs) 704-710 and an AONS Router (AR). Visibility into application intent may begin within AEP 704 placed at the edge of a logical AONS "cloud." As a particular client application of client applications 714A-N attempts to send a message across the network to a particular server application destination of server applications 716A-N and 718A-N, the particular client application will first interact with AEP 704.

AEP 704 serves as either a transparent or explicit messaging gateway which aggregates network packets into application messages and infers the message-level intent by examining the header and payload of a given message, relating the message to the appropriate context, optionally applying appropriate policies (e.g. message encryption, transformation, etc.) and then routing the message towards the message's application destination via a network switch.

AONS Router (AR) 712 may intercept the message en route to the message's destination endpoint. Based upon message header contents, AR 712 may determine that a new route would better serve the needs of a given application system. AR 712 may make this determination based upon enterprise-level policy, taking into account current network conditions. As the message nears its destination, the message may encounter AEP 706, which may perform a final set of operations (e.g. message decryption, acknowledgement of delivery) prior to the message's arrival. In one embodiment, each message is only parsed once: when the message first enters the AONS cloud. It is the first AEP that a message traverses that is responsible for preparing a message for optimal handling within the underlying network.

AEPs 704-708 can further be classified into AEP Client Proxies and AEP Server Proxies to explicitly highlight roles and operations performed by the AEP on behalf of the specific end point applications.

A typical message flow involves a particular client application 714A submitting a message to the AEP Client Proxy (CP) 704 through one of the various access protocols supported by AONS. On receiving this message, AEP CP 704 assigns an AONS message id to the message, encapsulates the message with an AONP header, and performs any necessary operations related to the AONS network (e.g. security and reliability services). Also, if necessary, the message is converted to a "canonical" format by AEP CP 704. The message is carried over a TCP connection to AR 710 along the path to the destination application 718A. The AONS routers along the path perform the infrastructure services necessary for the message and can change the routing based on the policies configured by the customer. The message is received at the destination AEP Server Proxy (SP) 706. AEP SP 706 performs necessary security and reliability functions and translates the message to the format that is understood by the receiving application, if necessary. AEP SP 706 then sends the message to receiving application 718A using any of the access protocols that application 718A and AONS support. A detailed message flow through AONS network 702 is described in later sections.

3.4.5 AONS System Elements

This section outlines the different concepts that are used from an AONS perspective.

An "AEP Client Proxy" is an AONS node that performs the services necessary for applications on the sending side of a message (a client). In the rest of this document, an endpoint proxy also refers to a client or server proxy. The typical responsibilities of the client proxy in processing a message are: message pre-classification & early rejection, protocol management, message identity management, message encapsulation in an AONP header, end point origination for reliable delivery, security end point service origination (encryption, digital signature, authentication), flow selection & execution/infrastructure services (logging, compression, content transformation, etc.), routing—next hop AONS node or destination, AONS node and route discovery/advertising role and routes, and end point origination for the reliable delivery mechanism (guaranteed delivery router).

Not all functionalities described above need to be performed for each message. The functionalities performed on the message are controlled by the policies configured for the AONS node.

An "AEP Server Proxy" is an AONS node that performs the services necessary for applications on the receiving side of a message (a server). In the rest of the document, a Server Proxy may also be referred as an end point proxy. The typical responsibilities of the Server Proxy in processing a message are: protocol management, end point termination for reliable delivery, security end point service termination (decryption, verification of digital signature, etc.), flow selection & execution/infrastructure services (logging, compression, content translation, etc.), message de-encapsulation in AONP header, acknowledgement to sending AONS node, application routing/request message delivery to destination, response message correlation, and routing to entry AONS node.

Note that not all the functionalities listed above need to be performed for each message. The functionalities performed on the message are controlled by the policies configured for the AONS node and what the message header indicates.

An "AONS Router" is an AONS node that provides message-forwarding functionalities along with additional infrastructure services within an AONS network. An AONS Router communicates with Client Proxies, Server Proxies and other AONS Routers. An AONS Router may provide service without parsing a message; an AONS Router may rely on an AONP message header and the policies configured in the AONS network instead of parsing messages. An AONS Router provides the following functionalities: scalability in the AONS network in terms of the number of TCP connections needed; message routing based on message destination, policies configured in the AONS cloud, a route specified in the message, and/or content of the message; a load at the intended destination—re-routing if needed; availability of the destination—re-routing if needed; cost of transmission (selection among multiple service providers); and infrastructure services such as sending to a logging facility, sending to a storage area network (SAN) for backup purposes, and interfacing to a cache engine for cacheable messages (like catalogs).

AONS Routers do not need to understand any of the application access protocols and, in one embodiment, deal only with messages encapsulated with an AONP header.

Application-Oriented Networking Protocol (AONP) is a protocol used for communication between the nodes in an AONS network. In one embodiment, each AONS message carries an AONP header that conveys the destination of the message and additional information for processing the message in subsequent nodes. AONP also addresses policy exchange (static or dynamic), fail-over among nodes, load balancing among AONS nodes, and exchange of routing information. AONP also enables application-oriented message processing in multiple network elements (like firewalls, cache engines and routers/switches). AONP supports both a fixed header and a variable header (formed using type-length-value (TLV) fields) to support efficient processing in intermediate nodes as well as flexibility for additional services.

Unless explicitly specified otherwise, "router" or "switch" refers herein to a typical Layer 3 or Layer 2 switch or a router that is currently commercially available.

3.4.6 AONS Example Features

In one embodiment, an underlying "AONS foundation platform of subsystem services" (AOS) provides a range of general-purpose services including support for security, compression, caching, reliability, policy management and other services. On top of this platform, AONS then offers a range of discreet functional components that can be wired together to provide the overall processing of incoming data traffic. These "Bladelets™" are targeted at effecting individual services in the context of the specific policy or action demanded by the application or the information technology (IT) manager. A series of access method adaptors ensure support for a range of ingress and egress formats. Finally, a set of user-oriented tools enable managers to appropriately view, configure and set policies for the AONS solution. These four categories of functions combine to provide a range of end-customer capabilities including enhanced security, infrastructure optimization, business continuity, application integration and operational visibility.

The enhanced visibility and enhanced responsiveness enabled by AONS solutions provides a number of intelligent, application-oriented network services. These intelligent services can be summarized in four primary categories:

Enhanced security and reliability: enabling reliable message delivery and providing message-level security in addition to existing network-level security.

Infrastructure optimization: making more efficient use of network resources by taking advantage of caching and compression at the message level as well as by integrating application and network quality-of-service (QoS).

Business and infrastructure activity monitoring and management: by reading information contained in the application layer message, AONS can log, audit, and manage application-level business events, and combine these with network, server, and storage infrastructure events in a common, policy-driven management environment.

Content-based routing and transformation: message-based routing and transformation of protocol, content, data, and message formats (e.g., XML transformation). The individual features belonging to each of these primary categories are described in greater detail below.

3.4.6.1 Enhanced Security and Reliability

Authentication: AONS can verify the identity of the sender of an inbound message based upon various pieces of information contained within a given message (username/password, digital certificate, Security Assertion Markup Language (SAML) assertion, etc.), and, based upon these credentials, determine whether or not the message should be processed further.

Authorization: Once principal credentials are obtained via message inspection, AONS can determine what level of access the originator of the message should have to the services it is attempting to invoke. AONS may also make routing decisions based upon such derived privileges or block or mask certain data elements within a message once it's within an AONS network as appropriate.

Encryption/Decryption: Based upon policy, AONS can perform encryption of message elements (an entire message, the message body or individual elements such as credit card number) to maintain end-to-end confidentiality as a message travels through the AONS network. Conversely, AONS can perform decryption of these elements prior to arrival at a given endpoint.

Digital Signatures: In order to ensure message integrity and allow for non-repudiation of message transactions, AONS can digitally sign entire messages or individual message elements at any given AEP. The decision as to what gets signed will be determined by policy as applied to information derived from the contents and context of each message.

Reliability: AONS can complement existing guaranteed messaging systems by intermediating between unlike proprietary mechanisms. It can also provide reliability for HTTP-based applications (including web services) that currently lack reliable delivery. As an additional feature, AONS can generate confirmations of successful message delivery as well as automatically generate exception responses when delivery cannot be confirmed.

3.4.6.2 Infrastructure Optimization

Compression: AEPs can compress message data prior to sending the message data across the network in order to conserve bandwidth and conversely decompress it prior to endpoint delivery.

Caching: AONS can cache the results of previous message inquires based upon the rules defined for a type of request or based upon indicators set in the response. Caching can be performed for entire messages or for certain elements of a message in order to reduce application response time and conserve network bandwidth utilization. Message element caching enables delta processing for subsequent message requests.

TCP Connection Pooling: By serving as an intermediary between message clients and servers AONS can consolidate the total number of persistent connections required between applications. AONS thereby reduces the client and server-processing load otherwise associated with the ongoing initiation and teardown of connections between a mesh of endpoints.

Batching: An AONS intermediary can batch transactional messages destined for multiple destinations to reduce disk I/O overheads on the sending system. Similarly, transactional messages from multiple sources can be batched to reduce disk I/O overheads on the receiving system.

Hardware Acceleration: By efficiently performing compute-intensive functions such as encryption and Extensible Stylesheet Language Transformation (XSLT) transformations in an AONS network device using specialized hardware, AONS can offload the computing resources of endpoint servers, providing potentially lower-cost processing capability.

Quality of Service: AONS can integrate application-level QoS with network-level QoS features based on either explicit message prioritization (e.g., a message tagged as "high priority") or via policy that determines when a higher quality of network service is required for a message as specific message content is detected.

Policy Enforcement: At the heart of optimizing the overall AONS solution is the ability to ensure business-level polices are expressed, implemented and enforced by the infrastructure. The AONS Policy Manager ensures that once messages are inspected, the appropriate actions (encryption, compression, routing, etc.) are taken against that message as appropriate.

3.4.6.3 Activity Monitoring and Management

Auditing/Logging/Metering: AONS can selectively filter messages and send them to a node or console for aggregation and subsequent analysis. Tools enable viewing and analysis of message traffic. AONS can also generate automatic responses to significant real-time events, both business and infrastructure-related. By intelligently gathering statistics and sending them to be logged, AONS can produce metering data for auditing or billing purposes.

Management: AONS can combine both message-level and network infrastructure level events to gain a deeper understanding of overall system health. The AONS management interface itself is available as a web service for those who wish to access it programmatically.

Testing and Validation: AONS' ability to intercept message traffic can be used to validate messages before allowing them to reach destination applications. In addition to protecting from possible application or server failures, this capability can be leveraged to test new web services and other functions by examining actual message flow from clients and servers prior to production deployment. AONS also provides a "debug mode" that can be turned on automatically after a suspected failure or manually after a notification to assist with the overall management of the device.

Workload Balancing and Failover: AONS provides an approach to workload balancing and failover that is both policy- and content-driven. For example, given an AONS node's capability to intermediate between heterogeneous systems, the AONS node can balance between unlike systems that provide access to common information as requested by the contents of a message. AONS can also address the issue of message affinity necessary to ensure failover at the message rather than just the session level as is done by most existing solutions. Balancing can also take into account the response time for getting a message reply, routing to an alternate destination if the preferred target is temporarily slow to respond.

Business Continuity: By providing the ability to replicate inbound messages to a remote destination, AONS enables customers to quickly recover from system outages. AONS can also detect failed message delivery and automatically re-route to alternate endpoints. AONS AEPs and ARs themselves have built-in redundancy and failover at the component level and can be clustered to ensure high availability.

3.4.6.4 Content-Based Routing and Transformation

Content-based Routing: Based upon its ability to inspect and understand the content and context of a message, AONS provides the capability to route messages to an appropriate destination by matching content elements against pre-established policy configurations. This capability allows AONS to provide a common interface (service virtualization) for messages handled by different applications, with AONS examining message type or fields in the content (part number, account type, employee location, customer zip code, etc.) to route the message to the appropriate application. This capability also allows AONS to send a message to multiple destinations (based on either statically defined or dynamic subscriptions to message types or information topics), with optimal fan-out through AONS routers. This capability further allows AONS to redirect all messages previously sent to an application so that it can be processed by a new application. This capability additionally allows AONS to route a message for a pre-processing step that is deemed to be required before receipt of a message (for example, introducing a management pre-approval step for all travel requests). Thus capability also allows AONS to route a copy of a message that exceeds certain criteria (e.g. value of order) to an auditing system, as well as forwarding the message to the intended destination. This capability further allows AONS to route a message to a particular server for workload or failover reasons. This capability also allows AONS to route a message to a particular server based on previous routing decisions (e.g., routing a query request based on which server handled for the original order). This capability additionally allows AONS to route based on the source of a message. This capability also allows AONS to route a message through a sequence of steps defined by a source or previous intermediary.

Message Protocol Gateway: AONS can act as a gateway between applications using different transport protocols. AONS supports open standard protocols (e.g. HTTP, FTP, SMTP), as well as popular or de facto standard proprietary protocols such as IBM Websphere MQ.

Message Transformations: AONS can transform the contents of a message to make them appropriate for a particular receiving application. This can be done for both XML and non-XML messages, the latter via the assistance of either a message dictionary definition or a well-defined industry standard format.

3.4.7 AONS Functional Modules

Figure 8:
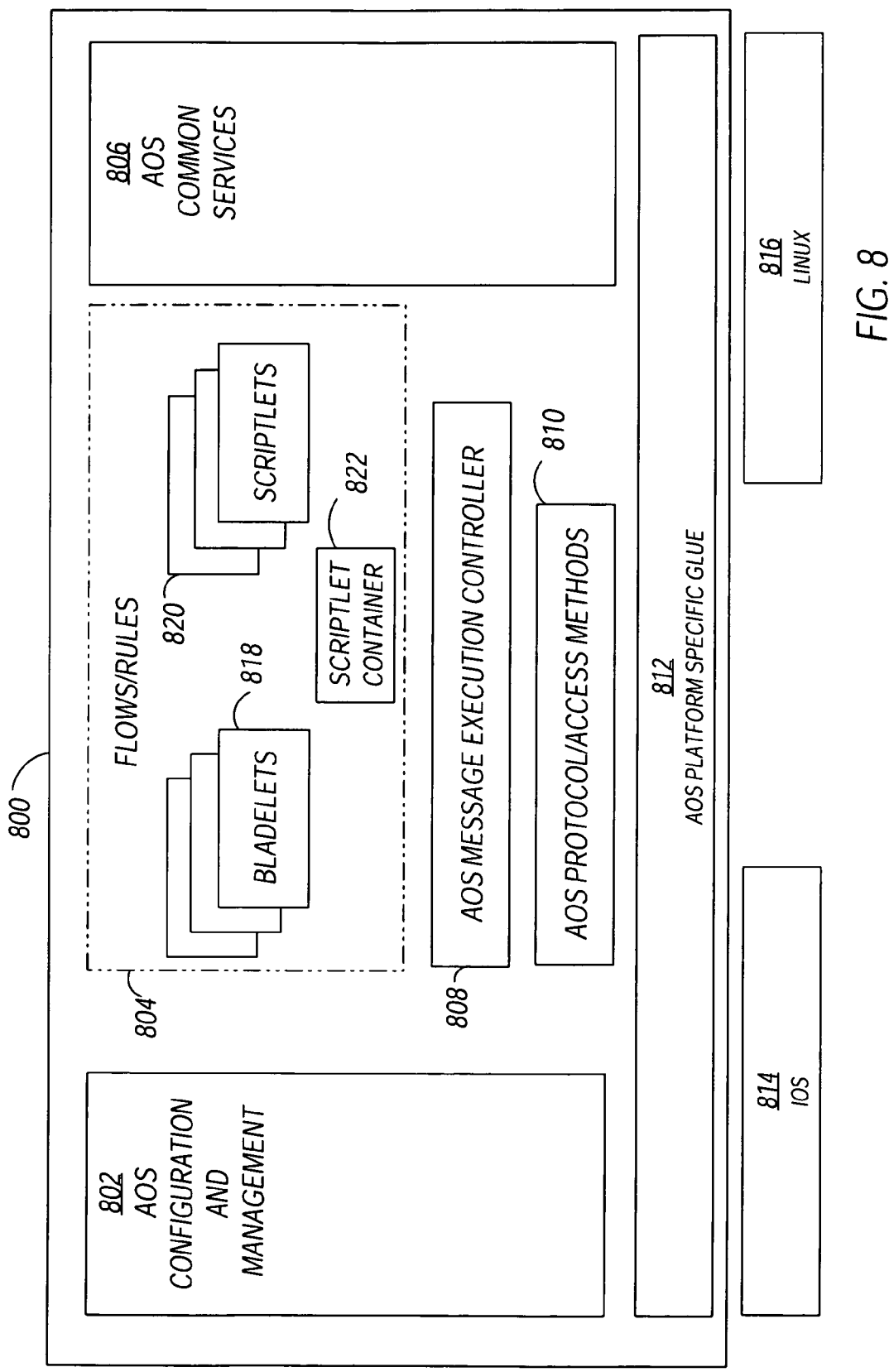
FIG. 8 is a block diagram that depicts functional modules within an example AONS node.

FIG. 8 is a block diagram that depicts functional modules within an example AONS node. AONS node 800 comprises AOS configuration and management module 802, flows/rules 804, AOS common services 806, AOS message execution controller 808, AOS protocol access methods 810, and AOS platform-specific "glue" 812. AONS node 800 interfaces with Internetworking Operating System (IOS) 814 and Linux Operating System 816. Flows/rules 804 comprise Bladelets™ 818, Scriptlets™ 820, and Scriptlet™ container 822.

In one embodiment, AOS common services 806 include: security services, standard compression services, delta compression services, caching service, message logging service, policy management service, reliable messaging service, publish/subscribe service, activity monitoring service, message distribution service, XML parsing service, XSLT transformation service, and QoS management service.

In one embodiment, AOS protocol/access methods 810 include: TCP/SSL, HTTP/HTTPS, SOAP/HTTP, SMTP, FTP, JMS/MQ and JMS/RV, and Java Database Connectivity (JDBC).

In one embodiment, AOS message execution controller 808 includes: an execution controller, a flow subsystem, and a Bladelet™ subsystem.

In one embodiment, AOS Bladelets™ 818 and Scriptlets™ 820 include: message input (read message), message output (send message), logging/audit, decision, external data access, XML parsing, XML transformation, caching, scriptlet container, publish, subscribe, message validation (schema, format, etc.), filtering/masking, signing, authentication, authorization, encryption, decryption, activity monitoring sourcing, activity monitoring marking, activity monitoring processing, activity monitoring notification, message discard, firewall block, firewall unblock, message intercept, and message stop-intercept.

In one embodiment, AOS configuration and management module 802 includes: configuration, monitoring, topology management, capability exchange, failover redundancy, reliability/availability/serviceability (RAS) services (tracing, debugging, etc.), archiving, installation, upgrades, licensing, sample Scriptlets™, sample flows, documentation, online help, and language localization.

In one embodiment, supported platforms include: Cisco Catalyst 6503, Cisco Catalyst 6505, Cisco Catalyst 6509, and Cisco Catalyst 6513. In one embodiment, supported supervisor modules include: Sup2 and Sup720. In one embodiment, specific functional areas relating to the platform include: optimized TCP, SSL, public key infrastructure (PKI), encryption/decryption, interface to Cat6K supervisor, failover/redundancy, image management, and QoS functionality.

3.4.8 AONS Modes of Operation

AONS may be configured to run in multiple modes depending on application integration needs, and deployment scenarios. According to one embodiment, the primary modes of operation include implicit mode, explicit mode, and proxy mode. In implicit mode, an AONS node transparently intercepts relevant traffic with no changes to applications. In explicit mode, applications explicitly address traffic to an intermediary AONS node. In proxy mode, applications are configured to work in conjunction with AONS nodes, but applications do not explicitly address traffic to AONS nodes.

In implicit mode, applications are unaware of AONS presence. Messages are address to receiving applications. Messages are redirected to AONS via configuration of application "proxy" or middleware systems to route messages to AONS, and/or via configuration of networks (packet interception). For example, domain name server (DNS)-based redirection could be used to route messages. For another example, a 5-tuple-based access control list (ACL) on a switch or router could be used. Network-based application recognition and content switching modules may be configured for URL/URI redirection. Message-based inspection may be used to determine message types and classifications. In implicit mode, applications communicate with each other using AONS as an intermediary (implicitly), using application-native protocols.

Figure 9:
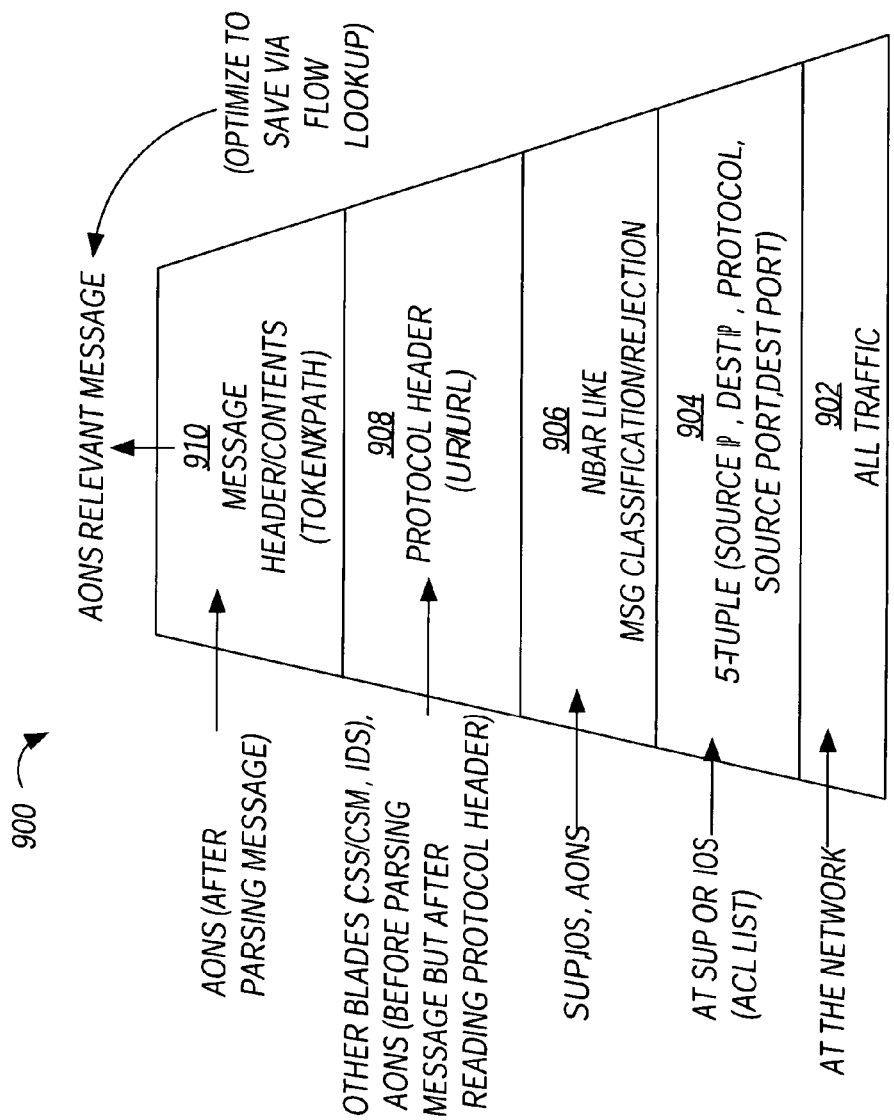
FIG. 9 is a diagram that shows multiple tiers of filtering that may be performed on message traffic in order to produce only a select set of traffic that will be processed at the AONS layer.

Traffic redirection, message classification, and "early rejection" (sending traffic out of AONS layers prior to complete processing within AONS layers) may be accomplished via a variety of mechanisms, such as those depicted in FIG. 9. FIG. 9 shows multiple tiers of filtering that may be performed on message traffic in order to produce only a select set of traffic that will be processed at the AONS layer. Traffic that is not processed at the AONS layer may be treated as any other traffic.

At the lowest layer, layer 902, all traffic passes through. At the next highest layer, layer 904, traffic may be filtered based on 5-tuples. A supervisor blade or Internetwork Operating System (IOS) may perform such filtering. Traffic that passes the filters at layer 904 passes to layer 906. At layer 906, traffic may be further filtered based on network-based application recognition-like filtering and/or message classification and rejection. Traffic that passes the filters at layer 906 passes to layer 908. At layer 908, traffic may be further filtered based on protocol headers. For example, traffic may be filtered based on URLs/URIs in the traffic. Traffic that passes the filters at layer 908 passes to layer 910. At layer 910, traffic may be processed based on application layer messages, include headers and contents. For example, XPath paths within messages may be used to process traffic at layer 910. An AONS blade may perform processing at layer 910. Thus, a select subset of all network traffic may be provided to an AONS blade.

In explicit mode, applications are aware of AONS presence. Messages are explicitly addressed to AONS nodes. Applications may communicate with AONS using AONP. AONS may perform service virtualization and destination selection.

In proxy mode, applications are explicitly unaware of AONS presence. Messages are addressed to their ultimate destinations (i.e., applications). However, client applications are configured to direct traffic via a proxy mode.

3.4.9 AONS Message Routing

Components of message management in AONS may be viewed from two perspectives: a node view and a cloud view.

Figure 10:
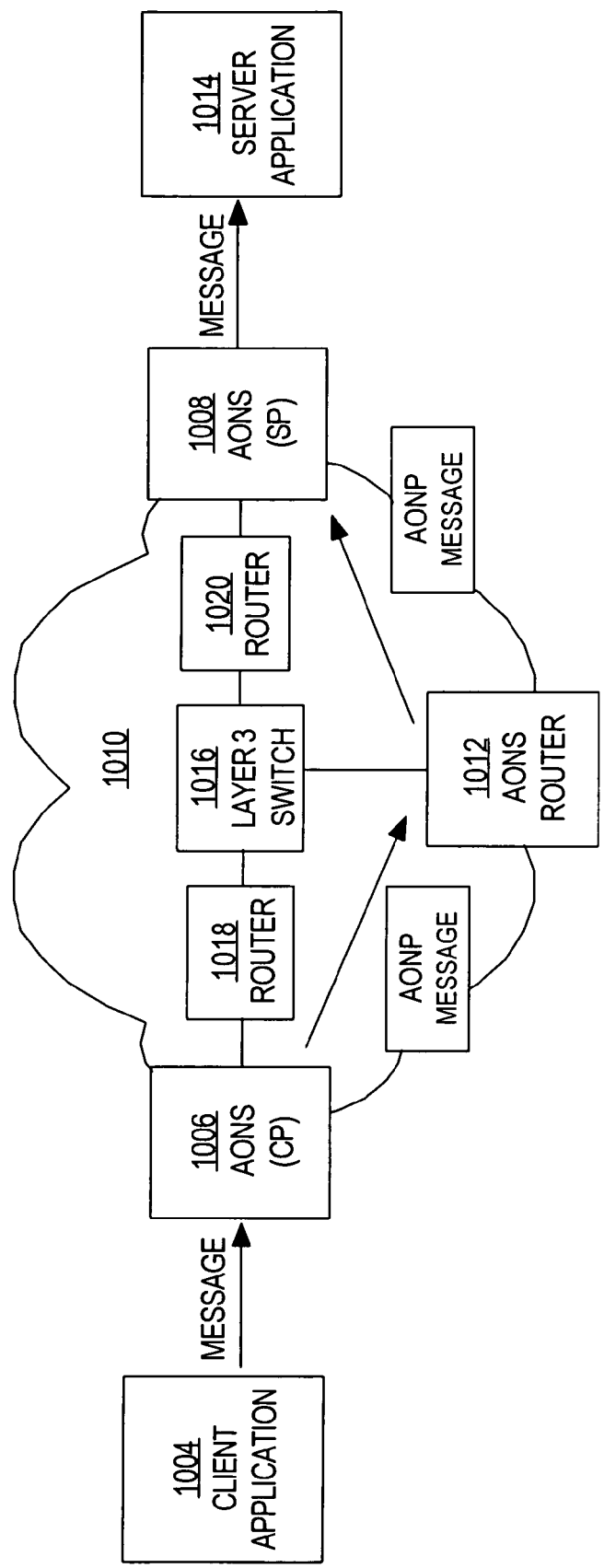
FIG. 10 is a diagram that illustrates the path of a message within an AONS cloud according to a cloud view.

FIG. 10 is a diagram that illustrates the path of a message within an AONS cloud 1010 according to a cloud view. A client application 1004 sends a message to an AONS Client Proxy (CP) 1006. If AONS CP 1006 is not present, then client application 1004 may send the message to an AONS Server Proxy (SP) 1008. The message is processed at AONS CP 1006. AONS CP 1006 transforms the message into AONP format if the message is entering AONS cloud 1010.

Within AONS cloud 1010, the message is routed using AONP. Thus, using AONP, the message may be routed from AONS CP 1006 to an AONS router 1012, or from AONS CP 1006 to AONS SP 1008, or from AONS router 1012 to another AONS router, or from AONS router 1012 to AONS SP 1008. Messages processed at AONS nodes are processed in AONP format.

When the message reaches AONS SP 1008, AONS SP 1008 transforms the message into the message format used by server application 1014. AONS SP 1008 routes the message to server application 1014 using the message protocol of server application 1014. Alternatively, if AONS SP 1008 is not present, AONS CP 1006 may route the message to server application 1014.

The details of the message processing within AONS cloud 1010 can be understood via the following perspectives: Request/Response Message Flow, One-Way Message Flow, Message Flow with Reliable Delivery, and Node-to-Node Communication.

Figure 11A:
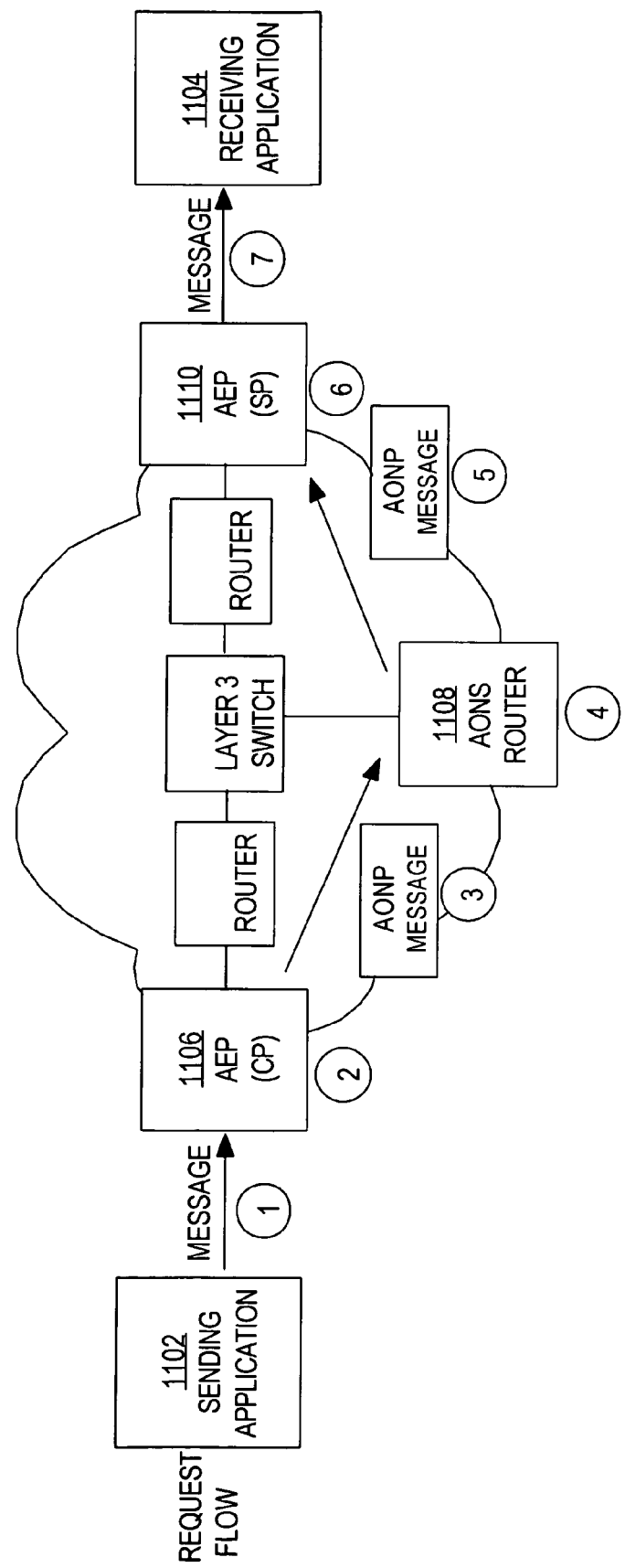
FIG. 11A and FIG. 11B are diagrams that illustrate a request/response message flow.
Figure 11B:
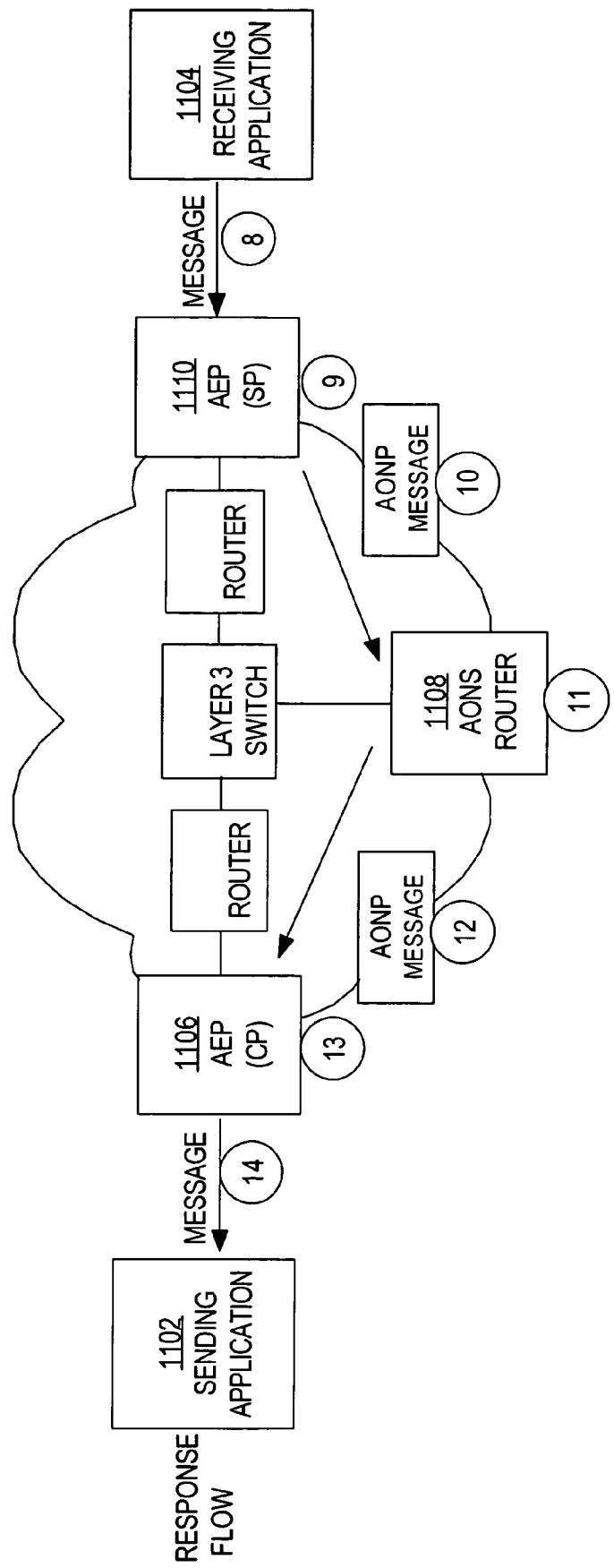

FIG. 11A and FIG. 11B are diagrams that illustrate a request/response message flow. Referring to FIG. 11A, at circumscribed numeral 1, a sending application 1102 sends a message towards a receiving application 1104. At circumscribed numeral 2, an AEP CP 1106 intercepts the message and adds an AONP header to the message, forming an AONP message. At circumscribed numeral 3, AEP CP 1106 sends the AONP message to an AONS router 1108. At circumscribed numeral 4, AONS router 1108 receives the AONP message. At circumscribed numeral 5, AONS router 1108 sends the AONP message to an AEP SP 1110. At circumscribed numeral 6, AEP SP 1110 receives the AONP message and removes the AONP header from the message, thus decapsulating the message. At circumscribed numeral 7, AEP SP 1110 sends the message to receiving application 1104.

Referring to FIG. 11B, at circumscribed numeral 8, receiving application 1104 sends a response message toward sending application 1102. At circumscribed numeral 9, AEP SP 1110 intercepts the message and adds an AONP header to the message, forming an AONP message. At circumscribed numeral 10, AEP SP 1110 sends the AONP message to AONS router 1108. At circumscribed numeral 11, AONS router 1108 receives the AONP message. At circumscribed numeral 12, AONS router 1108 sends the AONP message to AEP CP 1106. At circumscribed numeral 13, AEP CP 1106 receives the AONP message and removes the AONP header from the message, thus decapsulating the message. At circumscribed numeral 14, AEP CP 1106 sends the message to sending application 1102. Thus, a request is routed from sending application 1102 to receiving application 1104, and a response is routed from receiving application 1104 to sending application 1102.

Figure 12A:
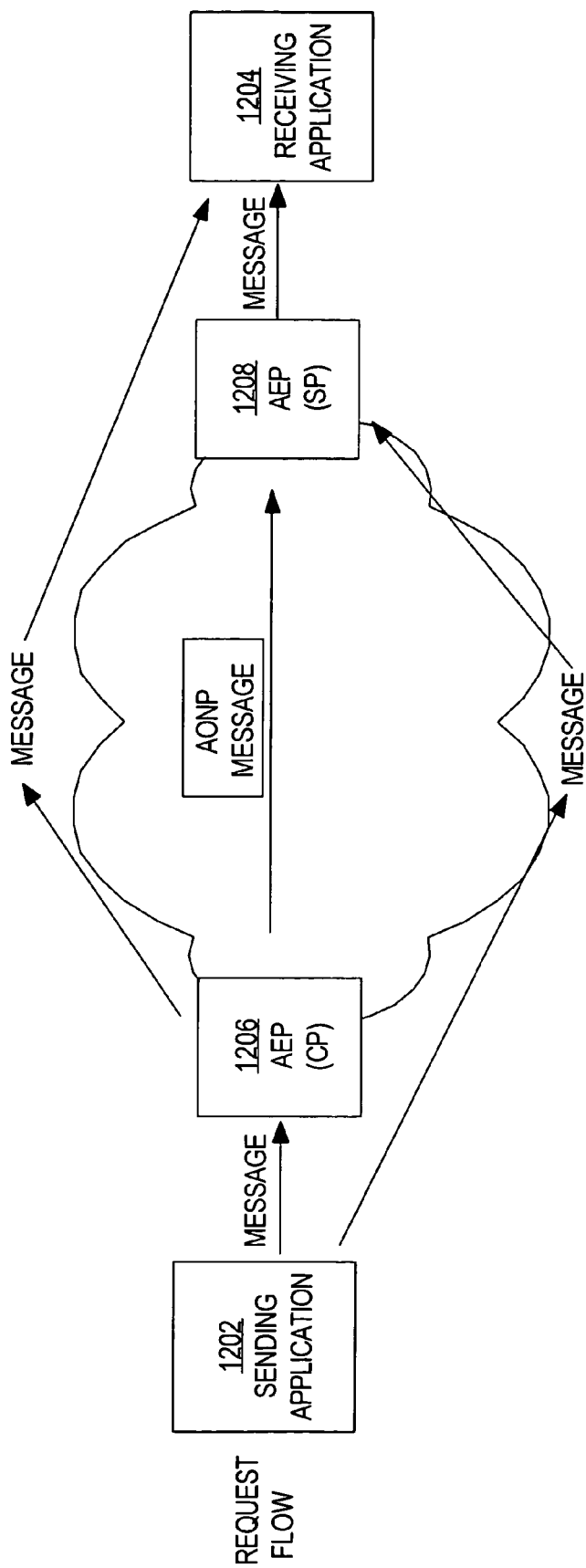
FIG. 12A and FIG. 12B are diagrams that illustrate alternative request/response message flows.
Figure 12B:
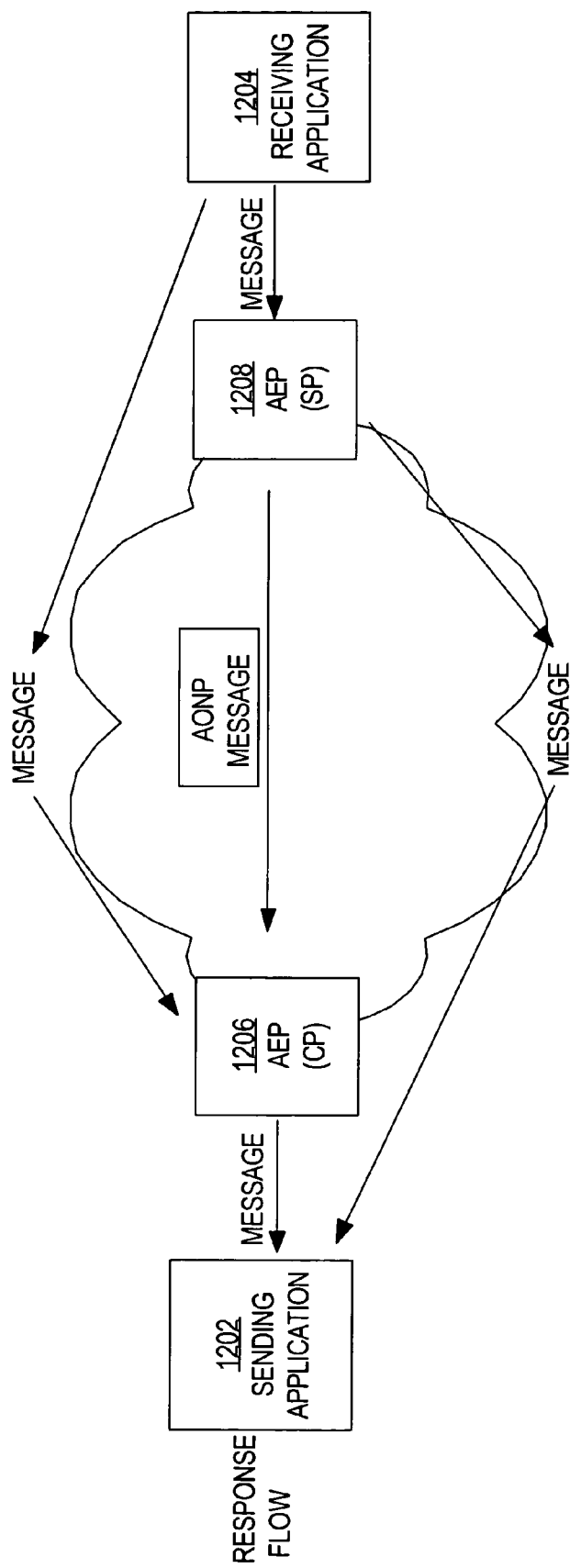

FIG. 12A and FIG. 12B are diagrams that illustrate alternative request/response message flows. FIG. 12A shows three possible routes that a message might take from a sending application 1202 to a receiving application 1204. According to a first route, sending application 1202 sends the message toward receiving application 1204, but an AEP CP 1206 intercepts the message and sends the message to receiving application 1204. According to a second route, sending application 1202 sends the message toward receiving application 1204, but AEP CP 1206 intercepts the message, encapsulates the message within an AONP message, and sends the AONP message to an AEP SP 1208, which decapsulates the message from the AONP message and sends the message to receiving application 1204. According to a third route, sending application 1202 sends the message toward receiving application 1204, but AEP SP 1208 intercepts the message and sends the message to receiving application 1204.

FIG. 12B shows three possible routes that a response message might take from receiving application 1204 to sending application 1202. According to a first route, receiving application 1204 sends the message toward sending application 1202, but AEP CP 1206 intercepts the message and sends the message to sending application 1204. According to a second route, receiving application 1204 sends the message toward sending application 1202, but AEP SP 1208 intercepts the message, encapsulates the message within an AONP message, and sends the AONP message to AEP CP 1206, which decapsulates the message from the AONP message and sends the message to sending application 1202. According to a third route, receiving application 1204 sends the message toward sending application 1202, but AEP SP 1208 intercepts the message and sends the message to sending application 1202.

Figure 13:
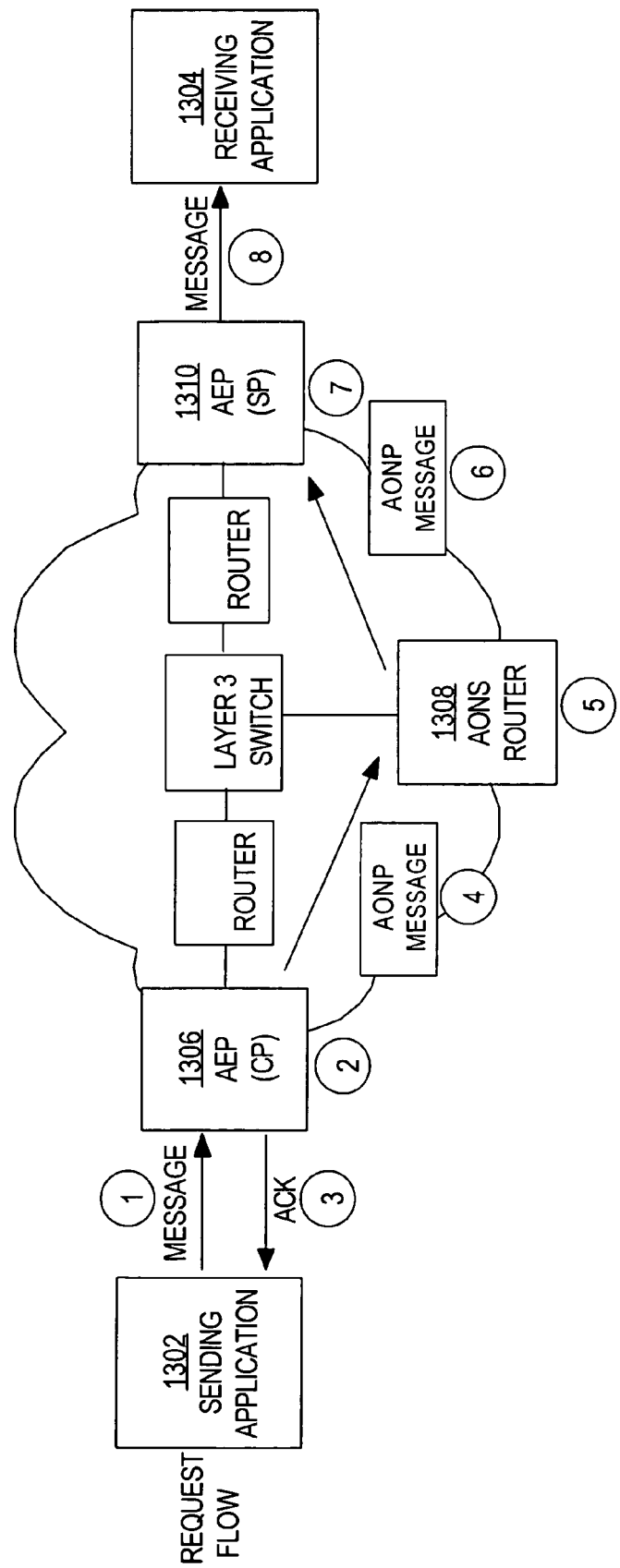
FIG. 13 is a diagram that illustrates a one-way message flow.

FIG. 13 is a diagram that illustrates a one-way message flow. At circumscribed numeral 1, a sending application 1302 sends a message towards a receiving application 1304. At circumscribed numeral 2, an AEP CP 1306 intercepts the message and adds an AONP header to the message, forming an AONP message. At circumscribed numeral 3, AEP CP 1306 sends an ACK (acknowledgement) back to sending application 1302. At circumscribed numeral 4, AEP CP 1306 sends the AONP message to an AONS router 1308. At circumscribed numeral 5, AONS router 1308 receives the AONP message. At circumscribed numeral 6, AONS router 1308 sends the AONP message to an AEP SP 1310. At circumscribed numeral 7, AEP SP 1310 receives the AONP message and removes the AONP header from the message, thus decapsulating the message. At circumscribed numeral 8, AEP SP 1310 sends the message to receiving application 1304.

Figure 14:
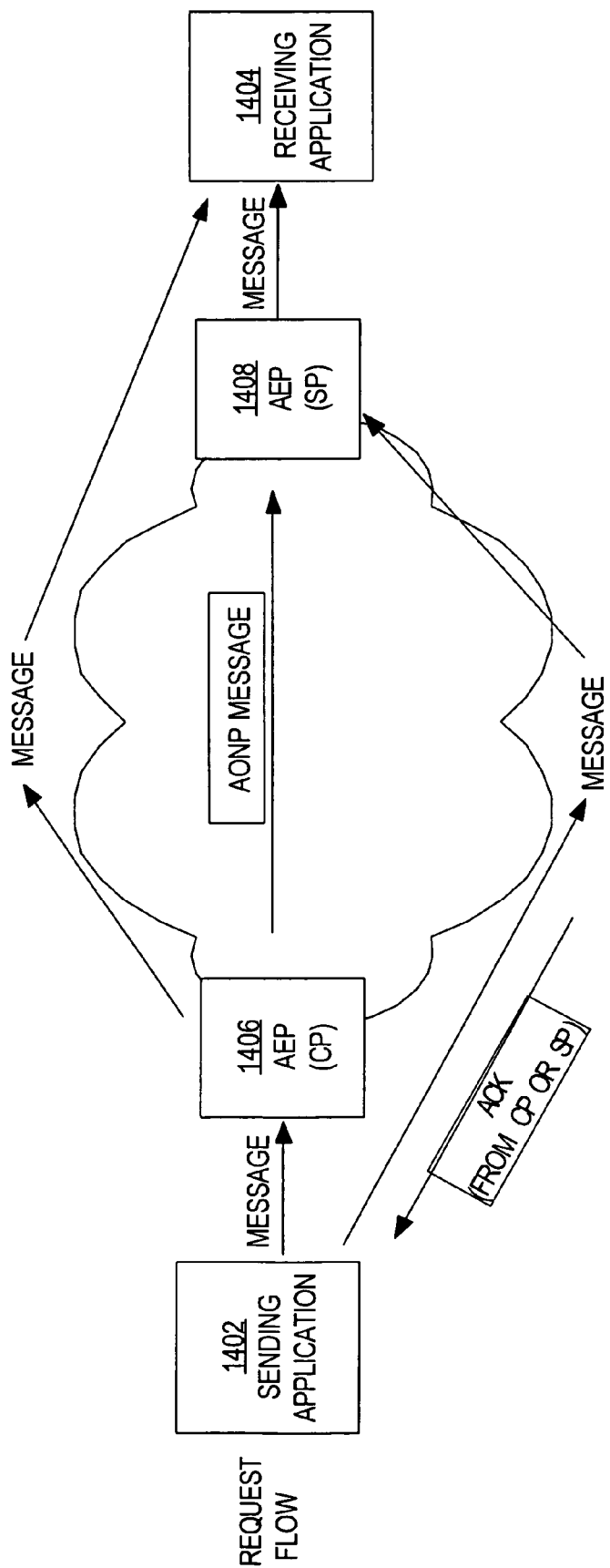
FIG. 14 is a diagram that illustrates alternative one-way message flows.

FIG. 14 is a diagram that illustrates alternative one-way message flows. FIG. 14 shows three possible routes that a message might take from a sending application 1402 to a receiving application 1404. According to a first route, sending application 1402 sends the message toward receiving application 1404, but an AEP CP 1406 intercepts the message and sends the message to receiving application 1404. AEP CP 1406 sends an ACK (acknowledgement) to sending application 1402. According to a second route, sending application 1402 sends the message toward receiving application 1404, but AEP CP 1406 intercepts the message, encapsulates the message within an AONP message, and sends the AONP message to an AEP SP 1408, which decapsulates the message from the AONP message and sends the message to receiving application 1404. Again, AEP CP 1406 sends an ACK to sending application 1402. According to a third route, sending application 1402 sends the message toward receiving application 1404, but AEP SP 1408 intercepts the message and sends the message to receiving application 1404. In this case, AEP SP 1408 sends an ACK to sending application 1402. Thus, when an AEP intercepts a message, the intercepting AEP sends an ACK to the sending application.

According to one embodiment, AONP is used in node-to-node communication with the next hop. In one embodiment, AONP uses HTTP. AONP headers may include HTTP or TCP headers. AONP may indicate RM ACK, QoS level, message priority, and message context (connection, message sequence numbers, message context identifier, entry node information, etc.). The actual message payload is in the message body. Asynchronous messaging may be used between AONS nodes. AONS may conduct route and node discovery via static configuration (next hop) and/or via dynamic discovery and route advertising ("lazy" discovery).

Figure 15A:
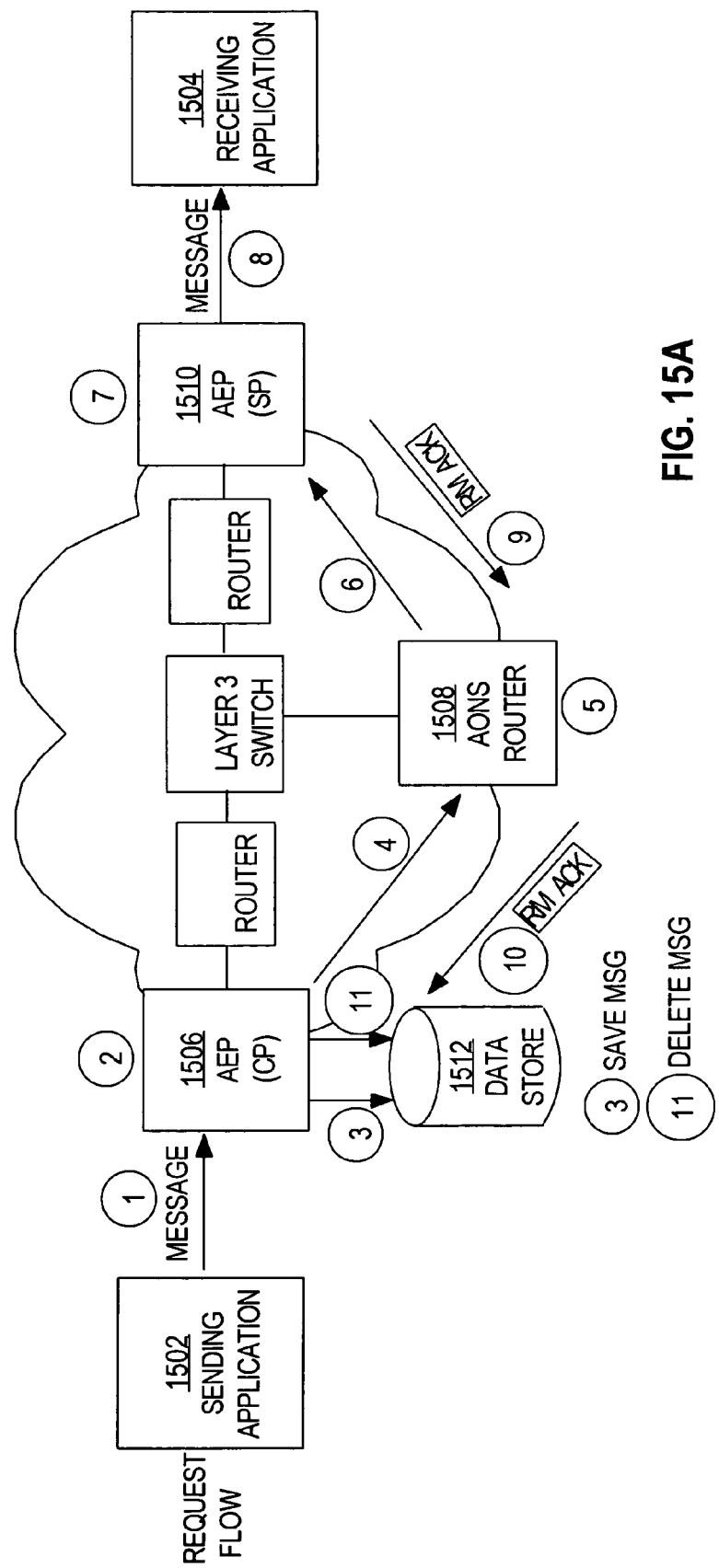
FIG. 15A and FIG. 15B are diagrams that illustrate a request/response message flow with reliable message delivery.
Figure 15B:
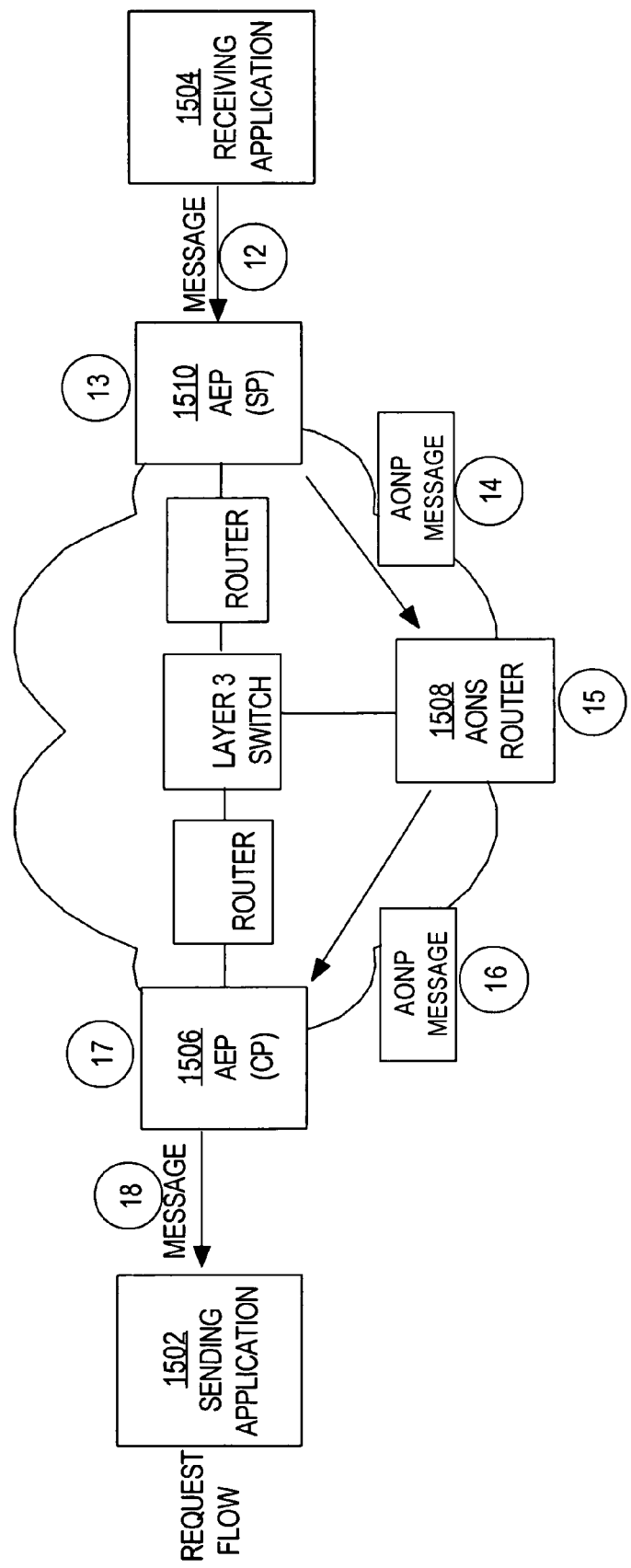

FIG. 15A and FIG. 15B are diagrams that illustrate a request/response message flow with reliable message delivery. Referring to FIG. 15A, at circumscribed numeral 1, a sending application 1502 sends a message towards a receiving application 1504. At circumscribed numeral 2, an AEP CP 1506 intercepts the message and adds an AONP header to the message, forming an AONP message. At circumscribed numeral 3, AEP CP 1506 saves the message to a data store 1512. Thus, if there are any problems with sending the message, AEP CP 1506 can resend the copy of the message that is stored in data store 1512.

At circumscribed numeral 4, AEP CP 1506 sends the AONP message to an AONS router 1508. At circumscribed numeral 5, AONS router 1508 receives the AONP message. At circumscribed numeral 6, AONS router 1508 sends the AONP message to an AEP SP 1510. At circumscribed numeral 7, AEP SP 1510 receives the AONP message and removes the AONP header from the message, thus decapsulating the message. At circumscribed numeral 8, AEP SP 1510 sends the message to receiving application 1504.

At circumscribed numeral 9, AEP SP 1510 sends a reliable messaging (RM) acknowledgement (ACK) to AONS router 1508. At circumscribed numeral 10, AONS router 1508 receives the RM ACK and sends the RM ACK to AEP CP 1506. At circumscribed numeral 11, AEP CP 1506 receives the RM ACK and, in response, deletes the copy of the message that is stored in data store 1512. Because the delivery of the message has been acknowledged, there is no further need to store a copy of the message in data store 1512. Alternatively, if AEP CP 1506 does not receive the RM ACK within a specified period of time, then AEP CP 1506 resends the message.

Referring to FIG. 15B, at circumscribed numeral 12, receiving application 1504 sends a response message toward sending application 1502. At circumscribed numeral 13, AEP SP 1510 intercepts the message and adds an AONP header to the message, forming an AONP message. At circumscribed numeral 14, AEP SP 1510 sends the AONP message to AONS router 1508. At circumscribed numeral 15, AONS router 1508 receives the AONP message. At circumscribed numeral 16, AONS router 1508 sends the AONP message to AEP CP 1506. At circumscribed numeral 17, AEP CP 1506 receives the AONP message and removes the AONP header from the message, thus decapsulating the message. At circumscribed numeral 18, AEP CP 1506 sends the message to sending application 1502.

Figure 16:
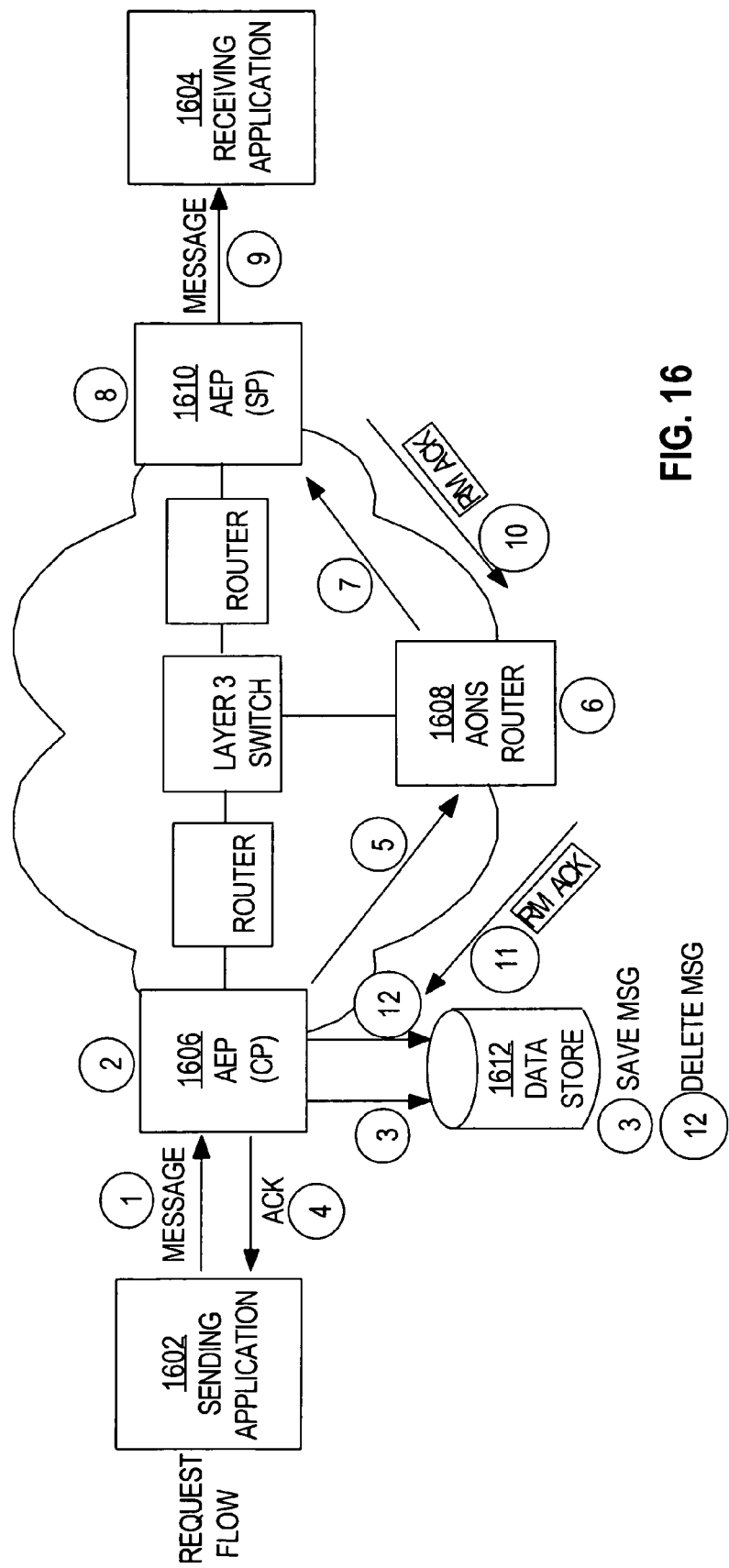
FIG. 16 is a diagram that illustrates a one-way message flow with reliable message delivery.

FIG. 16 is a diagram that illustrates a one-way message flow with reliable message delivery. At circumscribed numeral 1, a sending application 1602 sends a message towards a receiving application 1604. At circumscribed numeral 2, an AEP CP 1606 intercepts the message and adds an AONP header to the message, forming an AONP message. At circumscribed numeral 3, AEP CP 1606 saves the message to a data store 1612. Thus, if there are any problems with sending the message, AEP CP 1606 can resend the copy of the message that is stored in data store 1612. At circumscribed numeral 4, AEP CP 1606 sends an ACK (acknowledgement) back to sending application 1602. At circumscribed numeral 5, AEP CP 1606 sends the AONP message to an AONS router 1608. At circumscribed numeral 6, AONS router 1608 receives the AONP message. At circumscribed numeral 7, AONS router 1608 sends the AONP message to an AEP SP 1610. At circumscribed numeral 8, AEP SP 1610 receives the AONP message and removes the AONP header from the message, thus decapsulating the message. At circumscribed numeral 9, AEP SP 1610 sends the message to receiving application 1604.

At circumscribed numeral 10, AEP SP 1610 sends a reliable messaging (RM) acknowledgement (ACK) to AONS router 1608. At circumscribed numeral 11, AONS router 1608 receives the RM ACK and sends the RM ACK to AEP CP 1606. At circumscribed numeral 12, AEP CP 1606 receives the RM ACK and, in response, deletes the copy of the message that is stored in data store 1612. Because the delivery of the message has been acknowledged, there is no further need to store a copy of the message in data store 1612. Alternatively, if AEP CP 1606 does not receive the RM ACK within a specified period of time, then AEP CP 1606 resends the message.

Figure 17:
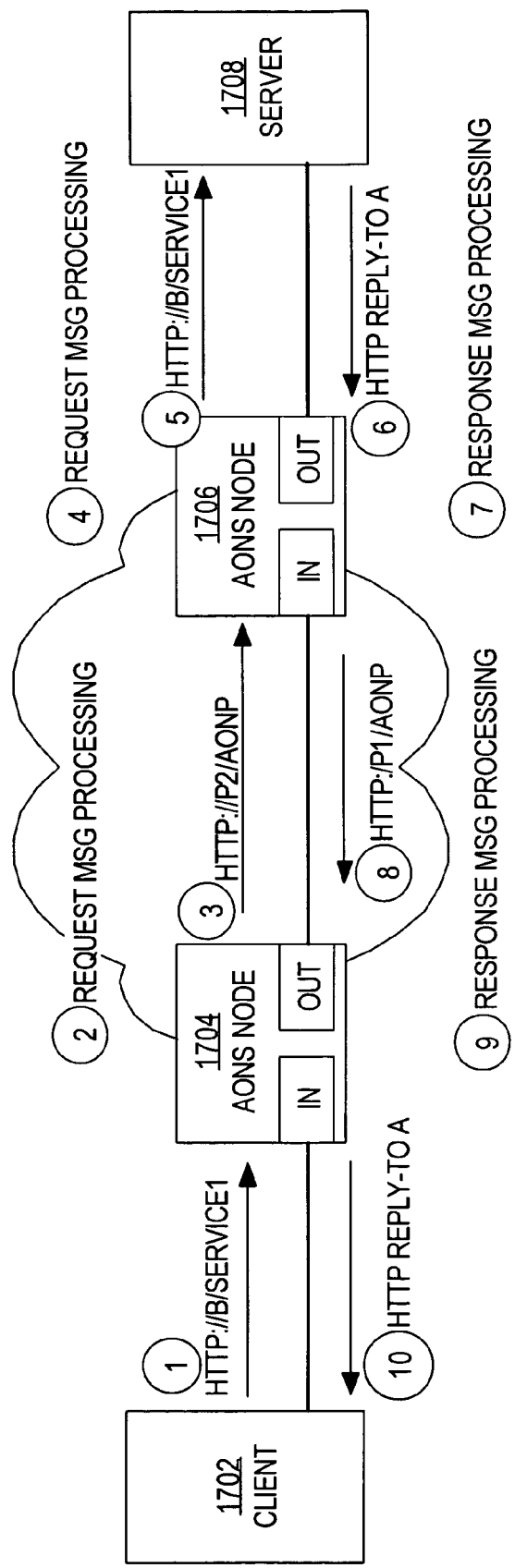
FIG. 17 is a diagram that illustrates synchronous request and response messages.

FIG. 17 is a diagram that illustrates synchronous request and response messages. At circumscribed numeral 1, an AONS node 1704 receives, from a client 1702, a request message, in either implicit or explicit mode. At circumscribed numeral 2, AONS node 1704 reads the message, selects and executes a flow, and adds an AONP header to the message. At circumscribed numeral 3, AONS node 1704 sends the message to a next hop node, AONS node 1706. At circumscribed numeral 4, AONS node 1706 reads the message, selects and executes a flow, and removes the AONP header from the message, formatting the message according to the message format expected by a server 1708. At circumscribed numeral 5, AONS node 1706 sends the message to the message's destination, server 1708.

At circumscribed numeral 6, AONS node 1706 receives a response message from server 1708 on the same connection on which AONS node 1706 sent the request message. At circumscribed numeral 7, AONS node 1706 reads the message, correlates the message with the request message, executes a flow, and adds an AONP header to the message. At circumscribed numeral 8, AONS node 1706 sends the message to AONS node 1704. At circumscribed numeral 9, AONS node 1704 reads the message, correlates the message with the request message, executes a flow, and removes the AONP header from the message, formatting the message according to the message format expected by client 1702. At circumscribed numeral 10, AONS node 1704 sends the message to client 1702 on the same connection on which client 1702 sent the request message to AONS node 1704.

Figure 18:
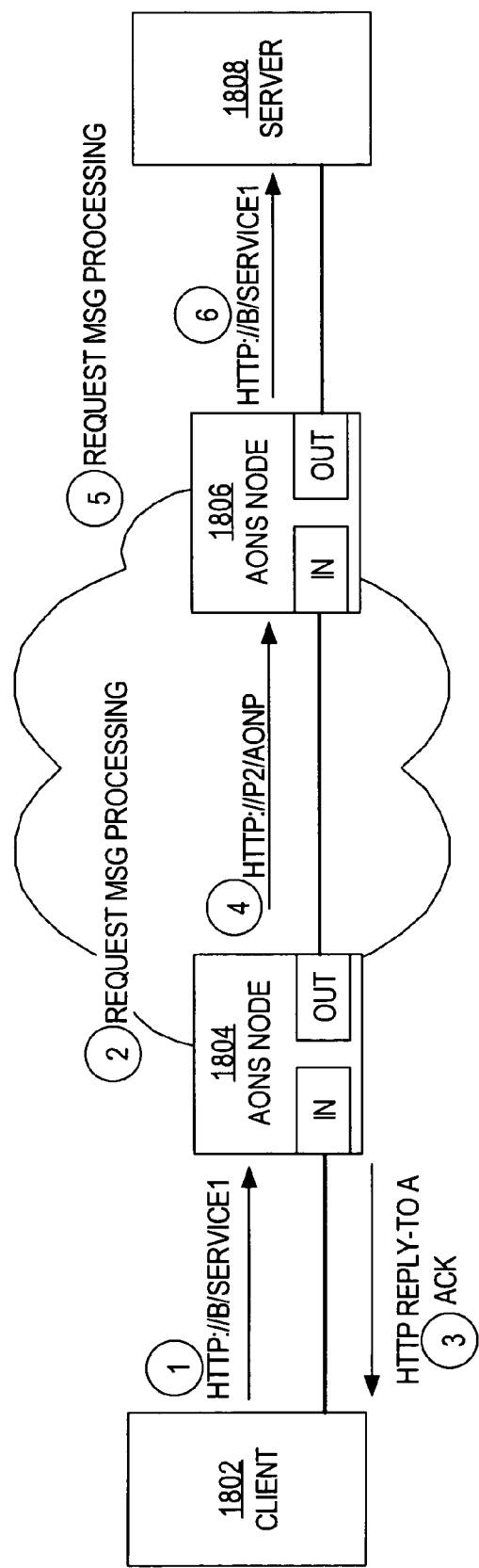
FIG. 18 is a diagram that illustrates a sample one-way end-to-end message flow.

FIG. 18 is a diagram that illustrates a sample one-way end-to-end message flow. At circumscribed numeral 1, an AONS node 1804 receives, from a client 1802, a request message, in either implicit or explicit mode. At circumscribed numeral 2, AONS node 1804 reads the message, selects and executes a flow, and adds an AONP header to the message. At circumscribed numeral 3, AONS node 1804 sends an acknowledgement to client 1802. At circumscribed numeral 4, AONS node 1804 sends the message to a next hop node, AONS node 1806. At circumscribed numeral 5, AONS node 1806 reads the message, selects and executes a flow, and removes the AONP header from the message, formatting the message according to the message format expected by a server 1808. At circumscribed numeral 6, AONS node 1806 sends the message to the message's destination, server 1808.

According to the node view, the message lifecycle within an AONS node, involves ingress/egress processing, message processing, message execution control, and flow execution.

Figure 19:
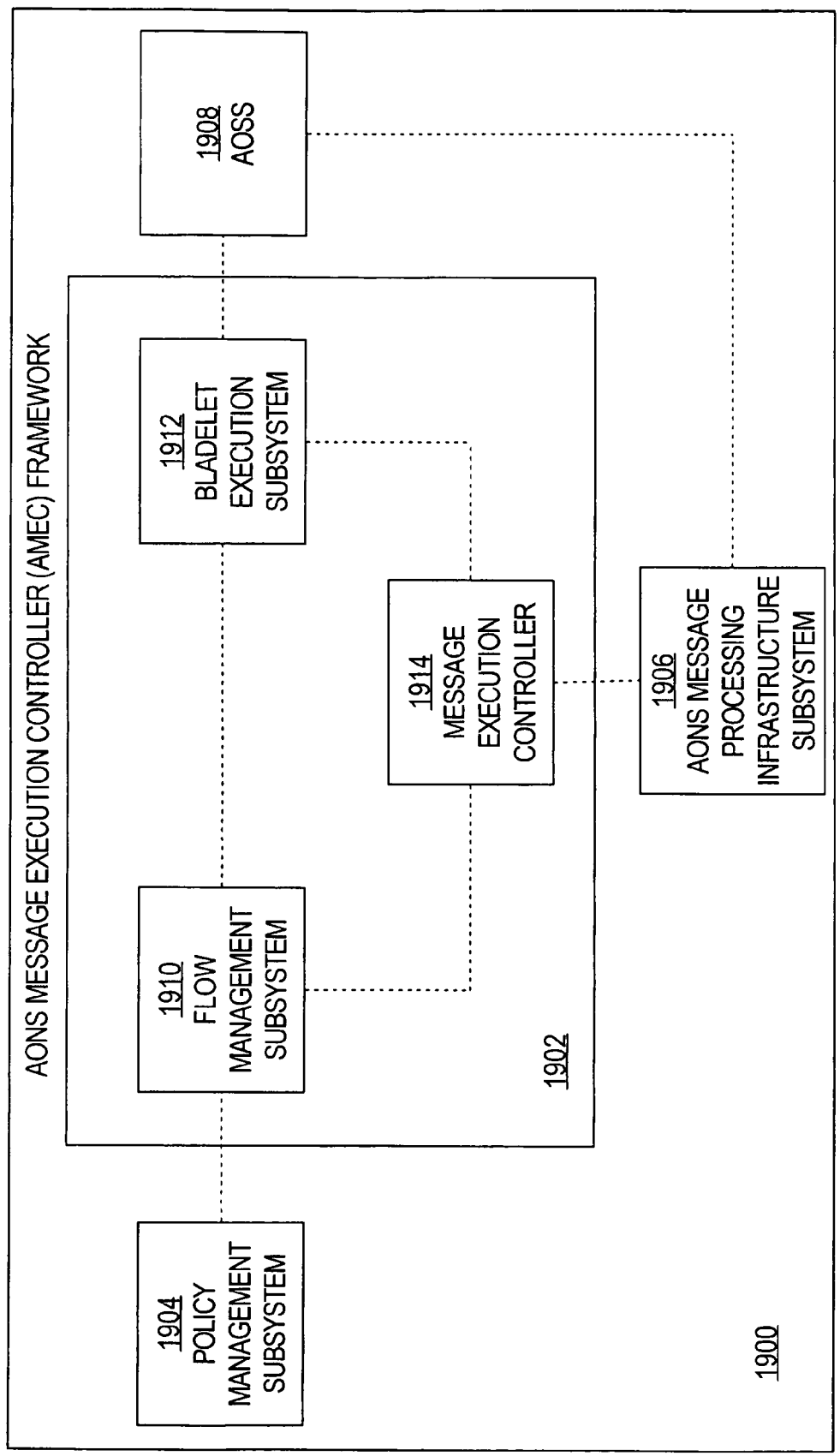
FIG. 19 is a diagram that illustrates message-processing modules within an AONS node.

FIG. 19 is a diagram that illustrates message-processing modules within an AONS node 1900. AONS node 1900 comprises an AONS message execution controller (AMEC) framework 1902, a policy management subsystem 1904, an AONS message processing infrastructure subsystem 1906, and an AOSS 1908. AMEC framework 1902 comprises a flow management subsystem 1910, a Bladelet™ execution subsystem 1912, and a message execution controller 1914. Policy management subsystem 1904 communicates with flow management subsystem 1910. AOSS 1908 communicates with Bladelet™ execution subsystem 1912 and AONS message processing infrastructure subsystem 1906. AONS message processing infrastructure subsystem 1906 communicates with message execution controller 1914. Flow management subsystem 1910, Bladelet™ execution subsystem, and message execution controller 1914 all communicate with each other.

Figure 20:
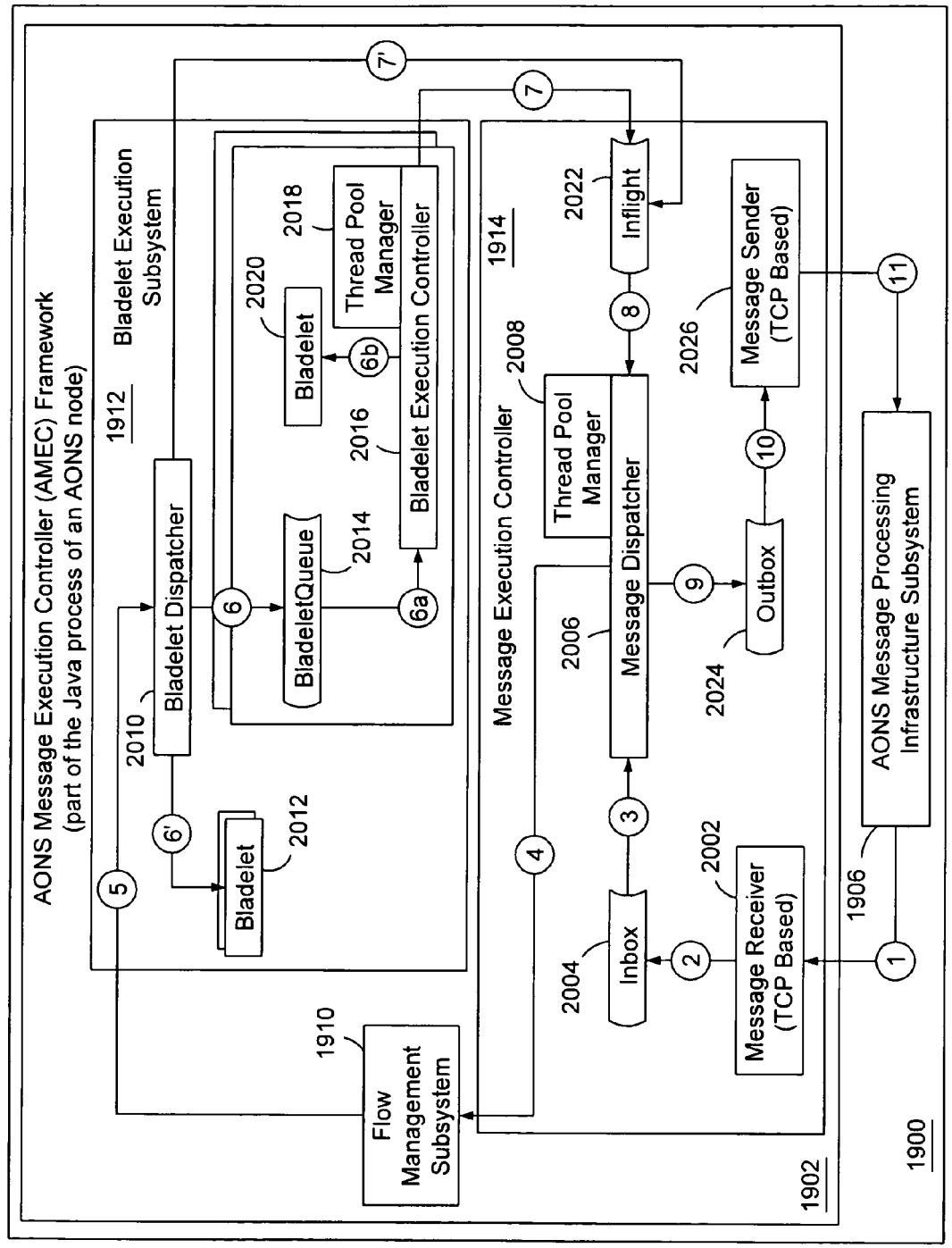
FIG. 20 is a diagram that illustrates message processing within AONS node.

FIG. 20 is a diagram that illustrates message processing within AONS node 1900. AMEC framework 1902 is an event-based multi-threaded mechanism to maximize throughput while minimizing latency for messages in the AONS node. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 1902.

In one embodiment, executing the flow comprises executing each step (i.e., Bladelet™/action) of the flow. If a Bladelet™ is to be run within a separate context, then AMEC framework 1902 may enqueue into Bladelet™-specific queues, and, based on thread availability, dequeue appropriate Bladelet™ states from each Bladelet™ queue.

3.4.10 Flows, Bladelets™, and Scriptlets™

According to one embodiment, flows string together Bladelets™ (i.e., actions) to customize message processing logic. Scriptlets™ provide a mechanism for customers and partners to customize or extend native AONS functionality. Some Bladelets™ and services may be provided with an AONS node.

3.4.11 AONS Services

As mentioned in the previous section, a set of core services may be provided by AONS to form the underlying foundation of value-added functionality that can be delivered via an AONS node. In one embodiment, these include: Security Services, Standard Compression Services, Delta Compression Services, Caching Service, Message Logging Service, Policy Management Service (Policy Manager), Reliable Messaging Service, Publish/Subscribe Service, Activity Monitoring Service, Message Distribution Service, XML Parsing Service, XSLT Transformation Service, and QoS Management Service. In one embodiment, each AONS core service is implemented within the context of a service framework.

3.4.12 AONS Configuration and Management

In one embodiment, an AONS node is provisioned and configured for a class of application messages, where it enforces the policies that are declaratively defined on behalf- of the application end-points, business-domains, security-domains, administrative domains, and network-domains. Furthermore, the AONS node promotes flexible composition and customization of different product functional features by means of configurability and extensibility of different software and hardware sub-systems for a given deployment scenario. Due to the application and network embodiments of the AONS functionality, the AONS architecture framework should effectively and uniformly address different aspects of configurability, manageability, and monitorability of the various system components and their environments.

The AONS Configuration and Management framework is based upon five functional areas ("FCAPS") for network management as recommended by the ISO network management forum. The functional areas include fault management, configuration management, accounting management, performance management, and security management. Fault management is the process of discovering, isolating, and fixing the problems or faults in the AONS nodes. Configuration management is the process of finding and setting up the AONS nodes. Accounting management involves tracking usage and utilization of AONS resources to facilitate their proper usage. Performance management is the process of measuring the performance of the AONS system components and the overall system. Security management controls access to information on the AONS system. Much of the above functionality is handled via proper instrumentation, programming interfaces, and tools as part of the overall AONS solution.

Figure 21:
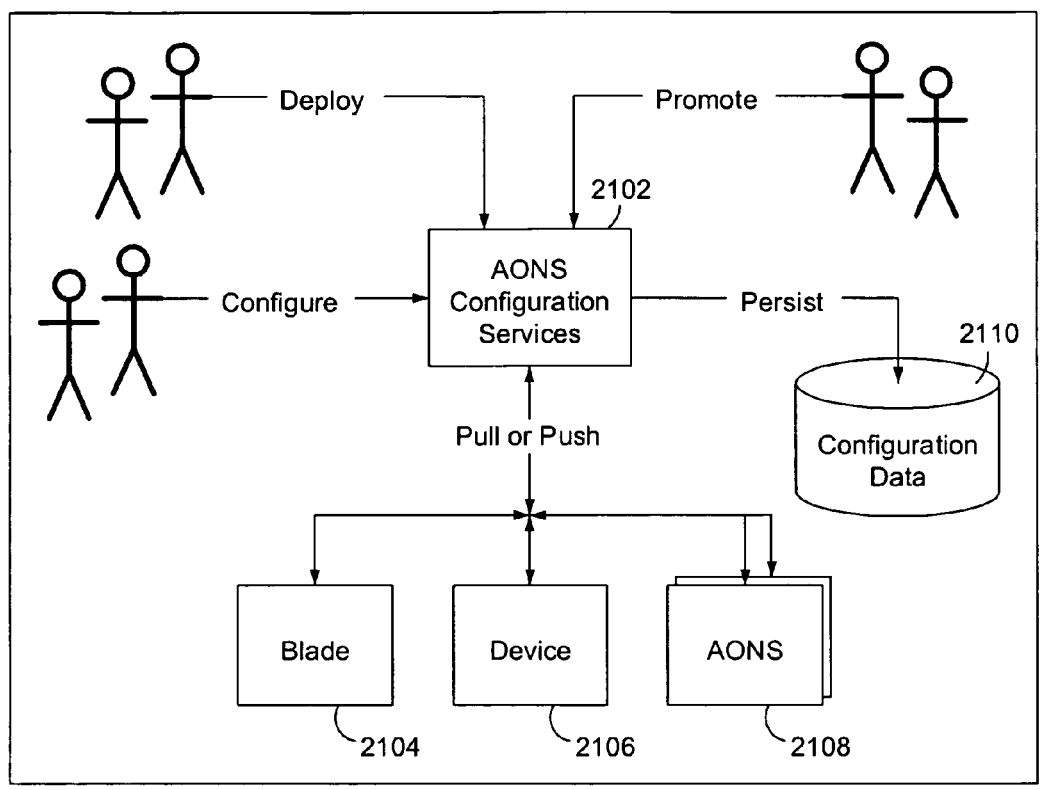
FIG. 21, FIG. 22, and FIG. 23 are diagrams that illustrate entities within an AONS configuration and management framework.
Figure 22:
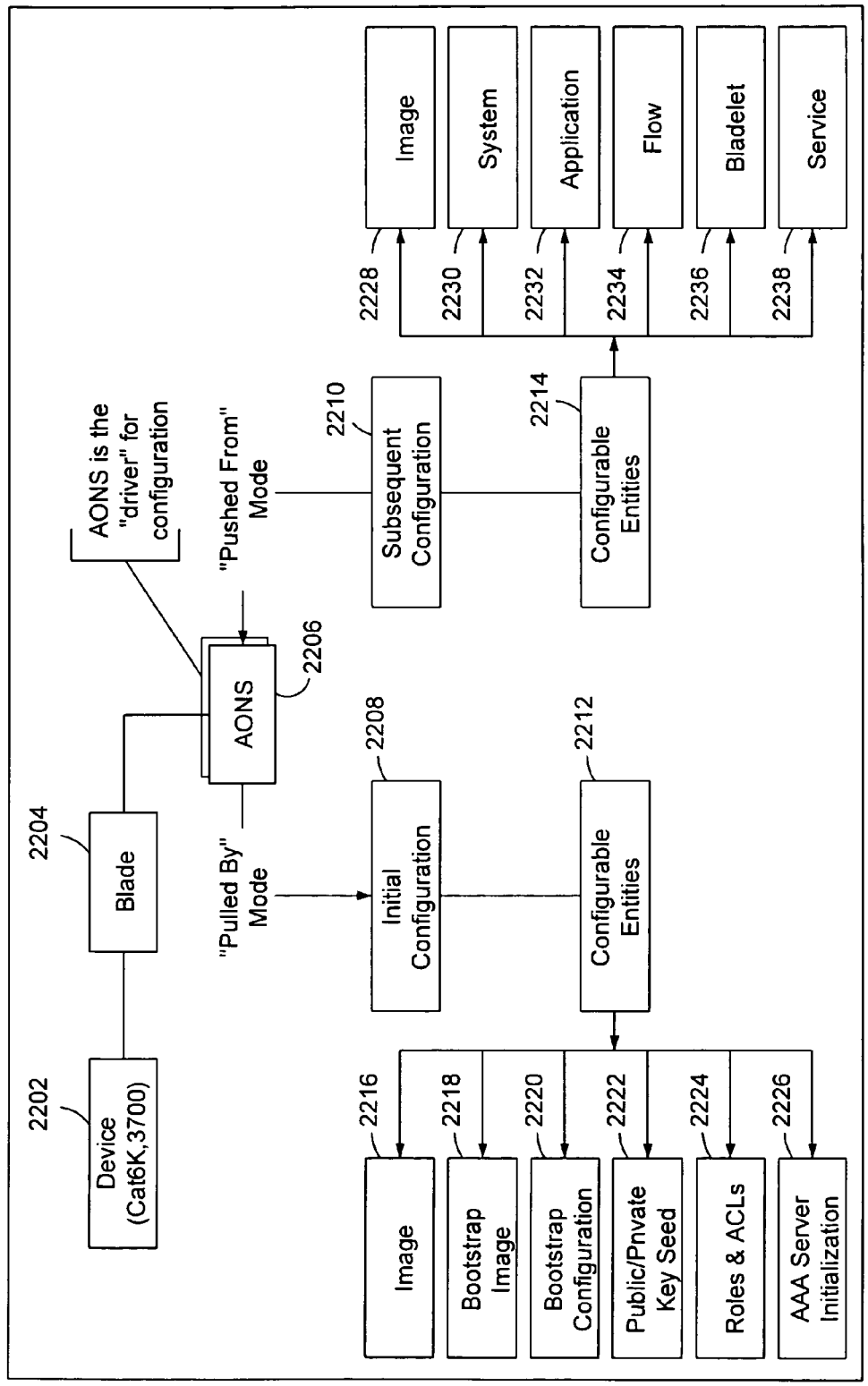
Figure 23:
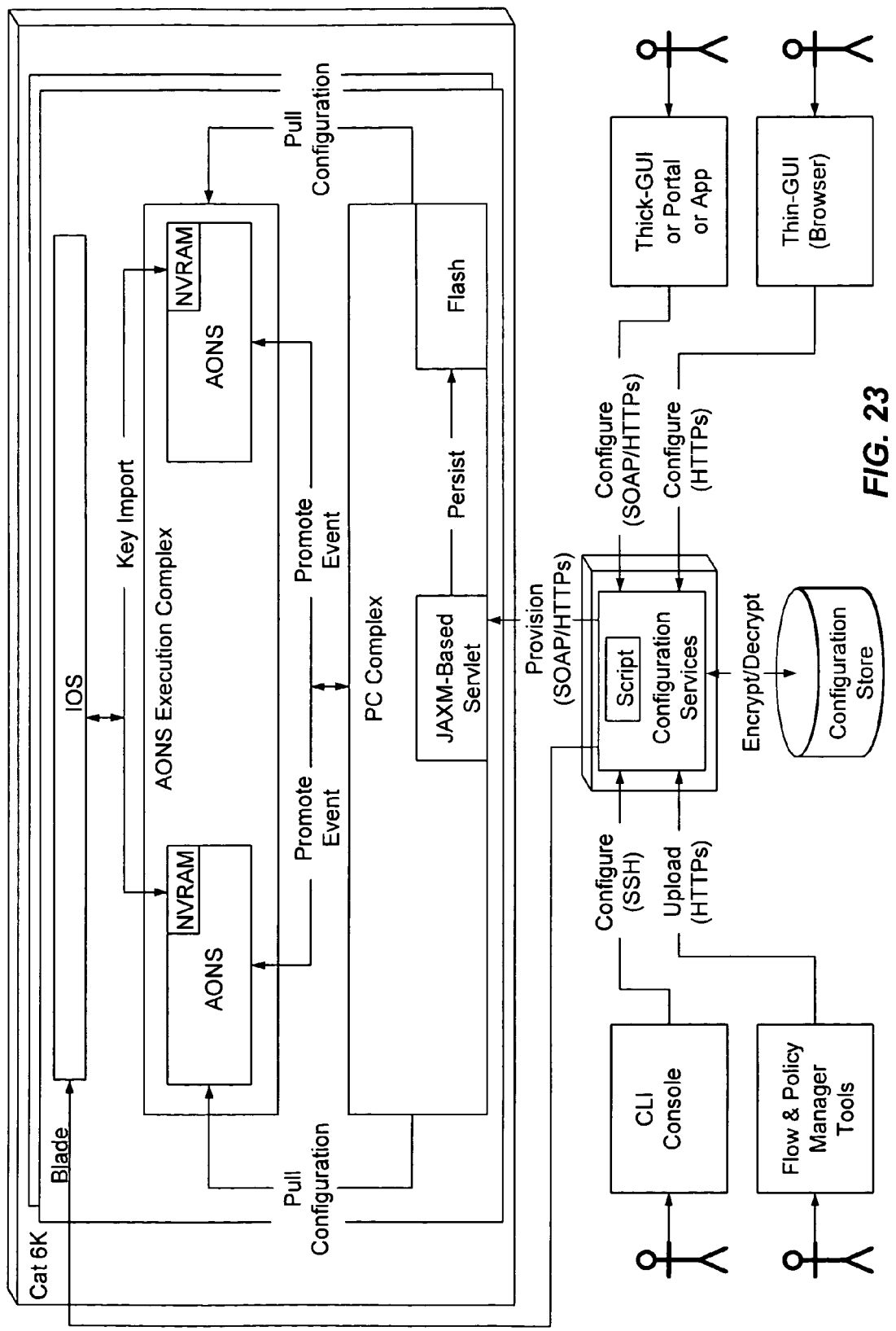

FIG. 21, FIG. 22, and FIG. 23 are diagrams that illustrate entities within an AONS configuration and management framework. A configuring and provisioning server (CPS) is the centralized hub for configuration and management of AONS policies, flows, Scriptlets™ and other manageable entities. Configurable data is pushed to the CPS from an AONS design studio (flow tool) and the AONS admin may then provision this data to the production deployment. A promotion process is also provided to test and validate changes via a development to staging/certification to production rollout process. A configuration and provisioning agent (CPA) resides on individual AONS blades and provides the local control and dispatch capabilities for AONS. The CPA interacts with the CPS to get updates. The CPA takes appropriate actions to implement changes. The CPA is also used for collecting monitoring data to report to third party consoles.

3.4.13 AONS Monitoring

Figure 24:
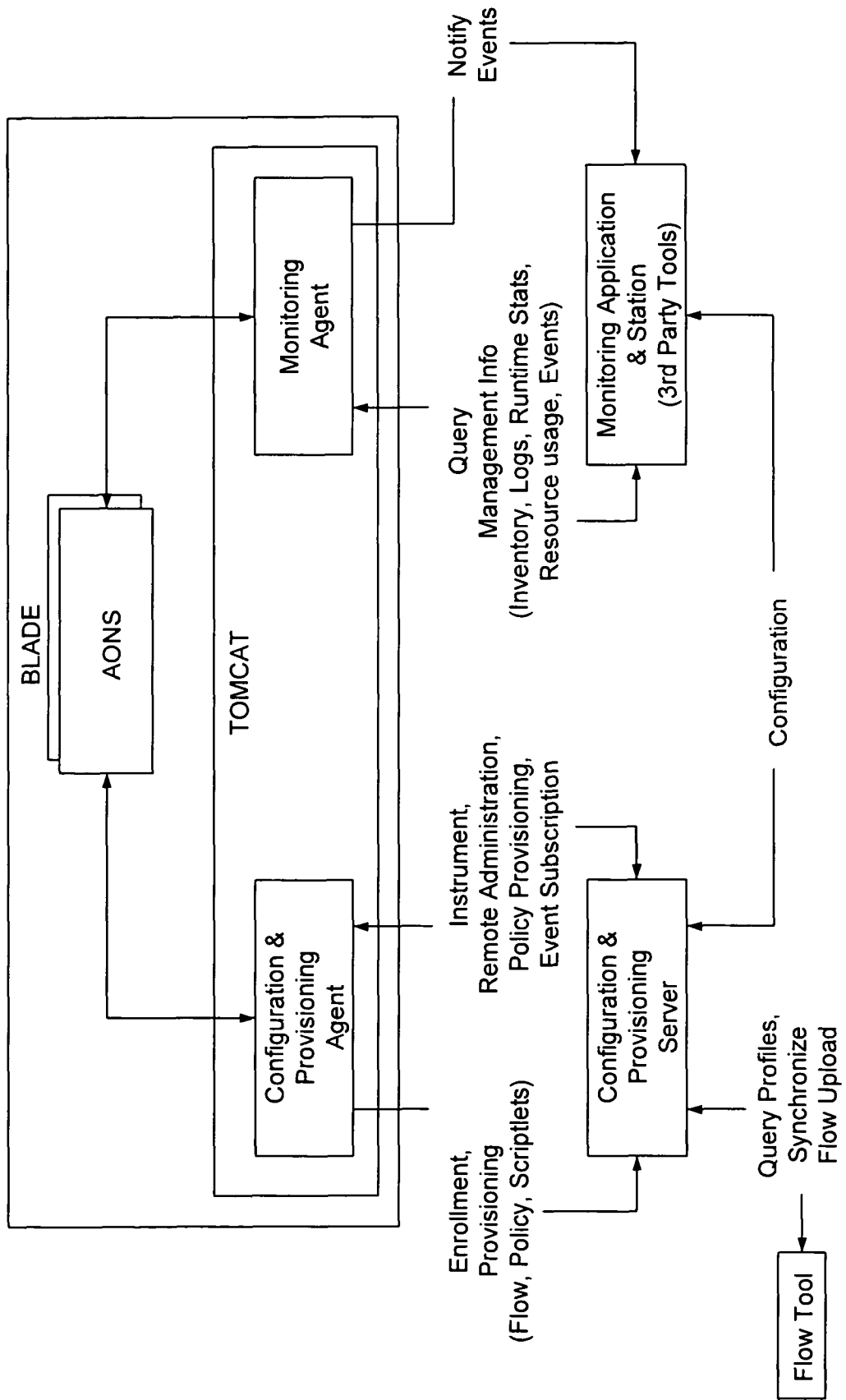
FIG. 24 is a diagram that illustrates an AONS monitoring architecture.

In one embodiment, AONS is instrumented to support well-defined events for appropriate monitoring and visibility into internal processing activities. The monitoring of AONS nodes may be accomplished via a pre-defined JMX MBean agent that is running on each AONS node. This agent communicates with a remote JMX MBean server on the PC complex. An AONS MIB is leveraged for SNMP integration to third party consoles. FIG. 24 is a diagram that illustrates an AONS monitoring architecture.

3.4.14 AONS Tools

In one embodiment, the following tool sets are provided for various functional needs of AONS: a design studio, an admin studio, and a message log viewer. The design studio is a visual tool for designing flows and applying message classification and mapping policies. The admin studio is a web-based interface to perform all administration and configuration functions. The message log viewer is a visual interface to analyze message traffic, patterns, and trace information.

4.0 APPLYING QUALITY OF SERVICE TO APPLICATION-LAYER MESSAGES IN NETWORK ELEMENTS

4.1 Background

In many network environments, Quality of Service (QoS) is achieved in routers and switches by using networking functions to classify and mark IP Differentiated Services Code Points (DSCP) bits in Internet Protocol (IP) data frames. Generally, QoS refers to marking packets with special values and applying different treatment to the marked packets in a router or switch based on the markings. For example, special treatment may comprise performing packet forwarding more rapidly. However, while application messages often convey message priority from an application's perspective, application-level message priority rarely aligns with network QoS classification and marking. Further, there is presently no way to correlate application-level message priority with Layer 2 QoS mechanisms.

In this context, an "application-layer message" is a discrete unit of information that is sent between a source and destination(s) that contains information and context that are meaningful at OSI Layer 5, 6, or 7. A message may be transported within a single packet, or be transported across multiple packets within a TCP flow. An example of an application-layer message is an HTML page or an XML message. The definition herein of an application-layer message excludes frames, packets or segments that are meaningful only at OSI Layer 2, 3 or 4.

In typical QoS operations, network devices such as routers and switches use combinations of source and destination IP addresses, and/or Layer 4 parameters, to classify packets and mark the relative priority of a packet using DSCP.

Message-based applications can abstract RPC interfaces within the body of a particular message and can use HTTP, HTTPS, TCP or JMS to transport messages between systems. For example, HTTP on TCP port 80 is used as a common transport protocol for exchanging messages between systems that may be accessing applications such as SAP, Siebel, etc. Additionally other information, such as order value or identity of the source, which may make one message more important than another, is embedded within the message. However, when message-based applications abstract application RPCs within a common transport, traditional network devices cannot determine the relative importance of the packet content by inspecting the TCP port value, and therefore cannot apply DSCP markings to preferentially queue packets within the network.

Further, while a URL may include keywords such as */trade, or */quote, the URL does not necessarily identify the application that may be invoked, and it does not convey the relative importance of the message's content. Another problem for TCP-based classification is that it is not possible to mark the relative priority of a message using string matching, as the content and context may be encrypted.

Some applications themselves have message level priority support, and can act on more critical messages ahead of other messages. However, no present approach integrates application priority to influence or set network QOS values, nor can network elements set application priority.

Network-layer QoS is described in IETF requests for comment (RFC) documents, including RFC 791, which defines IP header ToS bytes for IP precedence, and DiffServ standards such as RFC 2474, 2475, and 3246.

4.2 Functional and Structural Overview

According to an embodiment, a network element comprises program instructions or hardware elements that are configured to understand application quality of service (QoS) settings, configuration or requirements based on message processing in the network. The network element receives one or more application-layer messages. The network element determines one or more network QoS levels by integrating with network elements. The network element creates and stores a mapping of an application QoS value to one or more network QoS values to provide value-based quality of service.

As an example, application-layer messages carrying trade orders for trading in stocks or other securities cannot be differentiated from messages requesting stock quotes within a network element. In an embodiment, by message processing in the network element, a network element can differentiate trade orders and quote request messages and then, based on configured policies, map a higher priority quality of service to trades and than quotes and other normal traffic.

In an embodiment, application-level message content is identified and used to select network-level QoS values and mark packets of a message with the network-level values. As a result, application-level quality or priority information is transformed into QoS values that can cause routers or switches to treat application messages differently based on the application-level information. In one area of use, the ability to map application message content to network QoS can significantly improve SLA enforcement and reporting. The approach described herein enables a network element such as a router or switch to provide true application QoS by inspection of message content and context. For example, if an application-layer message comprises an XML purchase order in which the purchase order amount is >$1,000,000, then the router can mark all packets that transmit this message as AF31, for high priority.

The approach herein provides a novel ability to influence network QoS based on application knowledge. The approach can leverage understanding of application semantics, transformations, etc. Packets may be marked using DSCP values, type of service (ToS) values, etc.

Figure 25A:
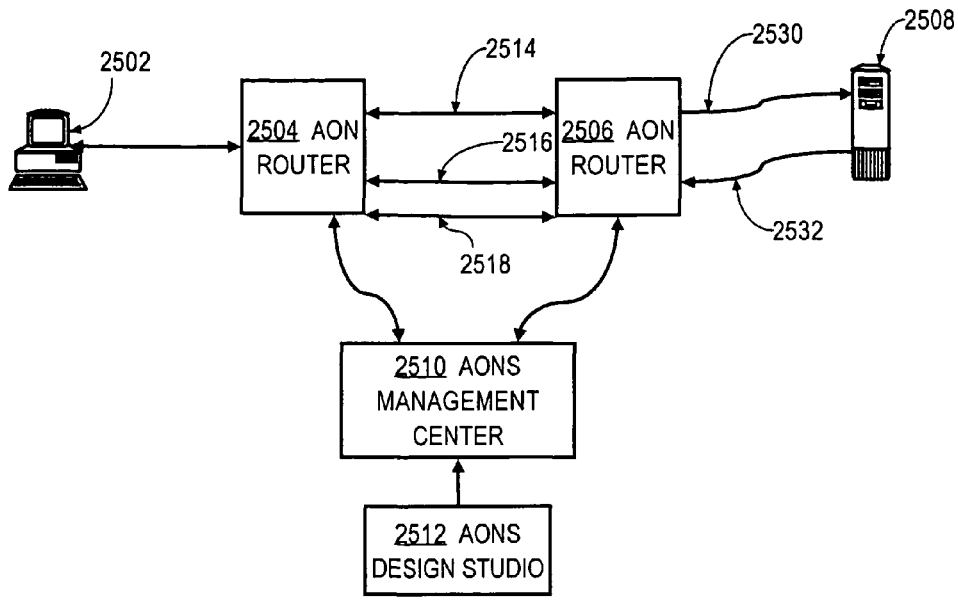
FIG. 25A is a block diagram of an example network context in which quality of service is applied to application-layer messages.
Figure 25B:
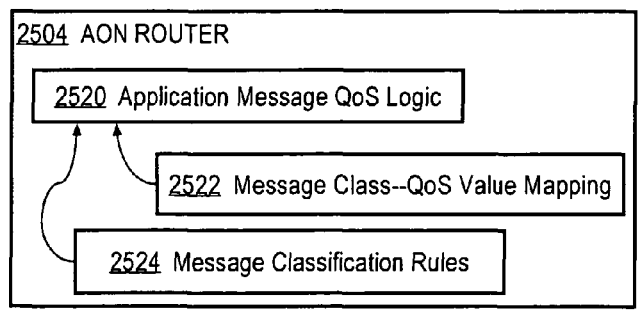
FIG. 25B is a block diagram of certain software elements of a router of FIG. 25A.
Figure 26:
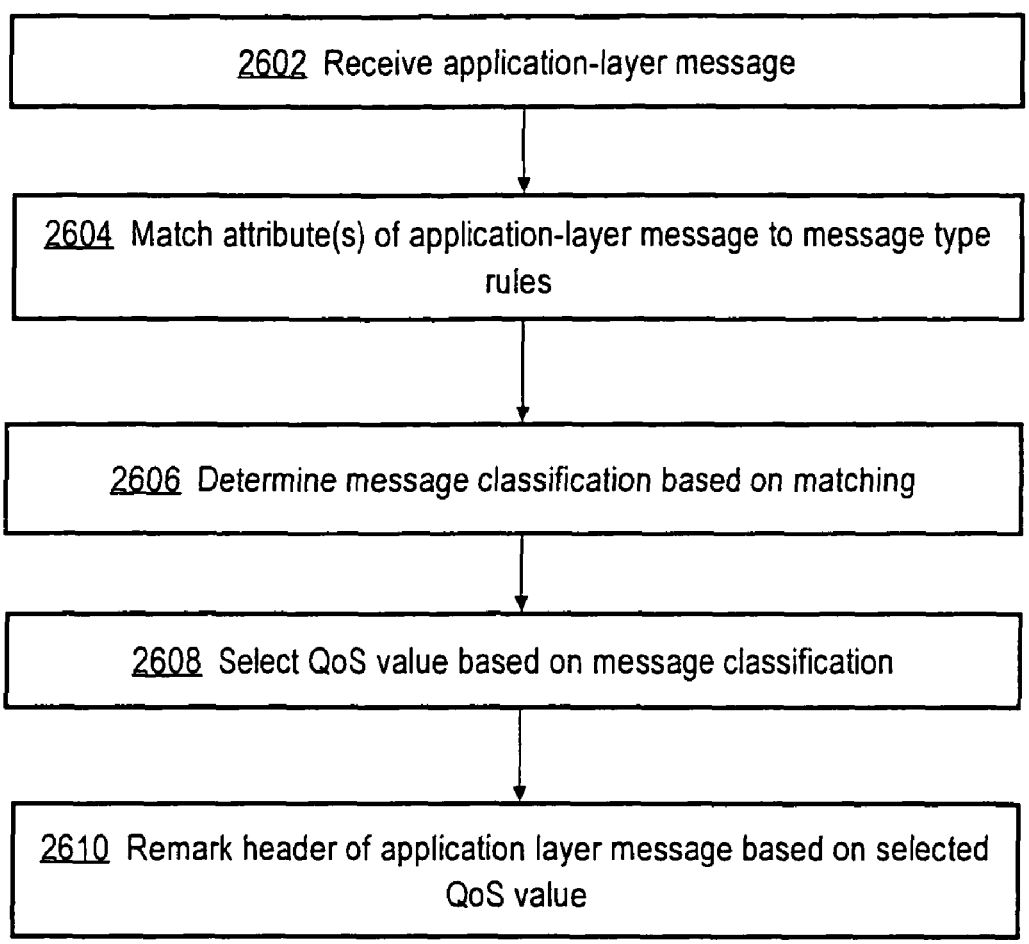
FIG. 26 is a flow diagram of an approach for applying quality of service to application-layer messages in network elements.

Embodiments of the broad approach herein are now described with reference to FIG. 25A, FIG. 25B, and FIG. 26. FIG. 25A is a block diagram of an example network context in which quality of service is applied to application-layer messages; FIG. 25B is a block diagram of certain software elements of a router of FIG. 25A; and FIG. 26 is a flow diagram of an approach for applying quality of service to application-layer messages in network elements.

Referring first to FIG. 25A, in one embodiment, a first computer 2502 is coupled to a first router 2504, which is coupled directly or indirectly through one or more networks or internetworks to a second router 2506. The second router 2506 is coupled to a second computer 2508. Connections of first computer 2502 and second computer 2508 may be direct or indirect through one or more networks or internetworks.

In an embodiment, each of the routers 2504, 2506 is a Cisco router or switch that comprises an AONS blade from Cisco Systems, Inc., San Jose, Calif. Routers 2504, 2506 may be coupled to an AONS management center (AMC) 2510. An AONS Design Studio (ADS) 2512 may be coupled to AMC 2510. An administrative user may use ADS 2512 to define mappings of message classifications to flows, and to define message classification values and how they relate to network-level QoS values, such as DSCP or ToS values. AMC 2510 supports management options to define QoS policy based upon a flow classification and to define values in mapping 2522.

Router 2504 communicates with router 2506 using a control protocol on control connection 2514. An example control protocol is AON Protocol (AONP) over a persistent TCP connection. In operation the first router 2504 establishes one or more virtual connections 2516, 2518 to the second router 2506. The use of the virtual connections is described further below. In one operational scenario, router 2506 has an outbound connection 2530 to second computer 2508 and an inbound connection 2532 therefrom.

Referring now to FIG. 25B, in one embodiment each of the routers 2504, 2506 comprises application message QoS logic 2520, which comprises logic or recorded computer program instructions that implement the functions described further herein. In an embodiment, Application QoS logic 2520 is coupled to and manages a message class-QoS value mapping 2522 and one or more message classification rules 2524. The use of mapping 2522 and rules 2524 is described further herein.

In an embodiment, each of the message classification rules 2524 specifies one or more values, attributes, or character patterns in an application-layer message. Rules 2524 may comprise header rules, parameter rules, or Xpath searches. If matched, the values, attributes or patterns associate the message with a particular message classification. In an embodiment, message classification rules 2524 comprise regular expressions, Xpath expressions, etc. An example expression may be used in a supply chain context and may test whether an application-layer message contains a purchase order amount over $1 million.

Each of the rules 2524 may represent a message classification and may include a specification of a class selector. Examples of message classifications that may be used in rules 2524 include Mission Critical, Transactional Data, Bulk Data Transfer, Network Management, Best Effort, etc. In an embodiment, Application QoS values are assigned based on message classification. For classified packets, in one embodiment, Mission Critical has the highest priority and Bulk Data Transfer has the lowest priority.

Alternatively, in one embodiment not all traffic is classified, and the unclassified traffic is considered "Best Effort" traffic. In some scenarios, transmitting Bulk Data traffic (needing more time) with priority could starve the Best Effort traffic queue. Therefore, in an embodiment the Best Effort priority queue is processed before the Bulk Data priority queue. Ton conform to typical industry QoS baseline recommendations, the priority of Bulk Data can be higher than the priority of Best Effort as a default. In other embodiments, any suitable number or kind of message classifications may be used, and different names may be used.

Rules 2524 also may specify a flow of execution for later treatment of a message.

In one embodiment, Application QoS logic 2520 is implemented within an Application QoS bladelet. In a bladelet implementation, the Application QoS bladelet can be combined with other AONS bladelets to perform functions such as message encryption, message digital signing, etc. When such functions are combined into a flow of processes, the flow is termed a Policy Execution Plan (PEP). The Application QoS bladelet may use AON flow variables to extract information from the message to set DSCP or ToS values.

Referring now to FIG. 26, in step 2602, an application-layer message is received. For example, router 2504 receives one or more frames, packets or segments that contain a Layer 5, 6 or 7 message from an instance of an application that is running on first computer 2502. Typically the application-layer message is directed to a corresponding server on second computer 2504. As a specific example, the received message may be an HTTP or XML message for an SAP application, Seibel application, etc. The router 2504 ignores any network-level QoS values that are already marked in a received message; for example, DSCP and ToS values in the IP header are ignored in the router 2504.

In step 2604, one or more attributes of the application-layer message are matched to one or more message classification rules. For example, one or more of the message classification rules 2524 are matched to the message. Rules 2524 may be organized in a cascading manner so that failure to match one general rule results in skipping similar narrower rules.

In step 2606, a message classification is determined for the message based on the matching. For example, based on applying the rules, a message is determined to fall in one of several classifications such as Mission Critical, Transactional Data, Bulk Data Transfer, and Network Management. In an embodiment, if multiple rules match on multiple different parts of a message, then the highest resulting message classification is used for all packets of a TCP session that carry the message.

In one embodiment, the abstract message classification determined at step 2606 is written into a message context data structure that traverses routers 2504, 2506 with the application-layer message. For example, when router 2504 sends a message to router 2506 using AONP, a message context with the message classification is included. In this approach, a classification can traverse multiple nodes that are compliant with the approach herein, so that applying rules at step 2604 is performed only once. For example, applying rules at step 2604 may be performed only when a router 2504, 2506 receives an application-layer message having a NULL value in the message classification attribute of the message context structure.

In step 2608, a QoS value is selected based on the message classification. For example, the message classification obtained by applying rules 2524 is mapped using message class-QoS value mapping 2522 to a particular QoS value. QoS values in mapping 2522 may be expressed as abstract values or binary values that can be used directly in the DSCP or ToS value of an IP frame, or both. For example, mapping 2522 may provide the following association of classifications to QoS values and DSCP values:

| MESSAGE CLASSIFICATION | QOS VALUE | DSCP VALUE |
|---|---|---|
| Mission Critical | AF31 | <011010> |
| Transactional Data | AF21 | <010010> |
| Bulk Data Transfer | AF11 | <001010> |
| Network Management | CS2 | <010000> |
| Best Effort | 0 | <000000> |

"AF" indicates "assured forwarding" under DSCP. "CS" means "Class Selector." More classifications than listed above may be defined in other embodiments. "Transactional data" may refer to AONS database access messages, time-sensitive file transfers, etc. In an embodiment, the QoS values and DCSP values set forth above are default values that are configurable by a user, to permit users or network administrators to configure DSCP values that follow non-standard Per Hop Behaviors (PHBs) as defined in RFC 2474, RFC 2597, or RFC 3246. In an embodiment, default values are always configured.

In step 2610, a Layer 2, 3 or 4 header of the application-layer message is remarked based on the selected QoS value. For example, the DSCP value of mapping 2522 is written into the IP header of the received message. In an embodiment, when router 2504 is terminating an SSL connection to the first computer 2502, the DSCP value is passed to an S-tunnel element, which sets the DSCP value in the IP header of the SSL connection. This ensures that DSCP values are set after encryption of an outbound message.

After step 2610, the remarked message may be processed according to the QoS values that have been marked. For example, the remarked message may be forwarded from router 2504 to router 2506 on virtual connections 2516, 2518. In an embodiment, outbound messages are written to a particular virtual connection, and the connection calls a routine of the IP stack to accomplish DSCP marking at the IP level. Virtual connections 2516, 2518 may be managed using a connection manager. The connections 2516, 2518 may be prioritized and associated with separate message classifications. For example, all messages that are classified as Mission Critical may traverse connection 2516, whereas Best Effort messages may traverse connection 2518.

Each connection 2516, 2518 is associated with a separate prioritized queue in routers 2504, 2506. The use of separate and prioritized virtual connections 2516, 2518 enables routers 2504, 2506 to apply priority queuing of messages at the application level across all routers that implement the techniques herein.

In one embodiment, an interleaved priority queuing approach is used in which higher-priority queues are processed with greater priority, but without using a strict weighted approach that could result in starving lower-priority queues. For example, higher priority queues are processed before lower priority queues during flow execution, but partially read messages are given intermediate priority before classification, to ensure that low priority messages do not block the reading of higher priority messages. However, this paragraph describes only a few suitable example approaches, and the selection of a queuing or forwarding technique is beyond the scope of this disclosure.

In response, router 2506 may apply priority queuing or other QoS techniques in accordance with the marking. As an example, router 2506 may forward the remarked message on outbound connection 2530 to second computer 2508.

After step 2610, message acknowledgement (ACK) packets emitted by routers 2504, 2506 to TCP endpoints continue to use the network-layer QoS markings that were applied at step 2610. In an embodiment, when routers 2504, 2506 are sending responses to either the first computer 2502 or second computer 2508, the routers 2504, 2506 preserve any network-layer QoS markings that are in received application-layer messages, unless the approach herein results in remarking the packets. Thus, for example, if no rules match attributes at step 2604 of FIG. 26, then a router 2504, 2506 does not overwrite any existing DSCP or ToS values in a received message.

Figure 27:
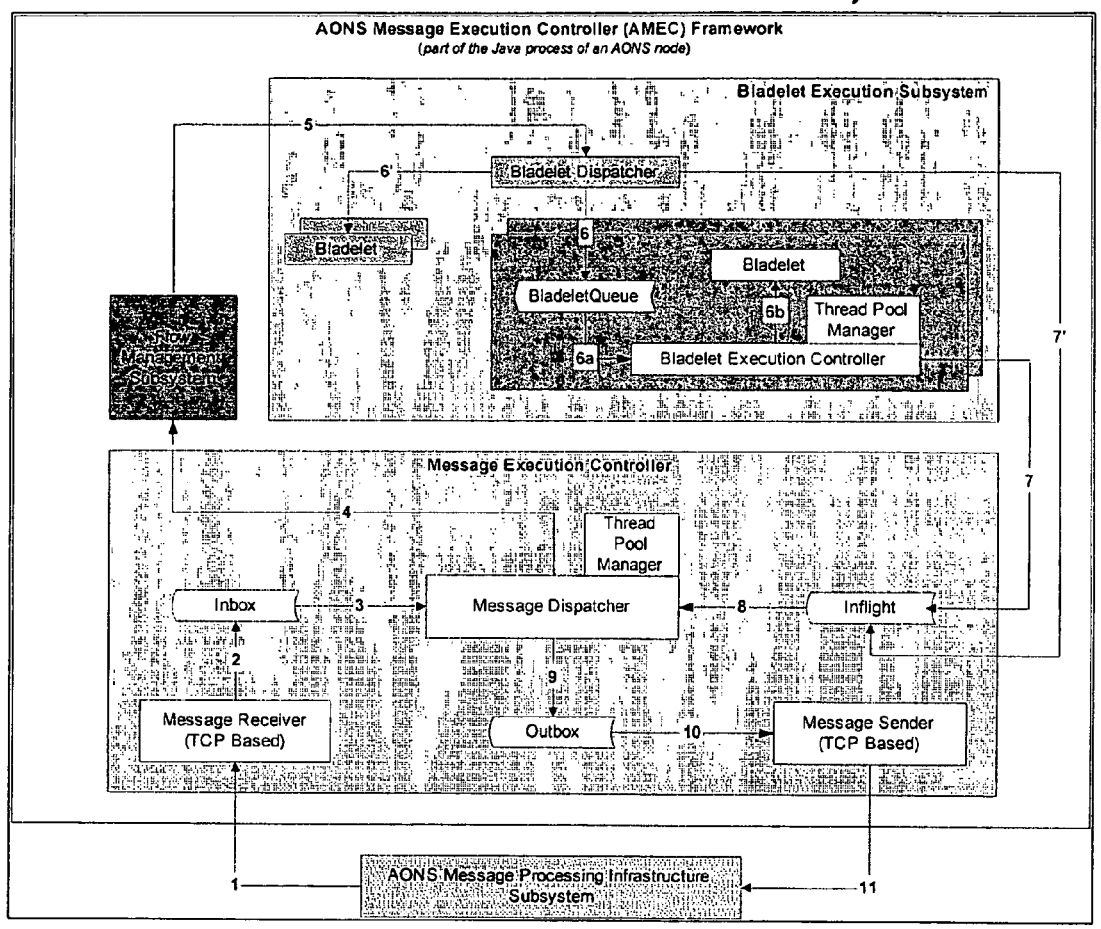
FIG. 27 is a block diagram of functional elements and data flow operations that may be used in an AONS embodiment.

FIG. 27 is a block diagram of functional elements and data flow operations that may be used in an AONS embodiment. In a router 104, a message processing infrastructure subsystem receives an inbound message at step 1 and provides the message to a TCP-based message receiver. For purposes of illustrating a clear example, FIG. 27 indicates the message is received and sent over TCP, but the same sequence of steps may be used for non-TCP based message processing as well.

At step 2, the message is classified and placed in an 'Inbox' queue to be picked up by the flow management subsystem at step 4. Once a message gets classified at step 2, an Application QoS is assigned to the message. The user specifies the Application QoS to associate with a message type using ADS 2512. If the message already has an Application QoS value assigned to it by an upstream AON node, then that Application QoS value is preserved.

Once an Application QoS value is assigned to a message, the message is put in a prioritized Inbox queue to be picked up by the flow management subsystem at step 4. In particular, instead of having a single 'Inbox' queue, a separate 'Inbox' is used for each Application QoS value that can be assigned to a message.

The flow management system then processes messages from the 'Inbox' queues in priority order. For example, messages with QoS "Mission Critical" will be processed before messages with QoS "Transactional Data". As part of flow processing, the Application QoS can be assigned (or reset) using a "QoS" bladelet.

Once the message has gone through flow processing, it is put in a "prioritized" 'Outbox' queue (step 9). Similar to the 'Inbox' queues, each QoS class will have a separate 'Outbox' queue. From the 'Outbox', the message is sent out in priority order to either the next AON node (over AONP) or to the end-point via an adapter at step 10.

In addition, if the message is sent to another AON node over AONP, then a mapping is performed that maps the Application QoS value to a ToS/DSCP value. The mapping is customizable, and is specified by the user using AMC 2510. The ToS/DSCP value is set on the TCP connection so that any intermediate network node can process the message with the appropriate priority. A separate TCP connection is used for each QoS class so that higher priority traffic on a connection is not delayed by lower priority traffic sent earlier on the same connection.

Figure 28:
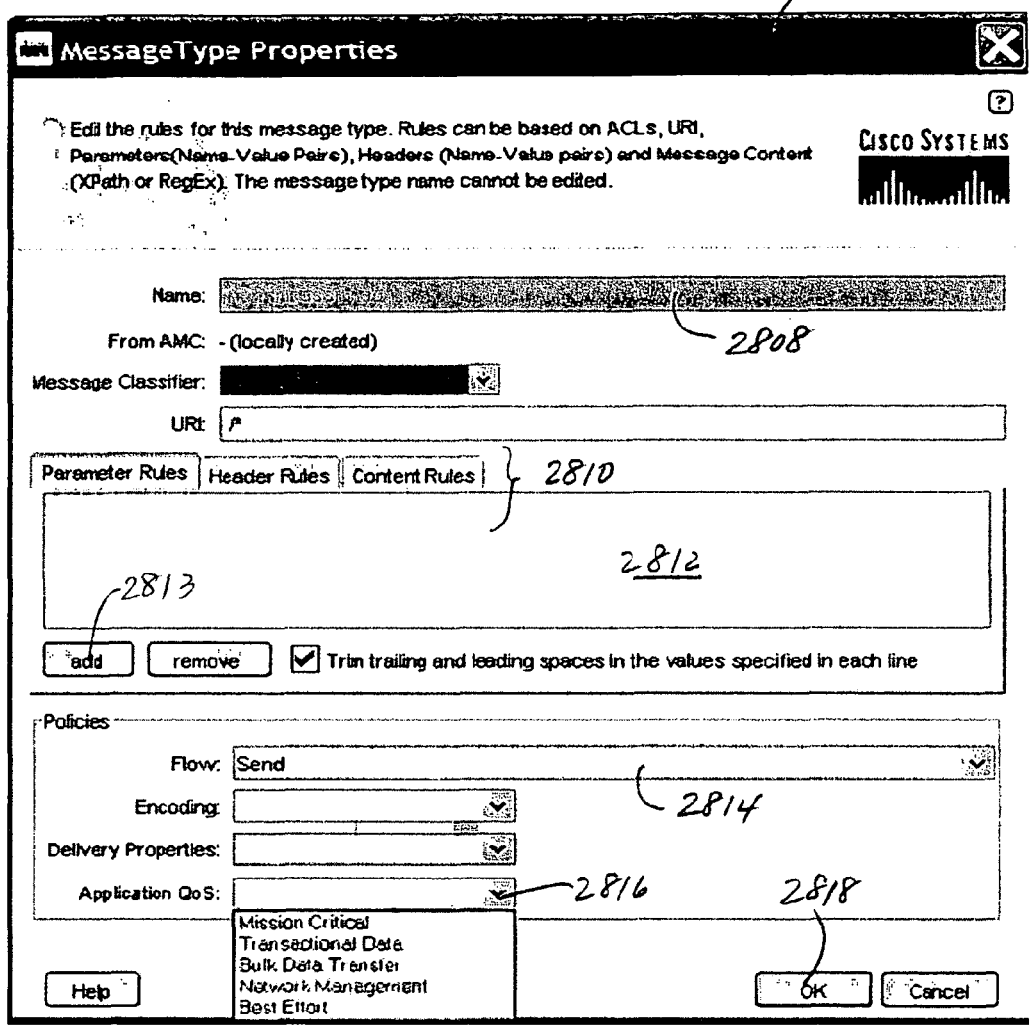
FIG. 28 is a screen display diagram showing an example GUI screen that may be used with the ADS to receive application-layer QoS information.

FIG. 28 is a screen display diagram showing an example GUI screen that may be used with the ADS to receive application-layer QoS information. After invoking ADS 2512, a user selects a particular application-layer message type and requests the ADS to permit editing properties associated with the message type. A name of the message type is entered in name field 2808. The user may specify a rule in a text field 2812, and the rule may be any of a parameter rule, header rule, or content rule as indicated by tabs 2810. Selecting the Add button 2813 then stores the rule for use in processing future messages.

One or more policies may be associated with message types. When an AONS node receives and recognizes an application-layer message that matches a particular message type, the node performs the associated policies. For example, a flow 2814 may specify that all messages of a particular message type should undergo a specified set of processing operations termed a flow. An application QoS, specified using combo box 2816, is an additional policy. In an embodiment, a user selects a message classification using combo box 2816 from among a list of message classification values as specified above. Selecting the OK button 2818 causes the AONS node to apply the specified application QoS value to messages of the indicated type.

4.3 Additional Features of Various Embodiments

In an embodiment, different message classifications may be used. In Assured Forwarding, each of the AF classes has three (3) drop precedence values denoted by an appended digit, such as AF31, AF32 or AF33. The final digit denotes drop precedence within a class where AF31 has higher precedence than AF32, and AF32 has a higher precedence that AF33. In an embodiment, all packets of an application-layer message that are marked for a particular AF class are marked as AF31, AF21 or AF11.

Generally, traffic is classified as Class AF1 for asynchronous applications. Synchronous applications may use AF3 or AF2 depending upon business priority. Applications with the highest business priority, which is a subjective evaluation, are marked AF3, otherwise synchronous applications are marked AF2. In an embodiment, the Scavenger class may be supported for any anomalous traffic. Alternatively, router 2504 may throw traps or write log entries when such traffic is processed.

In an embodiment, individual messages traversing persistent connections, may be marked differently. In other embodiments, rate limiting and shaping of messages may be provided, especially in bandwidth-limited environments.

In an embodiment, when router 2504 is an edge router, the router 2504 ignores any network-layer QoS value in a received message. However, the network-layer QoS values in the received message are carried forward into any message that router 2504 sends to router 2506 or onward toward the second computer 2508.

In one embodiment, in the approach herein an Application QoS value can be assigned on one node such as router 2504 and be carried forward to all downstream nodes such as router 2506. All message processing within the node, such as PEP execution, forwarding a message to the next hop using AONP, etc., is prioritized based on the Application QoS in a message, through the use of prioritized queues. In an embodiment, a message that does not have any Application QoS is processed with "Best Effort" priority.

In an embodiment, an administrative user may use ADS 2512 to configure different QoS settings for specified message classification values. Thus, ADS 2512 is a facility for editing the mapping 2522. In an embodiment, a QoS bladelet that implements the foregoing functions enables the QoS setting to be different than the message classification value. The bladelet allows a flow designer to select any available Application QoS values, such as those specified above.

The approach herein effectively deciphers network QoS levels and values by integrating low-level QoS packet marking with application-level concepts of QoS, and performing the application-layer QoS evaluation and marking in network elements. Numerous benefits derive from this approach. For example, the approach herein allows mapping application-layer QoS characteristics to network-layer QoS values to provide value-based quality of service. In one example context, messages ordering stock trades in a financial application may be treated with higher priority than messages requesting stock quotes. In convention practice prior to the present disclosure, such messages cannot be differentiated at the application level. In one embodiment, using AON message processing in the network, AON blades can differentiate between a trade and a quote, and can map, based on configured policies, a higher priority QoS to trades and other priorities to quotes and other traffic based upon the policy.

Upstream nodes such as second computer 2508, or routers and switches in a path from router 2506 to second computer 2508 that do not support the approach herein, can either remark the DSCP values or honor the existing markings. Remarking is most likely to occur when downstream nodes are in a different administrative domain than routers 2504, 2506.

In other benefits, the approach herein provides a mechanism that enables the relative priority of a message, based upon its content or context as interpreted at Layer 5, 6, or 7, to be marked with Layer 2, 3, or 4 QoS values. As a result, application-layer QoS at Layer 5, 6, or 7 is aligned with network-level QoS differentiation, providing for a true "value-based" application QoS facility. In one embodiment, DSCP values provide the ability to map application priority to the network priority, but other low-level QoS values or markings may be used.

The approach herein can carry over the QoS setting across upstream nodes, and can apply the original QoS setting for a response message. In various embodiments, the same or alternate QoS settings are applied to a request and a response, considering the fact that they could be on different connections. For example, router 2506 can recognize that a response message arriving on connection 2532 is associated with a previously sent request message, associate the flows of requests and responses, and write the received response message on the same class of connection 2516, 2518 as the previous request. As a result, communications between compliant routers 2504, 2506 using the same QoS values on requests and responses.

Embodiments also may be used to consistently map traffic to a particular traffic class for the purpose of SLA enforcement and reporting.

5.0 IMPLEMENTATION MECHANISMS—HARDWARE OVERVIEW

Figure 5:
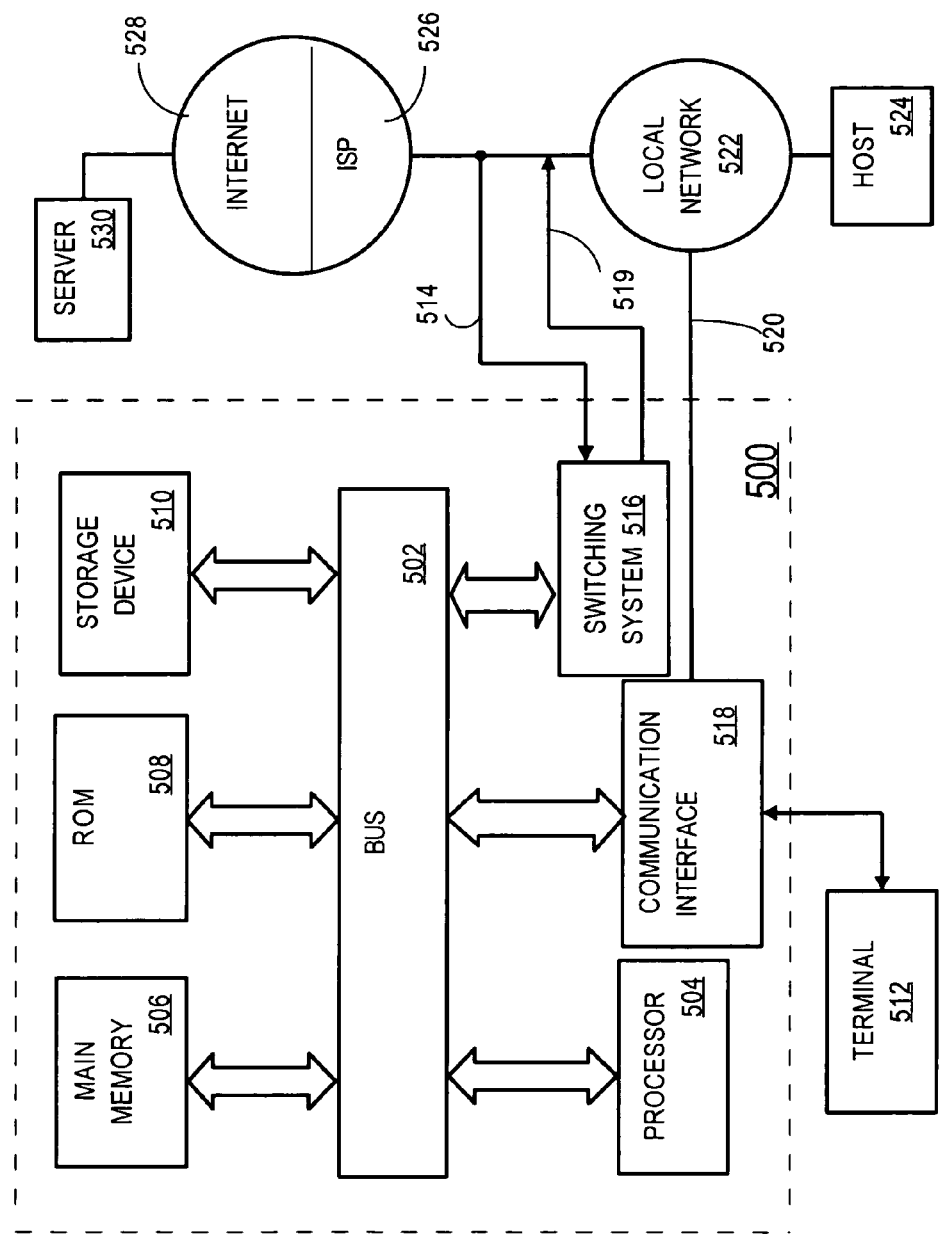
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router or switch. Thus, in this embodiment, the computer system 500 is a router or switch.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for performing the techniques described herein including applying quality of service to application-layer messages in network elements. According to one embodiment of the invention, computer system 500 performs applying quality of service to application-layer messages in network elements in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for applying quality of service to application-layer messages in network elements as described herein.

Processor 504 may execute the received code as it is received and/or stored in storage device 510 or other non-volatile storage for later execution. In this manner, computer system 500 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a non-transitory computer-readable storage medium recorded with one or more message classification rules and a mapping of message classification values to network-level QoS values, wherein each of the one or more message classification rules specifies one or more application-level attributes and one of the message classification values;
application QoS logic which when executed by the one or more processors is operable to cause:
intercepting an application-layer message encapsulated in a collective payload portion of two or more data packets according to an application-layer protocol;
wherein the application-layer message communicates application-level information between applications, and wherein the application-level information comprises application-level attributes that are contained in a body of the application-layer message;
extracting and assembling the application-layer message from the collective payload portion based at least in part on the application-layer protocol;
matching one or more application-level attributes from the body of the extracted and assembled application-layer message to the one or more message classification rules;
determining a message classification value of the extracted and assembled application-layer message based at least in part on the matching;
selecting one of the network-level QoS values using the mapping and based at least in part on the determined message classification value;
marking a network-level header of at least one of the two or more data packets based at least in part on the selected network-level QoS value.

2. The apparatus of claim 1, wherein the message classification rules classify the application-layer message as one of mission critical, transactional data, bulk data transfer, and best effort.

3. The apparatus of claim 1, wherein the network-level QoS values are differentiated services code point (DSCP) values.

4. The apparatus of claim 3, wherein the application QoS logic comprises logic which when executed by the one or more processors is operable to mark an IP header of the at least one of the two or more data packets containing the application-layer message with one of the DSCP values.

5. The apparatus of claim 1, wherein the network-level QoS values are IP Type of Service (ToS) values.

6. The apparatus of claim 5, wherein the application QoS logic comprises logic which when executed by the one or more processors is operable to mark an IP header of the at least one of the two or more data packets containing the application-layer message with one of the ToS values.

7. The apparatus of claim 1, wherein the application QoS logic comprises logic which when executed by the one or more processors is operable to forward the application-layer message to a next hop, wherein the forwarding is prioritized based at least in part on the selected QoS value and a set of priority queues.

8. The apparatus of claim 1, wherein the application QoS logic comprises logic which when executed by the one or more processors is operable to establish a plurality of prioritized virtual connections between the apparatus and a next hop apparatus, and to forward the application-layer message to a next hop, wherein the forwarding is prioritized based at least in part on writing the application-layer message to one of the virtual connections that is associated with the selected QoS value.

9. The apparatus of claim 1, comprising any of a packet data router and a packet data switch in a packet-switched network.

10. The apparatus of claim 1, wherein the application-layer message is a first application-layer message, and wherein the application QoS logic comprises logic which when executed by the one or more processors is operable to:
forward the first application-layer message to an endpoint;
intercept a second application-layer message from the endpoint;
determine that the second application-layer message is associated with the first application-layer message;
mark one or more data packets containing the second application-layer message with the same selected QoS value that was used to mark the at least one of the two or more data packets containing the first application-layer message; and
forward the second application-layer message to a next hop, wherein the forwarding is prioritized based at least in part on writing the second application-layer message to one of the virtual connections that is associated with the selected QoS value.

11. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a non-transitory computer-readable storage medium recorded with one or more message classification rules and a mapping of message classification values to network-level QoS values, wherein each of the one or more message classification rules specifies one or more application-level attributes and one of the message classification values;
means for intercepting an application-layer message encapsulated in a collective payload portion of two or more data packets according to an application-layer protocol;
wherein the application-layer message communicates application-level information between applications, and wherein the application-level information comprises application-level attributes that are contained in a body of the application-layer message;
means for extracting and assembling the application-layer message from the collective payload portion based at least in part on the application-layer protocol;
means for matching one or more application-level attributes from the body of the extracted and assembled application-layer message to the one or more message classification rules;
means for determining a message classification value of the extracted and assembled application-layer message based at least in part on the matching;
means for selecting one of the network-level QoS values using the mapping and based at least in part on the determined message classification value;
means for marking a network-level header of at least one of the two or more data packets based at least in part on the selected network-level QoS value.

12. The apparatus of claim 11, wherein the message classification rules classify the application-layer message as one of mission critical, transactional data, bulk data transfer, and best effort.

13. The apparatus of claim 11, wherein the network-level QoS values are differentiated services code point (DSCP) values.

14. The apparatus of claim 13, further comprising means for marking an IP header of the at least one of the two or more data packets containing the application-layer message with one of the DSCP values.

15. The apparatus of claim 11, wherein the network-level QoS values are IP Type of Service (ToS) values.

16. The apparatus of claim 15, further comprising means for marking an IP header of the at least one of the two or more data packets containing the application-layer message with one of the ToS values.

17. The apparatus of claim 11, further comprising means for forwarding the application-layer message to a next hop, wherein the forwarding is prioritized based at least in part on the selected QoS value and a set of priority queues.

18. The apparatus of claim 11, further comprising means for establishing a plurality of prioritized virtual connections between the apparatus and a next hop apparatus, and for forwarding the application-layer message to a next hop, wherein the forwarding is prioritized based at least in part on writing the application-layer message to one of the virtual connections that is associated with the selected QoS value.

19. The apparatus of claim 11, comprising any of a packet data router and a packet data switch in a packet-switched network.

20. The apparatus of claim 11, wherein the application-layer message is a first application-layer message, further comprising:
means for forwarding the first application-layer message to an endpoint;
means for intercepting a second application-layer message from the endpoint;
means for determining that the second application-layer message is associated with the first application-layer message;
means for marking one or more data packets containing the second application-layer message with the same selected QoS value that was used to mark the at least one of the two or more data packets containing the first application-layer message; and
means for forwarding the second application-layer message to a next hop, wherein the forwarding is prioritized based at least in part on writing the second application-layer message to one of the virtual connections that is associated with the selected QoS value.

21. A non-transitory computer-readable storage medium recorded with one or more message classification rules and a mapping of message classification values to network-level QoS values, wherein each of the one or more message classification rules specifies one or more application-level attributes and one of the message classification values, and recorded with application QoS logic which when executed by one or more processors is operable to cause:

intercepting an application-layer message encapsulated in a collective payload portion of two or more data packets according to an application-layer protocol, wherein the application-layer message is received at a network infrastructure element comprising a plurality of network interfaces that are coupled to a data network for receiving one or more packets therefrom and sending one or more packets thereto, the one or more processors, and a switching system coupled to the one or more processors and packet forwarding logic, wherein the switching system and packet forwarding logic are configured to receive packets on a first network interface, determine a second network interface on which to send the packets, and to send the packets on the second network interface;

wherein the application-layer message communicates application-level information between applications, and wherein the application-level information comprises application-level attributes that are contained in a body of the application-layer message;

extracting and assembling the application-layer message from the collective payload portion based at least in part on the application-layer protocol;

matching one or more application-level attributes from the body of the extracted and assembled application-layer message to the one or more message classification rules;

determining a message classification value of the extracted and assembled application-layer message based at least in part on the matching;

selecting one of the network-level QoS values using the mapping and based at least in part on the determined message classification value;

marking a network-level header of the at least one of the two or more data packets using the selected network-level QoS value.

22. The non-transitory computer-readable medium of claim 21, wherein the message classification rules classify the application-layer message as one of mission critical, transactional data, bulk data transfer, and best effort.

23. The non-transitory computer-readable medium of claim 21, wherein the network-level QoS values are differentiated services code point (DSCP) values.

24. The non-transitory computer-readable medium of claim 23, wherein the application QoS logic comprises logic which when executed by the one or more processors is operable to mark an IP header of the at least one of the two or more data packets containing the application-layer message with one of the DSCP values.

25. The non-transitory computer-readable medium of claim 21, wherein the network-level QoS values are IP Type of Service (ToS) values.

26. The non-transitory computer-readable medium of claim 25, wherein the application QoS logic comprises logic which when executed by the one or more processors is operable to mark an IP header of the at least one of the two or more data packets containing the application-layer message with one of the ToS values.

27. The non-transitory computer-readable medium of claim 21, wherein the application QoS logic comprises logic which when executed by the one or more processors is operable to forward the application-layer message to a next hop, wherein the forwarding is prioritized based at least in part on the selected QoS value and a set of priority queues.

28. The non-transitory computer-readable medium of claim 21, wherein the application QoS logic comprises logic which when executed by the one or more processors is operable to establish a plurality of prioritized virtual connections between the computer-readable medium and a next hop computer-readable medium, and to forward the application-layer message to a next hop, wherein the forwarding is prioritized based at least in part on writing the application-layer message to one of the virtual connections that is associated with the selected QoS value.

29. The non-transitory computer-readable medium of claim 21, comprising any of a packet data router and a packet data switch in a packet-switched network.

30. The non-transitory computer-readable medium of claim 21, wherein the application-layer message is a first application-layer message, and wherein the application QoS logic comprises logic which when executed by the one or more processors is operable to:

forward the first application-layer message to an endpoint;

intercept a second application-layer message from the endpoint;

determine that the second application-layer message is associated with the first application-layer message;

mark one or more data packets containing the second application-layer message with the same selected QoS value that was used to mark the at least one of the two or more data packets containing the first application-layer message; and forward the second application-layer message to a next hop, wherein the forwarding is prioritized based at least in part on writing the second application-layer message to one of the virtual connections that is associated with the selected QoS value.

31. A method, comprising:

creating and storing one or more message classification rules and a mapping of message classification values to network-level QoS values, wherein each of the one or more message classification rules specifies one or more application-level attributes and one of the message classification values;

intercepting an application-layer message encapsulated in a collective payload portion of two or more data packets according to an application-layer protocol, wherein the application-layer message is received at a network infrastructure element comprising a plurality of network interfaces that are coupled to a data network for receiving one or more packets therefrom and sending one or more packets thereto, the one or more processors, and a switching system coupled to the one or more processors and packet forwarding logic, wherein the switching system and packet forwarding logic are configured to receive packets on a first network interface, determine a second network interface on which to send the packets, and to send the packets on the second network interface;

wherein the application-layer message communicates application-level information between applications, and wherein the application-level information comprises application-level attributes that are contained in a body of the application-layer message;

extracting and assembling the application-layer message from the collective payload portion based at least in part on the application protocol;

matching one or more application-level attributes from the body of the extracted and assembled application-layer message to the one or more message classification rules;

determining a message classification value of the extracted and assembled application-layer message based at least in part on the matching;

selecting one of the network-level QoS values using the mapping and based at least in part on the determined message classification value;

marking a network-level header of the at least one of the two or more data packets based at least in part on the selected network-level QoS value;

wherein the method is performed by one or more computing devices.

32. The method of claim 31, wherein the message classification rules classify the application-layer message as one of mission critical, transactional data, bulk data transfer, and best effort.

33. The method of claim 31, wherein the network-level QoS values are differentiated services code point (DSCP) values.

34. The method of claim 33, further comprising marking an IP header of the at least one of the two or more data packets containing the application-layer message with one of the DSCP values.

35. The method of claim 31, wherein the network-level QoS values are IP Type of Service (ToS) values.

36. The method of claim 35, further comprising marking an IP header of the at least one of the two or more data packets containing the application-layer message with one of the ToS values.

37. The method of claim 31, further comprising forwarding the application-layer message to a next hop, wherein the forwarding is prioritized based at least in part on the selected QoS value and a set of priority queues.

38. The method of claim 31, further comprising establishing a plurality of prioritized virtual connections between the method and a next hop method, and forwarding the application-layer message to a next hop, wherein the forwarding is prioritized based at least in part on writing the application-layer message to one of the virtual connections that is associated with the selected QoS value.

39. The method of claim 31, comprising receiving the application-layer message at the network infrastructure element comprising any of a packet data router and a packet data switch in a packet-switched network.

40. The method of claim 31, wherein the application-layer message is a first application-layer message, further comprising:

forwarding the first application-layer message to an endpoint;

intercepting a second application-layer message from the endpoint;

determining that the second application-layer message is associated with the first application-layer message;

marking one or more data packets containing the second application-layer message with the same selected QoS value that was used to mark the at least one of the two or more data packets containing the first application-layer message; and forwarding the second application-layer message to a next hop, wherein the forwarding is prioritized based at least in part on writing the second application-layer message to one of the virtual connections that is associated with the selected QoS value.

* * * * *

UNITED STATES PATENT AND TRADEMARK OFFICE
CERTIFICATE OF CORRECTION

| | | |
|---|---|---|
| PATENT NO. | : 7,827,256 B2 | Page 1 of 1 |
| APPLICATION NO. | : 11/472807 | |
| DATED | : November 2, 2010 | |
| INVENTOR(S) | : Steve Phillips et al. | |

It is certified that error appears in the above-identified patent and that said Letters Patent is hereby corrected as shown below:

Title Page; item (30);
Page 1 insert --Provisional Application Priority Data
June 21, 2005   (US)   60/692,715--

Signed and Sealed this
Twenty-second Day of February, 2011

David J. Kappos
*Director of the United States Patent and Trademark Office*